United States Patent
Kibo

(10) Patent No.: US 9,638,448 B2
(45) Date of Patent: May 2, 2017

(54) REFRIGERANT CYCLE SYSTEM

(71) Applicant: DAIKIN INDUSTRIES, LTD., Osaka-shi, Osaka (JP)

(72) Inventor: Kousuke Kibo, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 334 days.

(21) Appl. No.: 14/348,456

(22) PCT Filed: Sep. 28, 2012

(86) PCT No.: PCT/JP2012/075228
§ 371 (c)(1),
(2) Date: Mar. 28, 2014

(87) PCT Pub. No.: WO2013/047828
PCT Pub. Date: Apr. 4, 2013

(65) Prior Publication Data
US 2014/0245764 A1    Sep. 4, 2014

(30) Foreign Application Priority Data

Sep. 30, 2011  (JP) ................................ 2011-218342
Sep. 27, 2012  (JP) ................................ 2012-214128

(51) Int. Cl.
F25B 49/02    (2006.01)
F24F 11/00    (2006.01)
F25B 13/00    (2006.01)

(52) U.S. Cl.
CPC .............. *F25B 49/02* (2013.01); *F24F 11/008* (2013.01); *F25B 13/00* (2013.01);
(Continued)

(58) Field of Classification Search
CPC .............. F25B 49/02; F25B 2313/0294; F25B 2313/0233; F25B 2313/0253;
(Continued)

(56) References Cited

U.S. PATENT DOCUMENTS 4,148,436 A * 4/1979 Shaw ...................... F25B 1/047
                                                        237/2 B
4,263,786 A * 4/1981 Eng ......................... B64D 13/06
                                                        62/172
(Continued)

FOREIGN PATENT DOCUMENTS

JP          63-25446 A      2/1988
JP          5-310452 A     11/1993
(Continued)

OTHER PUBLICATIONS

JP 2008215678A machine translation from Google Patents, dated Aug. 22, 2016.*
(Continued)

*Primary Examiner* — Len Tran
*Assistant Examiner* — Kirstin Oswald
(74) *Attorney, Agent, or Firm* — Global IP Counselors, LLP

(57) ABSTRACT

A refrigeration cycle system is capable of reducing an amount of information required to be specified in advance, reducing a computational processing load, reflecting differences in actual installation conditions, and speeding up stabilization of an operational state in which the total amount of required input energy is reduced. A refrigeration cycle system is provided with a plurality of actuators, including outdoor fan motors, compressors, indoor fan motors, and the like for causing a refrigerant circuit to carry out a refrigeration cycle. A control unit obtains the slope at the current evaporation temperature and/or the current condensing temperature on a graph of the function between the actuators and the evaporation temperature or the condensing temperature, and updates the value of the target evaporation temperature and/or the target condensing temperature so that (Continued)

the sum of the input energy to the actuators is less that the current level.

15 Claims, 19 Drawing Sheets

(52) U.S. Cl.
CPC .............. F25B 2313/0233 (2013.01); F25B 2313/0253 (2013.01); F25B 2313/0293 (2013.01); F25B 2313/0294 (2013.01); F25B 2313/02742 (2013.01); F25B 2313/0314 (2013.01); F25B 2313/0315 (2013.01); F25B 2341/0662 (2013.01); F25B 2600/0253 (2013.01); F25B 2700/2104 (2013.01); F25B 2700/2106 (2013.01); Y02B 30/741 (2013.01)

(58) Field of Classification Search
CPC .... F25B 2313/02742; F25B 2313/0293; F25B 13/00; F25B 2313/0314; F25B 2313/0315; F25B 2341/0662; F25B 2600/0253; F25B 2700/2104; Y02B 30/741
USPC .................................... 62/125, 126
See application file for complete search history.

(56) References Cited

U.S. PATENT DOCUMENTS

| | | | | | |
|---|---|---|---|---|---|
| 4,356,703 | A * | 11/1982 | Vogel | ............... | F25B 5/02 62/155 |
| 4,393,662 | A * | 7/1983 | Dirth | ............... | F25B 5/02 165/268 |
| 4,467,613 | A * | 8/1984 | Behr | ............... | F25B 13/00 62/115 |
| 4,783,970 | A * | 11/1988 | Takahashi | ........... | B60H 1/3207 62/176.3 |
| 4,894,999 | A * | 1/1990 | Kaiju | ............... | B60H 1/321 62/158 |
| 4,928,499 | A * | 5/1990 | Kiminami | ......... | B60H 1/00735 165/43 |
| 5,009,076 | A * | 4/1991 | Winslow | ............ | F25B 49/005 62/129 |
| 5,014,519 | A * | 5/1991 | Noji | ............... | B60H 1/3207 165/228 |
| 5,022,232 | A * | 6/1991 | Sakamoto | ........... | B60H 1/3208 62/133 |
| 5,078,316 | A * | 1/1992 | Hara | ............... | B60H 1/00964 236/49.3 |
| 5,099,654 | A * | 3/1992 | Baruschke | .......... | B60H 1/3208 62/180 |
| 5,150,582 | A * | 9/1992 | Gotou | ............... | F25B 13/00 62/155 |
| 5,172,563 | A * | 12/1992 | Fujii | ............... | B60H 1/00735 62/158 |
| 5,214,918 | A * | 6/1993 | Oguni | ............... | F25B 13/00 62/126 |
| 5,263,333 | A * | 11/1993 | Kubo | ............... | F24F 3/065 62/160 |
| 5,279,131 | A * | 1/1994 | Urushihata | ............ | F24F 3/065 62/117 |
| 5,343,935 | A * | 9/1994 | Sumitani | ........... | F24F 3/065 165/207 |
| 5,353,604 | A * | 10/1994 | Oguni | ............... | F25B 49/02 62/207 |
| 5,361,595 | A * | 11/1994 | Shimura | ............... | F24F 3/065 62/174 |
| 5,467,604 | A * | 11/1995 | Sekigami | ............... | F24F 3/065 62/117 |
| 5,473,906 | A * | 12/1995 | Hara | ............... | B60H 1/00007 62/160 |
| 5,651,263 | A * | 7/1997 | Nonaka | ............... | F25B 9/006 62/205 |
| 5,737,931 | A * | 4/1998 | Ueno | ............... | F25B 9/006 62/126 |
| 5,755,282 | A * | 5/1998 | Teshima | ............... | B60H 1/0005 165/202 |
| 6,209,338 | B1 * | 4/2001 | Thatcher, Jr. | .......... | F25B 45/00 62/149 |
| 6,298,683 | B1 * | 10/2001 | Kondo | ............... | F25B 7/00 62/335 |
| 6,301,912 | B1 * | 10/2001 | Terai | ............... | F04C 23/008 418/55.5 |
| 6,434,956 | B1 * | 8/2002 | Ota | ............... | B60H 1/3208 417/222.2 |
| 8,733,118 | B2 * | 5/2014 | Ushijima | ............... | F25B 30/02 62/159 |
| 2002/0026803 | A1 * | 3/2002 | Inoue | ............... | F25B 13/00 62/228.3 |
| 2004/0016241 | A1 * | 1/2004 | Street | ............... | F25B 49/02 62/129 |
| 2005/0081540 | A1 * | 4/2005 | Hwang | ............... | F25B 13/00 62/175 |
| 2006/0266074 | A1 * | 11/2006 | Groll | ............... | F25B 1/10 62/510 |
| 2009/0013700 | A1 * | 1/2009 | Unezaki | ............... | F25B 9/008 62/77 |
| 2014/0298840 | A1 * | 10/2014 | Yahia | ............... | B60H 1/00485 62/190 |
| 2014/0318163 | A1 * | 10/2014 | Takayama | ............... | F25B 49/00 62/196.1 |
| 2014/0326004 | A1 * | 11/2014 | Leman | ............... | F25B 13/00 62/79 |
| 2014/0326010 | A1 * | 11/2014 | Kawakami | ............. | B60H 1/323 62/222 |
| 2014/0338379 | A1 * | 11/2014 | Hatakeyama | ............... | F25B 30/02 62/126 |
| 2014/0343733 | A1 * | 11/2014 | Turner | ............... | F25B 49/025 700/276 |

FOREIGN PATENT DOCUMENTS

| | | |
|---|---|---|
| JP | 9-217974 A | 8/1997 |
| JP | 2000-88376 A | 3/2000 |
| JP | 2006-275323 A | 10/2006 |
| JP | 2007-292458 A | 11/2007 |
| JP | 2008-215678 A | 9/2008 |
| JP | 2008-275216 A | 11/2008 |

OTHER PUBLICATIONS

European Search Report of corresponding EP Application No. 12 83 6053.4 dated Jun. 19, 2015.
International Search Report of corresponding PCT Application No. PCT/JP2012/075228.
International Preliminary Report of corresponding PCT Application No. PCT/JP2012/075228.

* cited by examiner

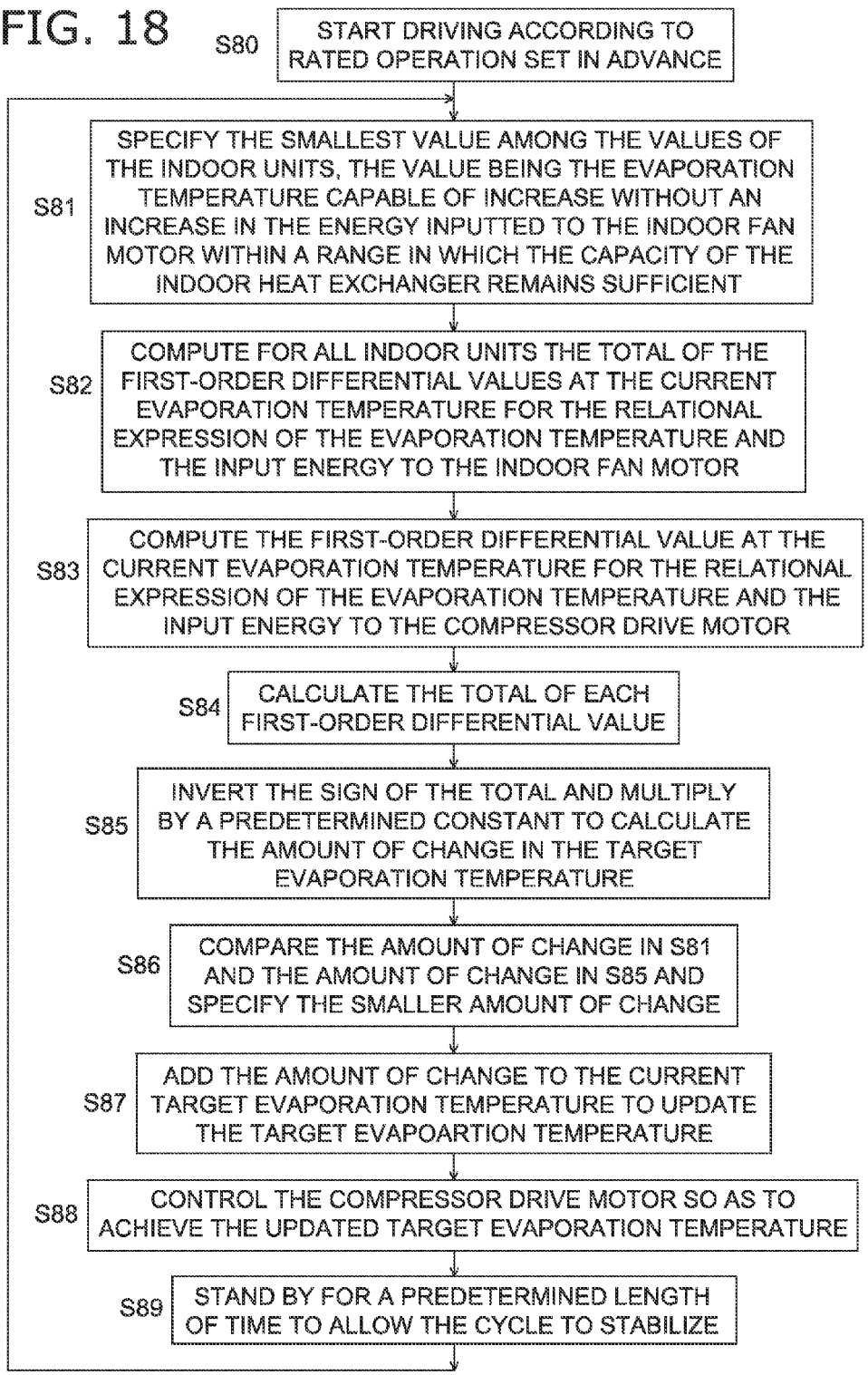

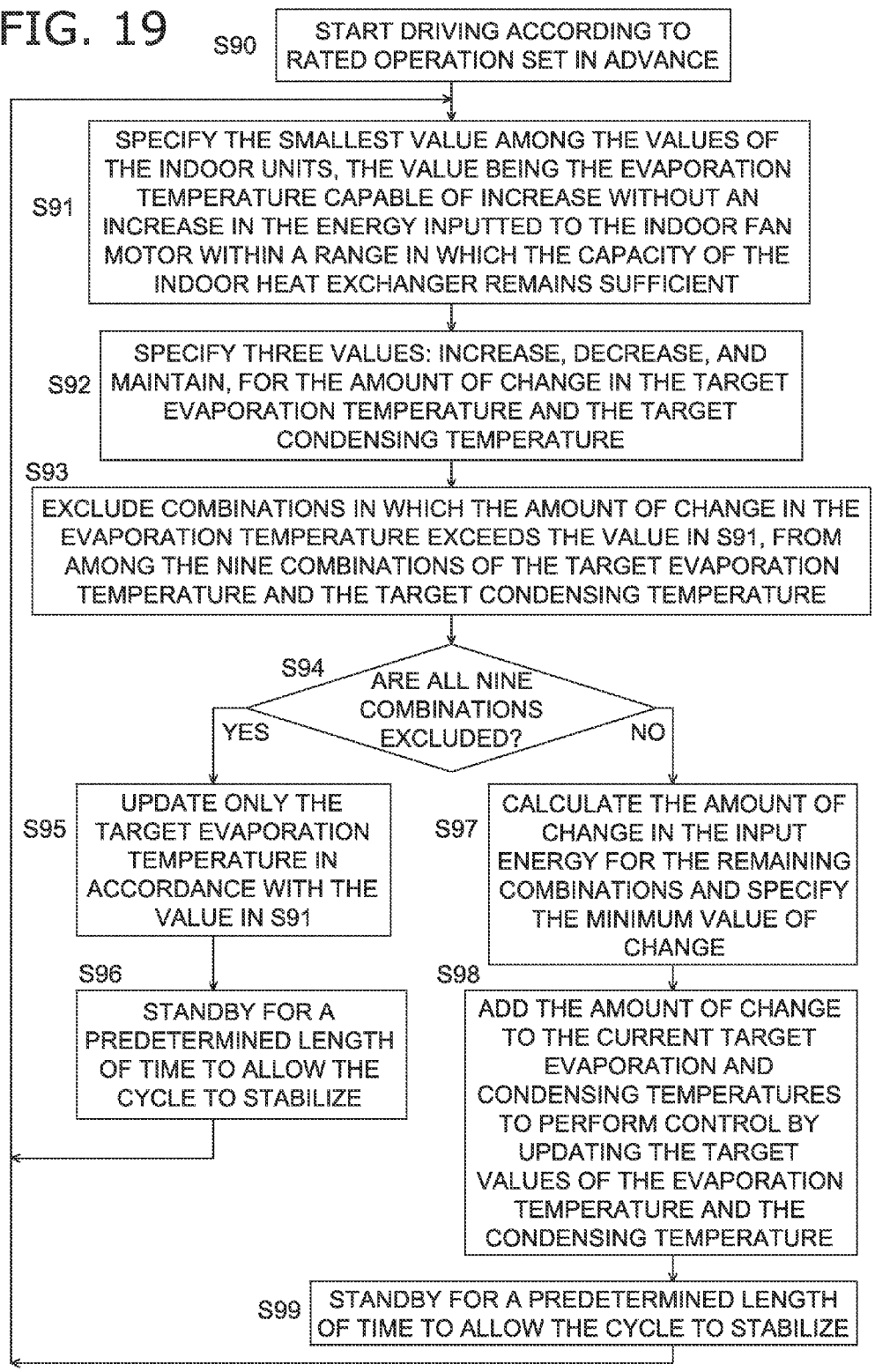

REFRIGERANT CYCLE SYSTEM

CROSS-REFERENCE TO RELATED APPLICATIONS

This U.S. National stage application claims priority under 35 U.S.C. §119(a) to Japanese Patent Application Nos. 2011-218342, filed in Japan on Sep. 30, 2011 and 2012-214128, filed in Japan on Sep. 27, 2012, the entire contents of which are hereby incorporated herein by reference.

TECHNICAL FIELD

The present invention relates to a refrigeration cycle system.

BACKGROUND ART

Various proposals have been made with the aim of achieving required capacity using as little input energy as possible in an air-conditioning system or the like in which a refrigerator is used. Envisioned examples of machines that require input energy include compressor drive units and fan drive units.

The refrigeration cycle apparatus described in Japanese Patent Application No. H05-31045299 gives three examples of devices to which energy is inputted, namely, a compressor, an outdoor fan, and an indoor fan. Optimization control is carried out with focus on: the change $\Delta W$ in the total amount of input energy required in correspondence to a combination of the change $\Delta F$ in frequency of the compressor, the change $\Delta No$ in the rotating speed of the outdoor fan, and the change $\Delta Ni$ in the rotating speed of the indoor fan; and the change $\Delta Q$ in the capacity of the heat exchanger that changes in corresponding fashion.

In other words, with this refrigeration cycle device, a combination of change in rotating speed and/or frequency is set in advance for three control targets, i.e., the compressor, the outdoor fan, and the indoor fan used in a refrigeration cycle device. The change $\Delta W$ in the total amount of input energy required in correspondence to the combination of change and the change $\Delta Q$ in the capacity of the heat exchanger that changes in corresponding fashion to the combination of change are each calculated for each combination by computational processing. A combination is specified from among the combinations of the change $\Delta Q$ in the capacity of the heat exchanger and the change $\Delta W$ in the total amount of input energy, the specified combination being one in which the capacity of the heat exchanger satisfies the requested capacity conditions and in which the change $\Delta W$ in the total amount of input energy is minimized, and optimization control is carried out in accordance with the change conditions of the frequency of the compressor, the rotating speed of the outdoor fan, and the rotating speed of the indoor fan which correspond to the combination.

SUMMARY

Technical Problem

With the refrigeration cycle device described in Japanese Patent Application No. H05-310452 noted above, a characteristic formula and/or a specific coefficient for calculating the total amount of input energy and the capacity of the heat exchanger must be specified in advance for each condition, i.e., the frequency of the compressor and/or the rotating speed of the fans. Moreover, computational processing that uses a corresponding characteristic formula must be executed for each of all the conditions, i.e., the frequency of the compressor and/or the rotating speed of the fans, and the information processing load is high. Accordingly, there are cases in which the compressor model and/or fan model to be used are different for each system even when, e.g., the number of compressors and the number of heat exchangers are the same, the number of compressor and/or the number of fan are different for each system even when, e.g., the compressor model and the heat exchanger model are the same, or there are cases in which not only is the number of compressors and/or the number of heat exchangers different for each system, but also the compressor models, fan models, and/or heat exchanger models that are used are configured in various combinations and the combination pattern is different for each system. In such cases, not only is it required that the characteristic formula and/or the specific coefficient be specified in advance in each system, but such work itself is very laborious, and the computation load is increased when the amount of change in heat exchanger capacity and the amount of change in the total amount of input energy is calculated for each of all the operating conditions.

In the refrigeration cycle device described above, focus is placed on the capacity of the heat exchangers and the total amount of input energy, which vary in correspondence to change in compressor frequency and fan rotating speed. However, compressor frequency and fan rotating speed as factors under focus can vary considerably in accordance with operating conditions, and it is therefore difficult to handle changes in operating conditions when calculations for optimization are carried out on the basis of these factors.

Furthermore, in the refrigeration cycle device described above, focus is placed solely on the capacity of the heat exchangers and the total amount of input energy, which vary in correspondence to change in compressor frequency and fan rotating speed, and it is not possible to reflect various factors in control processes. Examples of such factors include the specific placement state of the heat exchangers (e.g., differences in the state of placement in which outdoor heat exchangers are arranged near an outdoor wall surface or are arranged far away from a wall surface), differences in duct length when the indoor device is in a duct scheme, the amount of age-related degradation of the heat exchangers based on the amount of fin soiling and the like, and the amount of clogging by fitter soiling or the like. Accordingly, it is not possible to calculate, based on actual installation conditions, a suitable value for the amount of change in capacity of the heat exchangers and the amount of change in the total amount of input energy when these amounts are calculated in correspondence to changes in compressor frequency and fan rotating speed.

A long period of time is required until the operational state is stabilized when control is performed so as to modify actual operating conditions, actually drive the system using the modified operating conditions, determine whether the total amount of input energy required in the modified operating conditions can be reduced, and furthermore update the operating conditions on the basis of the determination results.

The present invention was devised in view of the foregoing, and an object of the present invention is to provide a refrigeration cycle system capable of reducing an amount of information required to be specified in advance, reducing a computational processing load, reflecting differences in actual installation conditions, and speeding up stabilization of an operational state in which the total amount of required input energy is reduced.

Solution to Problem

A refrigeration cycle system according to a first aspect of the present invention is a refrigeration cycle system for circulating a refrigerant in a refrigerant circuit configured by connecting a compressor, a heat-source-side heat exchanger, an expansion valve, and a usage-side heat exchanger, the refrigeration cycle system comprising a plurality of actuators, a storage unit, refrigerant state quantity acquisition means, and a control unit. The plurality of actuators are provided for causing a refrigeration cycle to be performed in the refrigerant circuit. The storage unit stores at least any of a relational expression, first information, and/or second information in correlation with the actuators respectively. The relational expression shows the relationship between a refrigerant target state quantity and the amount of energy inputted to the actuators. In this case, the refrigerant target state quantity is any of a temperature control target value, a pressure control target value, or a physical-quantity control target value equivalent thereto of refrigerant flowing through the refrigerant circuit. The first information is used for creating the relational expression. The second information is used for attaining the relational expression using values inputted to the actuators and values that indicate states of the actuators corresponding to the input values. The refrigerant state quantity acquisition means acquires the current refrigerant state quantity that corresponds to the value of the refrigerant target state quantity. The control unit obtains the sum of the energy inputted to the actuators, or the sum of the amount of change in the energy inputted to the actuators, on the basis of the relational expression for the postulated case that a change has been made from the current refrigerant state quantity. The control unit updates the value of the refrigerant target state quantity so that the sum of energy inputted to the actuators is less than the current level or so that the sum of the amount of change in the energy inputted to the actuators is a low value. The control unit controls at least one of the actuators so that the value acquired by the refrigerant state quantity acquisition means approximates the updated value of the refrigerant target state quantity.

The "amount of input energy" and the "input energy" are not limited to the specific value of energy, and may also be, e.g., the rotating speed of the fan motor or the value of the input power thereto when the actuator is a fan, the drive frequency of the compressor drive motor or the value of the input power thereto when the actuator is a compressor, or a physical amount used when converted to energy. The same applies for control that is carried out by the control unit "so that the sum of the input energy to the actuators is less than the current level or so that the sum of the amount of change in the energy inputted to the actuators is a low value." Also, there is no limitation to the case in which the specific value of the energy itself is set to be a control target value or the like, and it is also possible to, e.g., carry out control using the rotating speed of the fan motor as the control target value when the actuator is a fan, or to carry out control using the value of the input power thereto as the target value. It is also possible to carry out control using the drive frequency of the compressor drive motor as the target value when the actuator is a compressor, or to carry out control using the value of the input power thereto as the target value. In relation to the "amount of input energy" and the "input energy," the same applies to the refrigeration cycle system in each aspect under the "Means for Solving the Problem."

The storage mode of the storage unit is not particularly limited. For example, the storage unit may store relational expressions that are in a one-to-one correspondence with each actuator, or may store relational expressions that correspond to each type of actuator rather than a one-to-one correspondence with each actuator. It is not necessarily required that the storage unit store the relational expressions themselves, and it is also possible to store first information required for creating a relational expression, so as to correspond one-to-one to each actuator or so as to correspond to each type of actuator. Rather than storing the relational expressions themselves or storing first information, the storage unit may store second information required for attaining a relational expression from an input value (e.g., a current input value) to an actuator and a value (e.g., a value showing the current level) that shows the state of the actuator that corresponds to an input value, so as to correspond one-to-one to each actuator or to correspond to each type of actuator. The storage unit may furthermore store, e.g., a relational expression itself for a certain actuator, and store first information for a different other actuator. It is furthermore possible to store second information for a certain type of actuator, and to store first information for other types of actuators.

The method for differentiating the types of actuators is not particularly limited; it being possible for, e.g., the actuator for driving the compressor and the actuator for feeding fluid to the heat-source-side heat exchanger to be actuators of different types, or for the actuator for driving the compressor and the actuator for feeding fluid to the usage-side heat exchanger to be actuators of different types. The actuator for feeding fluid to the heat-source-side heat exchanger and the actuator for feeing fluid to the usage-side heat exchanger may be actuators of different types, or may be actuators of the same type.

The "physical-quantity control target value equivalent thereto" is not particularly limited; it includes, e.g., the refrigerant temperature, the refrigerant pressure, the degree of superheating, the degree of supercooling, the degree of drying, a combination of these, and other control target values of physical properties.

The control performed by the control unit is not required to be constantly carried out when the refrigeration cycle system is being driven, and may be carried out only as required in required conditions.

The technique for "obtaining the sum of the input energy or the sum of the amount of change to the actuators on the basis of the relational expression for the postulated case that a change has been made from the current refrigerant state quantity" is not particularly limited; it may be, e.g., the case in which the sum is obtained from a first-order differential based on the current refrigerant state quantity for a relational expression stored in the storage unit, or may be the case in which the sum is obtained as a very small amount of change in the energy inputted to the actuators in relation to a predetermined very small amount of change in the current refrigerant state quantity. The refrigeration cycle system is not particularly limited; it may be, e.g., a refrigeration device, an air-conditioning device, a heat pump device, a refrigeration system, an air-conditioning system, or a heat pump system.

The phrase "updating the value of the refrigerant target state quantity so that the sum of energy inputted to the actuators is less than the current level or so that the sum of the amount of change in the energy inputted to the actuators is a low value" includes an increase, a reduction, or maintenance of the current level of the refrigerant target state quantity. Although not particularly limited, the increase width and/or the reduction width may be a value that corresponds to the magnitude of the sum of the amount of change in energy inputted to the actuators when a change has been made from the current refrigerant state quantity.

When only first information or only second information for creating a relational expression is stored in the storage unit, the control unit creates, as appropriate, a relational expression on the basis of information for creating the relational expression.

The compressor in the refrigerant circuit may a single compressor or a plurality of compressors connected in series or in parallel. Similarly, there may be one or a plurality of heat-source-side heat exchangers, the usage-side heat exchangers, and/or the expansion values.

In this refrigeration cycle system, a relational expression showing the relationship between the refrigerant target state quantity and the amount of energy inputted to an actuator is established for each actuator and is stored in the storage unit. Accordingly, there is no need to perform work for specifying characteristic formulas and/or specific constants for calculating the total amount of input energy and the capacity of heat exchangers for each system specified by the model of a plurality of actuators, operating conditions, and the like, and there is no need to save in advance the information in the storage unit.

The control unit obtains the sum of the energy inputted to the actuators, or the sum of the amount of change in the inputted energy, on the basis of the relational expression for the postulated case that a change has been made from the current refrigerant state quantity, and updates the value of the refrigerant target state quantity so that the sum of energy inputted to the actuators is less than the current level or so that the sum of the amount of change in the energy inputted to the actuators is a low value. Accordingly, the process executed by the control unit need only be computational processing for ascertaining the trend in change in the sum (or sum of the amount of change) in input energy to the actuators when a change has been made from the current refrigerant state quantity. Therefore, the load for computationally processing all changes in a plurality of conditions, including changes to conditions that have not actually been selected, the processing load for selecting optimal condition changes from among the computed changes, and other processing loads are not required.

In this refrigeration cycle system, focus is placed on the total amount of input energy and/or the total change thereof when a change has been made from the current refrigerant state quantity. Accordingly, the amount of change in the refrigerant target state quantity (e.g., the condensing temperature and/or the evaporation temperature) can be minimized in comparison with change in the frequency of the compressor and/or the rotating speed of the fan, even when the operating conditions have changed due to a considerable change in the value of the capacity required by the cycle. It is therefore possible to avoid a longer time required until the system operating state corresponding to changes in the requested capacity of the heat exchanger is stably maintained, even when the requested capacity changes.

The refrigerant state quantity (balance point) changes in the case that the actual installation conditions are different, even when the drive frequency of the compressor and/or the rotating speed of the fan, or the input energy to the compressor and/or the input energy to the fan are the same. Accordingly, control that focuses solely on the drive frequency of the compressor and/or the rotating speed of the fan, or the input energy to the compressor and/or the input energy to the fan cannot be suitably carried out with consideration given to actual installation conditions. In contrast, in this refrigeration cycle system, focus is placed on the total amount of input energy or change thereof when the current refrigerant state quantity has been changed. Accordingly, the control unit is capable of performing suitable control with consideration given to actual installation conditions.

In accordance with this refrigeration cycle system, the amount of information that must be specified in advance is reduced, the computational processing load is reduced, differences in actual installation conditions can be reflected, and it is possible to allow an operating state, in which the required total amount of input energy is minimized, to rapidly stabilize.

The refrigeration cycle system according to a second aspect of the present invention is the refrigeration cycle system according to the first aspect, wherein the control unit updates the value of the refrigerant target state quantity in a range in which the width of change in the capacity requested by the usage-side heat exchanger satisfies a predetermined capacity condition.

As used herein, the range that satisfies the predetermined capacity condition may be a predetermined range that contains a value attained by computing, e.g., a proportionality coefficient×the temperature difference $\Delta T$, which is the difference between the temperature of the refrigerant that flows through the usage-side heat exchanger and the temperature of the air that flows around the usage-side heat exchanger, ×the airflow volume (or a value attained by multiplying a constant and the input energy to the actuators in the usage-side fluid supply unit). For example, in order to keep the capacity with a predetermined range, the input energy to the actuators in the usage-side fluid supply unit is increased, whereby the capacity is kept within the predetermined range when the evaporation temperature in the usage-side heat exchanger has increased, the evaporation temperature being an example of the refrigerant state quantity.

In this refrigeration cycle system, it is possible to ensure energy savings while minimizing the computational processing load within a range that satisfies a predetermined capacity condition.

The refrigeration cycle system according to a third aspect of the present invention is the refrigeration cycle system according to the first or second aspect, further comprising a heat-source-side fluid supply unit for supplying a fluid for exchanging heat with a refrigerant flowing through the interior of the heat-source-side heat exchanger. The actuators have a first actuator for driving the compressor and a second actuator for driving the heat-source-side fluid supply unit. The storage unit stores a first relational expression showing a relationship of an amount of energy inputted to the first actuator in relation to a control target value of a temperature at which refrigerant flowing through the refrigerant circuit condenses, or information for creating the first relational expression, and a second relational expression showing a relationship of an amount of energy inputted to the second actuator in relation to a control target value of the condensing temperature, or information for creating the second relational expression. The refrigerant state quantity acquisition means acquires the current value of the temperature at which refrigerant flowing through the refrigerant circuit condenses. The control unit obtains, on the basis of the first relational expression and the second relational expression, the sum of the energy inputted to the first actuator and the second actuator for the postulated case that a change has been made from the current condensing temperature, and the sum of the amount of change in the inputted energy. The control unit updates the control target value of the condensing temperature so that the sum of the energy inputted to the first actuator and the second actuator is less than the current level or so that the sum of the amount of change of energy inputted to the first actuator and the second actuator is a low value. The control unit controls the second actuator when the usage-side heat exchanger functions as an evaporator and controls the first actuator when the usage side heat exchanger functions as a condenser, so that the current value of the condensing temperature acquired by the refrigerant state quantity acquisition means approximates the updated control target value of the condensing temperature. The refrigeration cycle system may be configured to allow selective switching between "when the usage-side heat exchanger functions as an evaporator" and "when the usage-side heat exchanger functions as a condenser," or may be configured so as to only allow for "when the usage-side heat exchanger functions as an evaporator," or may be configured so as to only allow for "when the usage-side heat exchanger functions as a condenser." The refrigerant state quantity acquisition means is not particularly limited; e.g., a pressure sensor may be disposed in the refrigerant circuit in a position where the refrigerant condenses, and the refrigerant state quantity may be acquired as a saturation temperature corresponding to the pressure ascertained by the pressure sensor, or a temperature sensor may be disposed in a portion where condensing occurs and the refrigerant state quantity may be acquired as the temperature detected by the temperature sensor.

With this refrigeration cycle system, control is carried out with focus on the total amount of input energy or the change thereof when a change has been made from the current condensing temperature. Accordingly, the new operating state can be rapidly stabilized because fluctuation in the control target value of the condensing temperature is low in relation to capacity fluctuation, even in the postulated case that the capacity requested in the heat exchanger has changed considerably.

The refrigeration cycle system according to a fourth aspect of the present invention is the refrigeration cycle system according to the third aspect, wherein the heat-source-side heat exchanger is provided in plurality. A plurality of compressors are provided so as to correspond to the plurality of heat-source-side heat exchangers. The heat-source-side fluid supply unit is provided in plurality so as to correspond to the plurality of heat-source-side heat exchangers. The first actuator is provided in plurality so as to correspond to the plurality of compressors. The second actuator is provided in plurality so as to correspond to the plurality of heat-source-side fluid supply units. The storage unit stores, for each of the plurality of first actuators, the first relational expression or information for creating the first relational expression, and stores, for each of the plurality of second actuators, the second relational expression or information for creating the second relational expression. The control unit obtains, on the basis of a plurality of first relational expressions and a plurality of second relational expressions, the sum of the energy inputted to the plurality of first actuators and the plurality of second actuators for the postulated case that a change has been made from the current condensing temperature, or the sum of the amount of change in the inputted energy. The control unit updates the control target value of the condensing temperature so that the sum of the energy inputted to the plurality of first actuators and the plurality of second actuators is less than the current level or so that the sum of the amount of change of energy inputted to the plurality of first actuators and the plurality of second actuators is a low value. The control unit controls the plurality of second actuators so that the current value of the condensing temperature acquired by the refrigerant state quantity acquisition means approximates the updated control target value of the condensing temperature.

With this refrigeration cycle system, a plurality of first actuators and a plurality of second actuators are provided so as to correspond to the plurality of heat-source-side fluid supply units. Thus, even when a plurality of three or more actuators are provided, energy-saving control can be carried out without an accompanying increase in the computational processing load, by merely providing, for each actuator on an individual basis, a relational expression showing the relationship of the amount of energy inputted to the actuators in relation to the control target value of the condensing temperature, or information for creating a relational expression showing the relationship of the amount of energy inputted to the actuators in relation to the control target value of the condensing temperature, and storing the relational expression or the information for creating a relational expression in a storage unit.

Ordinarily, the input energy required by the compressor is greater than the input energy required by the fan or other fluid supply unit, and the input energy to the compressor constitutes a majority of the total amount of input energy. However, in a system in which a plurality of fluid supply units are provided, a plurality of second actuators for driving the fluid supply units are also present, and when the number of second actuators is high, the input energy to the heat-source-side fluid supply units constitutes a higher ratio of the total amount of input energy. Accordingly, the effect of reducing the total amount of input energy can be more adequately attained by the above-described control.

The refrigeration cycle system according to a fifth aspect of the present invention is the refrigeration cycle system according to the third or fourth aspect, wherein the control unit calculates the sum of the amount of change in the energy inputted to the first actuator and the second actuator for the postulated case that a change has been made from the current condensing temperature, by obtaining and totaling for each of the actuators a value attained by substituting the current condensing temperature into a formula attained from a first-order differential of the relational expression for each of the actuators on the basis of the condensing temperature.

Values are obtained and totaled for each relational expression in the case that a plurality of first actuators and/or second actuators are present.

With this refrigeration cycle system, it is possible to readily ascertain the directionality and magnitude of the change in input energy to the actuators when a change is to be made from the current condensing temperature. It thereby becomes possible to update the target condensing temperature with consideration given to the directionality and extent of increase or decrease in the change in input energy to the actuators when a change is to be made from the current condensing temperature, and energy-saving control can be carried out with greater precision.

The refrigeration cycle system according to a sixth aspect of the present invention is the refrigeration cycle system according to any of the third to fifth aspects, wherein the control unit updates the control target value of the condensing temperature and thereafter further updates the control target value of the condensing temperature when predetermined standby conditions have been satisfied.

With this refrigeration cycle system, further update to the control target value of the condensing temperature is not carried out until predetermined standby conditions are satisfied. Accordingly, update work can be made more significant because work for updating to a new target value can be carried out after the state of the refrigeration cycle system has adequately changed.

The refrigeration cycle system according to a seventh aspect of the present invention is the refrigeration cycle system according to the first or second aspect, further comprising: a heat-source-side fluid supply unit for supplying a fluid for exchanging heat with a refrigerant flowing through the interior of the heat-source-side heat exchanger, and a usage-side fluid supply unit for supplying a fluid for exchanging heat with a refrigerant flowing through the interior of the usage-side heat exchanger. The actuators have a third actuator for driving the compressor, a fourth actuator for driving the usage-side fluid supply unit, and a fifth actuator for driving the heat-source-side fluid supply unit. The storage unit stores a third relational expression showing a relationship of an amount of energy inputted to the third actuator in relation to a control target value of a temperature at which refrigerant flowing through the refrigerant circuit evaporates, or information for creating the third relational expression; and a fourth relational expression showing a relationship of an amount of energy inputted to the fourth actuator in relation to a control target value of the evaporation temperature, or information for creating the fourth relational expression. The refrigerant state quantity acquisition means acquires the current value of the temperature at which refrigerant flowing through the refrigerant circuit evaporates. The control unit obtains, on the basis of the third relational expression and the fourth relational expression, the sum of the energy inputted to the third actuator and the fourth actuator for the postulated case that a change has been made from the current evaporation temperature, or the sum of the amount of change in the inputted energy. The control unit updates the control target value of the evaporation temperature so that the sum of the energy inputted to the third actuator and the fourth actuator is less than the current level or so that the sum of the amount of change of energy inputted to the third actuator and the fourth actuator is a low value. The control unit controls the third actuator when the usage-side heat exchanger functions as an evaporator and controls the fifth actuator when the usage-side heat exchanger functions as a condenser, so that the current value of the evaporation temperature acquired by the refrigerant state quantity acquisition means approximates the updated control target value of the evaporation temperature. The refrigeration cycle system may be configured to allow selective switching between "when the usage-side heat exchanger functions as an evaporator" and "when the usage-side heat exchanger functions as a condenser," or may be configured so as to only allow for "when the usage-side heat exchanger functions as an evaporator," or may be configured so as to only allow for "when the usage-side heat exchanger functions as a condenser." The refrigerant state quantity acquisition means is not particularly limited, and, e.g., a pressure sensor may be disposed in the refrigerant circuit in a position where the refrigerant evaporates, and the refrigerant state quantity may be acquired as a saturation temperature corresponding to the pressure ascertained by the pressure sensor, or a temperature sensor may be disposed in a portion where evaporation occurs and the refrigerant state quantity may be acquired as the temperature detected by the temperature sensor.

With this refrigeration cycle system, control is carried out with focus on the total amount of input energy or the change thereof when a change has been made from the current evaporation temperature. Accordingly, the new operating state can be rapidly stabilized because fluctuation in the control target value of the evaporation temperature is low in relation to capacity fluctuation, even in the postulated case that the capacity requested in the heat exchanger has changed considerably.

The refrigeration cycle system according to an eighth aspect of the present invention is the refrigeration cycle system according to the seventh aspect, wherein the usage-side heat exchanger is provided in plurality. The usage-side fluid supply unit is also provided in plurality so as to correspond to the plurality of usage-side heat exchangers. The fourth actuator is provided in plurality so as to correspond to the plurality of usage-side fluid supply units. The storage unit stores the fourth relational expression or information for creating the fourth relational expression for each of the plurality of fourth actuators. The control unit obtains, on the basis of the third relational expression and a plurality of the fourth relational expressions, the sum of or the sum of the amount of change in the energy inputted to the third actuator and the plurality of fourth actuators for the postulated case that a change has been made from the current evaporation temperature. The control unit updates the control target value of the evaporation temperature so that the sum of the energy inputted to the third actuator and the plurality of fourth actuators is less than the current level or so that the sum of the amount of change of energy inputted to the third actuator and the plurality of fourth actuators is a low value. The control unit controls the third actuator when the usage-side heat exchangers function as evaporators and controls the fifth actuator when the usage-side heat exchangers function as condensers, so that the current value of the evaporation temperature acquired by the refrigerant state quantity acquisition means approximates the updated control target value of the evaporation temperature. The refrigeration cycle system may be configured to allow selective switching between "when the usage-side heat exchangers function as evaporators" and "when the usage-side heat exchangers function as condensers," or may be configured so as to only allow for "when the usage-side heat exchangers function as evaporators," or may be configured so as to only allow for "when the usage-side heat exchangers function as condensers." In this case, the third actuator may be present in plurality' in the same manner as the fourth actuator, and the storage unit may store the third relational expression or information for creating the third relational expression for each of the plurality of third actuators.

With this refrigeration cycle system, a plurality of fourth actuators is provided so as to correspond to the plurality of usage-side fluid supply units. Thus, even when a plurality of three or more actuators are provided, energy-saving control can be carried out without an accompanying increase in the computational processing load, by merely providing, for each actuator on an individual basis, a relational expression or information for creating a relational expression showing the relationship of the amount of energy inputted to the actuators in relation to the control target value of the evaporation temperature, and storing the relational expression or the information for creating the relational expression in a storage unit.

Ordinarily, the input energy required by the compressor is greater than the input energy required by the fan or other fluid supply unit, and the input energy to the compressor constitutes a majority of the total amount of input energy.

However, in a system in which a plurality of fluid supply units are provided, a plurality of fourth actuators for driving the fluid supply units are also present, and when the number of fourth actuators is high, the input energy to the usage-side fluid supply units constitutes a higher ratio of the total amount of input energy. Accordingly, the effect of reducing the total amount of input energy can be more adequately attained by the above-described control.

The refrigeration cycle system according to a ninth aspect of the present invention is the refrigeration cycle system according to the seventh or eighth aspects, wherein the control unit calculates the sum of the amount of change in the energy inputted to the third actuator and the fourth actuator for the postulated case that a change has been made from the current evaporation temperature, by obtaining and totaling for each of the actuators a value attained by substituting the current evaporation temperature into a formula attained from a first-order differential of the relational expression for each of the actuators on the basis of the evaporation temperature.

With this refrigeration cycle system, it is possible to readily ascertain the directionality and magnitude of the change in input energy to the actuators when a change is to be made from the current evaporation temperature. It thereby becomes possible to update the target evaporation temperature with consideration given to the directionality and extent of increase or decrease in the change in input energy to the actuators when a change is to be made from the current evaporation temperature, and energy-saving control can be carried out with greater precision.

The refrigeration cycle system according to a tenth aspect of the present invention is the refrigeration cycle system according to any of the seventh to ninth aspects, wherein the control unit updates the control target value of the evaporation temperature and thereafter further updates the control target value of the evaporation temperature when predetermined standby conditions have been satisfied.

With this refrigeration cycle system, further update to the control target value of the evaporation temperature is not carried out until predetermined standby conditions are satisfied. Accordingly, update work can be made more significant because work for updating to a new target value can be carried out after the state of the refrigeration cycle system has adequately changed.

The refrigeration cycle system according to an eleventh aspect of the present invention is the refrigeration cycle system according to the first or second aspects, further comprising a heat-source-side fluid supply unit and a usage-side fluid supply unit. The heat-source-side fluid supply unit supplies a fluid for exchanging heat with a refrigerant flowing through the interior of the heat-source-side heat exchanger. The usage-side fluid supply unit supplies a fluid for exchanging heat with a refrigerant flowing through the interior of the usage-side heat exchanger. The actuators have a sixth actuator for driving the compressor, a seventh actuator for driving the heat-source-side fluid supply unit, and an eighth actuator for driving the usage-side fluid supply unit. The storage unit stores a sixth condensing relational expression showing a relationship of an amount of energy inputted to the sixth actuator in relation to a control target value of a temperature at which refrigerant flowing through the refrigerant circuit condenses, or information for creating the sixth condensing relational expression; a sixth evaporation relational expression showing a relationship of an amount of energy inputted to the sixth actuator in relation to a control target value of the temperature at which refrigerant flowing through the refrigerant circuit evaporates, or information for creating the sixth evaporation relational expression; a seventh relational expression showing a relationship of an amount of energy inputted to the seventh actuator in relation to a control target value of a condensing temperature, or information for creating the seventh relational expression; and an eighth relational expression showing a relationship of an amount of energy inputted to the eighth actuator in relation to a control target value of the evaporation temperature, or information for creating the eighth relational expression. The refrigerant state quantity acquisition means acquires the current value of the condensing temperature and the current value of the evaporation temperature of the refrigerant flowing through the refrigerant circuit. The control unit obtains, on the basis of the sixth condensing relational expression and the seventh relational expression, the sum of the amount of change in the energy inputted to the sixth actuator and the seventh actuator for the postulated case that a change has been made from the current condensing temperature, and calculates three condensing temperature-related values attained by multiplication with the value attained from the relational expression related to the condensing temperature, the negative value of the value, and 0. The control unit obtains, on the basis of the sixth evaporation relational expression and the eighth relational expression, the sum of the amount of change in the energy inputted to the sixth actuator and the eighth actuator for the postulated case that a change has been made from the current evaporation temperature, and calculates three evaporation temperature-related values attained by multiplication with the value attained from the relational expression related to the evaporation temperature, the negative value of the value, and 0. The control unit specifies a combination having a minimum value among combinations of the sums of the three condensing temperature-related values and the three evaporation temperature-related values. The control unit updates the control target value of the condensing temperature and the control target value of the evaporation temperature by having the condensing temperature-related value and the evaporation temperature-related value of the specified combination reflected in the current condensing temperature and the current evaporation temperature, respectively. When the usage-side heat exchanger functions as an evaporator, the control unit controls the seventh actuator so that the current value of the condensing temperature acquired by the refrigerant state quantity acquisition means reaches the updated control target value of the condensing temperature, while controlling the sixth actuator so that the current value of the evaporation temperature acquired by the refrigerant state quantity acquisition means reaches the updated control target value of the evaporation temperature. When the usage-side heat exchanger functions as a condenser, the control unit controls the sixth actuator so that the current value of the condensing temperature acquired by the refrigerant state quantity acquisition means reaches the updated control target value of the condensing temperature, while controlling the seventh actuator so that the current value of the evaporation temperature acquired by the refrigerant state quantity acquisition means reaches the updated control target value of the evaporation temperature. The refrigeration cycle system may be configured to allow selective switching between "when the usage-side heat exchanger functions as an evaporator" and "when the usage-side heat exchanger functions as a condenser," or may be configured so as to only allow for "when the usage-side heat exchanger functions as an evaporator," or may be configured so as to only allow for "when the usage-side heat exchanger functions as a condenser," The refrigerant state quantity acquisition means is not particularly limited, and, e.g., a pressure sensor may be disposed in the refrigerant circuit in a position where the refrigerant condenses, and the refrigerant state quantity may be acquired as a saturation temperature corresponding to the pressure ascertained by the pressure sensor, or a temperature sensor may be disposed in a portion where condensing occurs and the refrigerant state quantity may be acquired as the temperature detected by the temperature sensor. Also, in relation to the evaporation temperature, a pressure sensor may be disposed in the refrigerant circuit in a position where the refrigerant evaporates, and the refrigerant state quantity may be acquired as a saturation temperature corresponding to the pressure ascertained by the pressure sensor, or a temperature sensor may be disposed in a portion where evaporation occurs and the refrigerant state quantity may be acquired as the temperature detected by the temperature sensor.

With this refrigeration cycle system, control is carried out with focus on the total amount of input energy or the change thereof when the current condensing temperature and evaporation temperature have been changed. Accordingly, the new operating state can be rapidly stabilized because fluctuation in the control target value of the condensing temperature and fluctuation in the control target value of the evaporation temperature are low in relation to capacity fluctuation, even in the postulated case that the capacity requested in the heat exchanger has changed considerably.

The refrigeration cycle system according to a twelfth aspect of the present invention is the refrigeration cycle system according to the eleventh aspect, wherein the heat-source-side heat exchanger is provided in plurality. A plurality of compressors are provided so as to correspond to the plurality of heat-source-side heat exchangers. A plurality of heat-source-side fluid supply units are provided so as to correspond to the plurality of heat-source-side heat exchangers. The sixth actuator is provided in plurality so as to correspond to the plurality of compressors. The seventh actuator is provided in plurality so as to correspond to the plurality of heat-source-side fluid supply units. The storage unit stores the sixth condensing relational expression or information for creating the sixth condensing relational expression for each of the plurality of sixth actuators, stores the sixth evaporation relational expression or information for creating the sixth evaporation relational expression for each of the plurality of sixth actuators, and stores the seventh relational expression or information for creating the seventh relational expression for each of the plurality of seventh actuators. The control unit obtains, on the basis of the plurality of sixth condensing relational expressions and the plurality of seventh relational expressions, the sum of the amount of change in the energy inputted to the plurality of sixth actuators and the plurality of seventh actuators for the postulated case that a change has been made from the current condensing temperature, and thereby calculates three condensing temperature-related values attained by multiplication with the value attained from the relational expression related to the condensing temperature, the negative value of the value, and 0. The control unit obtains, on the basis of the plurality of sixth evaporation relational expressions and the plurality of eighth relational expressions, the sum of the amount of change in the energy inputted to the plurality of sixth actuators and the plurality of eighth actuators for the postulated case that a change has been made from the current evaporation temperature, and thereby calculates three evaporation temperature-related values attained by multiplication with the value attained from the relational expression related to the evaporation temperature, the negative value of the value, and 0. The control unit specifies a combination having a minimum value among combinations of the sums of the three condensing temperature-related values and the three evaporation temperature-related values. The control unit updates the control target value of the condensing temperature and the control target value of the evaporation temperature by having the condensing temperature-related value and the evaporation temperature-related value of the specified combination reflected in the current condensing temperature and the current evaporation temperature, respectively. When the usage-side heat exchanger functions as an evaporator, the control unit controls the seventh actuator so that the current value of the condensing temperature acquired by the refrigerant state quantity acquisition means reaches the updated control target value of the condensing temperature, while controlling the sixth actuator so that the current value of the evaporation temperature acquired by the refrigerant state quantity acquisition means reaches the updated control target value of the evaporation temperature. When the usage-side heat exchanger functions as a condenser, the control unit controls the sixth actuator so that the current value of the condensing temperature acquired by the refrigerant state quantity acquisition means reaches the updated control target value of the condensing temperature, while controlling the seventh actuator so that the current value of the evaporation temperature acquired by the refrigerant state quantity acquisition means reaches the updated control target value of the evaporation temperature. The refrigeration cycle system may be configured to allow selective switching between "when the usage-side heat exchanger functions as an evaporator" and "when the usage-side heat exchanger functions as a condenser," or may be configured so as to only allow for "when the usage-side heat exchanger functions as an evaporator," or may be configured so as to only allow for "when the usage-side heat exchanger functions as a condenser."

In this case, the eighth actuator may be present in plurality in the same manner as the seventh actuator, and the storage unit may store the eighth relational expression or information for creating the eighth relational expression for each of the plurality of eighth actuators.

With this refrigeration cycle system, a plurality of sixth actuators and a plurality of seventh actuators are provided so as to correspond to the plurality of heat-source-side fluid supply units. Thus, even when three or more actuators are provided, energy-saving control can be carried out without an accompanying increase in the computational processing load, by merely providing, for each actuator on an individual basis, a relational expression showing the relationship of the amount of energy inputted to the actuator in relation to the control target value of the condensing temperature, or information for creating a relational expression showing the relationship of the amount of energy inputted to the actuators in relation to the control target value of the condensing temperature, and a relational expression showing the relationship of the amount of energy inputted to the actuator in relation to the control target value of the evaporation temperature, or information for creating a relational expression showing the relationship of the amount of energy inputted to the actuators in relation to the control target value of the evaporation temperature, and storing the relational expression or the information for creating the relational expression in a storage unit.

Ordinarily, the input energy required by the compressor is greater than the input energy required by the fan or other fluid supply unit, and the input energy to the compressor constitutes a majority of the total amount of input energy.

However, in a system in which a plurality of fluid supply units are provided, a plurality of seventh actuators for driving the fluid supply units are also present, and when the number of seventh actuators is high, the input energy to the usage-side fluid supply units constitutes a higher ratio of the total amount of input energy. Accordingly, the effect of reducing the total amount of input energy can be more adequately attained by the above-described control.

The refrigeration cycle system according to a thirteenth aspect of the present invention is the refrigeration cycle system according to the eleventh aspect, wherein the usage-side heat exchanger is provided in plurality. The usage-side fluid supply unit is also provided in plurality so as to correspond to the plurality of usage-side heat exchangers. The eighth actuator is provided in plurality so as to correspond to the plurality of usage-side fluid supply units. The storage unit stores the eighth relational expression or information for creating the eighth relational expression for each of the plurality of eighth actuators. The control unit obtains, on the basis of the sixth condensing relational expression and the seventh relational expression, the sum of the amount of change in the energy inputted to the sixth actuator and the seventh actuator for the postulated case that a change has been made from the current condensing temperature, and thereby calculates three condensing temperature-related values attained by multiplication with the value attained from the relational expression related to the condensing temperature, the negative value of the value, and 0. The control unit obtains, on the basis of the sixth evaporation relational expression and the plurality of eighth relational expressions, the sum of the amount of change in the energy inputted to the sixth actuator and the plurality of eighth actuators for the postulated case that a change has been made from the current evaporation temperature, and thereby calculates three evaporation temperature-related values attained by multiplication with the value attained from the relational expression related to the evaporation temperature, the negative value of the value, and 0. The control unit specifies a combination having a minimum value among combinations of the sums of the three condensing temperature-related values and the three evaporation temperature-related values. The control unit updates the control target value of the condensing temperature and the control target value of the evaporation temperature by having the condensing temperature-related value and the evaporation temperature-related value of the specified combination reflected in the current condensing temperature and the current evaporation temperature, respectively. When the usage-side heat exchanger functions as an evaporator, the control unit controls the seventh actuator so that the current value of the condensing temperature acquired by the refrigerant state quantity acquisition means reaches the updated control target value of the condensing temperature, while controlling the sixth actuator so that the current value of the evaporation temperature acquired by the refrigerant state quantity acquisition means reaches the updated control target value of the evaporation temperature. When the usage-side heat exchanger functions as a condenser, the control unit controls the sixth actuator so that the current value of the condensing temperature acquired by the refrigerant state quantity acquisition means reaches the updated control target value of the condensing temperature, while controlling the seventh actuator so that the current value of the evaporation temperature acquired by the refrigerant state quantity acquisition means reaches the updated control target value of the evaporation temperature. The refrigeration cycle system may be configured to allow selective switching between "when the usage-side heat exchanger functions as an evaporator" and "when the usage-side heat exchanger functions as a condenser," or may be configured so as to only allow for "when the usage-side heat exchanger functions as an evaporator," or may be configured so as to only allow for "when the usage-side heat exchanger functions as a condenser."

With this refrigeration cycle system, a plurality of eighth actuators are provided so as to correspond to the plurality of usage-side fluid supply units. Thus, even when a plurality of three or more actuators are provided, energy-saving control can be carried out without an accompanying increase in the computational processing load, by merely providing, for each actuator on an individual basis, a relational expression showing the relationship of the amount of energy inputted to the actuator in relation to the control target value of the condensing temperature, or information for creating a relational expression showing the relationship of the amount of energy inputted to the actuators in relation, to the control target value of the condensing temperature, and a relational expression showing the relationship of the amount of energy inputted to the actuator in relation, to the control target value of the evaporation temperature, or information for creating a relational expression showing the relationship of the amount of energy inputted to the actuators in relation to the control target value of the evaporation temperature, and storing the relational expression or the information, for creating the relational expression in a storage unit.

Ordinarily, the input energy required by the compressor is greater than the input energy required by the fan or other fluid supply unit, and the input energy to the compressor constitutes a majority of the total amount of input energy. However, in a system in which a plurality of fluid supply units are provided, a plurality of eighth actuators for driving the fluid supply units are also present, and when the number of eighth actuators is high, the input energy to the usage-side fluid supply units constitutes a higher ratio of the total amount of input energy. Accordingly, the effect of reducing the total amount of input energy can be more adequately attained by the above-described control.

The refrigeration cycle system according to a fourteenth aspect of the present invention is the refrigeration cycle system according to any of the eleventh to thirteenth aspects, wherein the control unit calculates the sum of the amount of change in the energy inputted to the sixth actuator and the seventh actuator for the postulated case that a change has been made from the current condensing temperature, by obtaining and totaling for each of the actuators a value attained by substituting the current condensing temperature into a formula attained from a first-order differential of the relational expression for each of the actuators on the basis of the condensing temperature. The control unit calculates the sum of the amount of change in the energy inputted to the sixth actuator and the eighth actuator for the postulated case that a change has been made from the current evaporation temperature, by obtaining and totaling for each of the actuators a value attained by substituting the current evaporation temperature into a formula attained from a first-order differential of the relational expression for each of the actuators on the basis of the evaporation temperature.

With this refrigeration cycle system, it is possible to readily ascertain the directionality and magnitude of the change in input energy to the actuators when a change is to be made from the current condensing temperature and/or from the current evaporation temperature. It thereby becomes possible to update the target condensing temperature and the target evaporation temperature with consideration given to the directionality and extent of increase or decrease in the change in input energy to the actuators when a change is to be made from the current condensing temperature, and the directionality and extent of increase or decrease in the change in input energy to the actuators when a change is to be made from the current evaporation temperature, and energy-saving control can be carried out with greater precision.

The refrigeration cycle system according to a fifteenth aspect of the present invention is the refrigeration cycle system according to any of the eleventh to fourteenth aspects, wherein after updating the control target value of the condensing temperature and the control target value of the evaporation temperature, the control unit further updates the control target value of the condensing temperature and the control target value of the evaporation temperature when predetermined standby conditions have been satisfied.

With this refrigeration cycle system, further update to the control target value of the condensing temperature and the control target value of the evaporation temperature is not carried out until predetermined standby conditions are satisfied. Accordingly, update work can be made more significant because work for updating to a new target value can be carried out after the state of the refrigeration cycle system has adequately changed.

Advantageous Effects of Invention

In the refrigeration cycle system according to the first aspect of the present invention, the amount of information that must be specified in advance is reduced, the computational processing load is reduced, differences in actual installation conditions can be reflected, and it is possible to allow an operating state, in which the required total amount of input energy is minimized, to rapidly stabilize.

In the refrigeration cycle system according to the second aspect of the present invention, it is possible to ensure energy savings while minimizing the computational processing load within a range that satisfies a predetermined capacity condition.

In the refrigeration cycle system according to the third aspect of the present invention, the new operating state can be rapidly stabilized.

In the refrigeration cycle system according to the fourth aspect of the present invention, energy-saving control can be carried out without an accompanying increase in the computational processing load by merely providing a relational expression for each actuator on an individual basis and storing the relational expression in a storage unit.

In the refrigeration cycle system according to the fifth aspect of the present invention, energy-saving control can be carried out with greater precision.

In the refrigeration cycle system according to the sixth aspect of the present invention, update work can be made more significant because work for updating to a new target value can be carried out after the state of the refrigeration cycle system has adequately changed.

In the refrigeration cycle system according to the seventh aspect of the present invention, the new operating state can be rapidly stabilized.

In the refrigeration cycle system according to the eighth aspect of the present invention, energy-saving control can be carried out without an accompanying increase in the computational processing load by merely providing a relational expression for each actuator on an individual basis and storing the relational expression in a storage unit.

In the refrigeration cycle system according to the ninth aspect of the present invention, energy-saving control can be carried out with greater precision.

In the refrigeration cycle system according to the tenth aspect of the present invention, update work can be made more significant because work for updating to a new target value can be carried out after the state of the refrigeration cycle system has adequately changed.

In the refrigeration cycle system according to the eleventh aspect of the present invention, the new operating state can be rapidly stabilized.

In the refrigeration cycle system according to the twelfth aspect of the present invention, energy-saving control can be carried out without an accompanying increase in the computational processing load by merely providing a relational expression for each actuator on an individual basis and storing the relational expression in a storage unit.

In the refrigeration cycle system according to the thirteenth aspect of the present invention, energy-saving control can be carried out without an accompanying increase in the computational processing load.

In the refrigeration cycle system according to the fourteenth aspect of the present invention, energy-saving control can be carried out with greater precision.

In the refrigeration cycle system according to the fifteenth aspect of the present invention, update work can be made more significant because work for updating to anew target value can be carried out after the state of the refrigeration cycle system has adequately changed.

BRIEF DESCRIPTION OF THE DRAWINGS

FIG. 18 is a control flowchart of energy-savings control carried out by optimization of the evaporation temperature in accordance with the third embodiment.

FIG. 19 is a control flowchart of energy-savings control carried out by optimization of both the condensing temperature and the evaporation temperature in accordance with the third embodiment.

DESCRIPTION OF EMBODIMENTS (1) First Embodiment

An example of the refrigeration cycle system of a first embodiment of the present invention will be described below with reference to the drawings.

Figure 1:
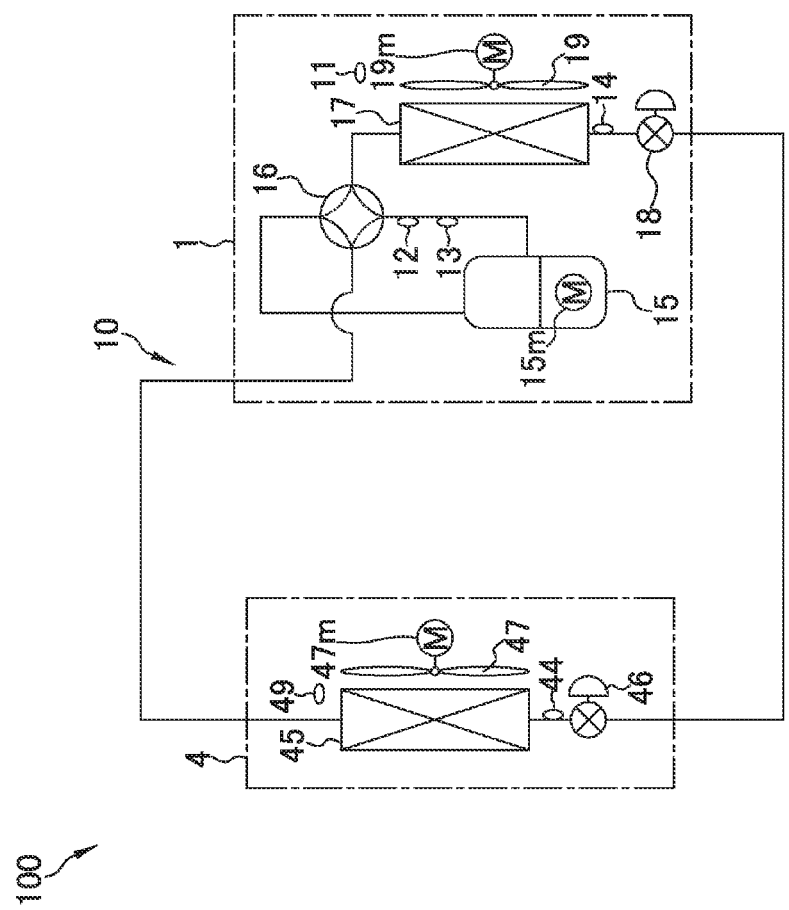
FIG. 1 is a refrigerant circuit diagram of the refrigeration cycle system according to the first embodiment.
Figure 2:
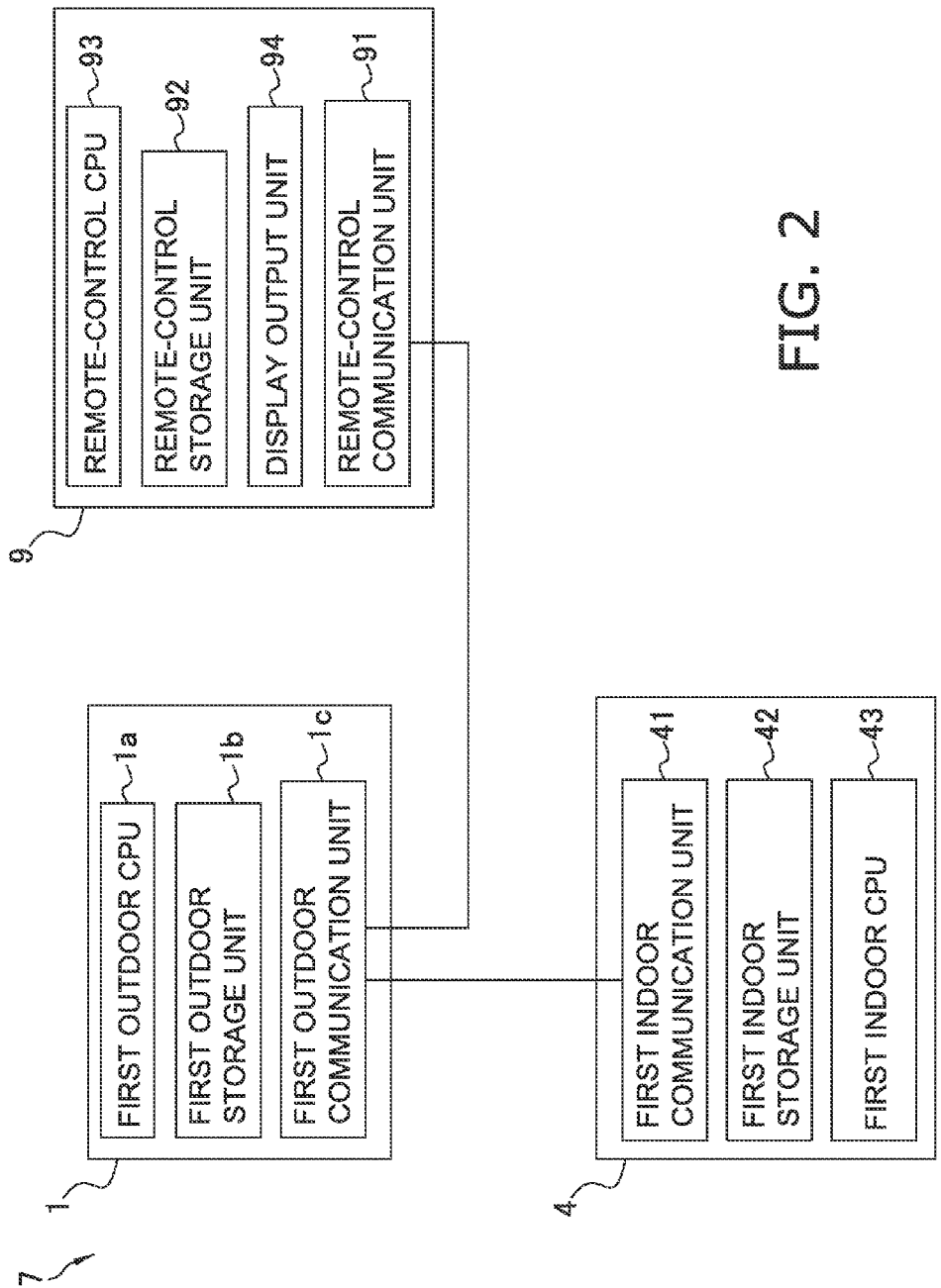
FIG. 2 is a block diagram according to the first embodiment.
Figure 3:
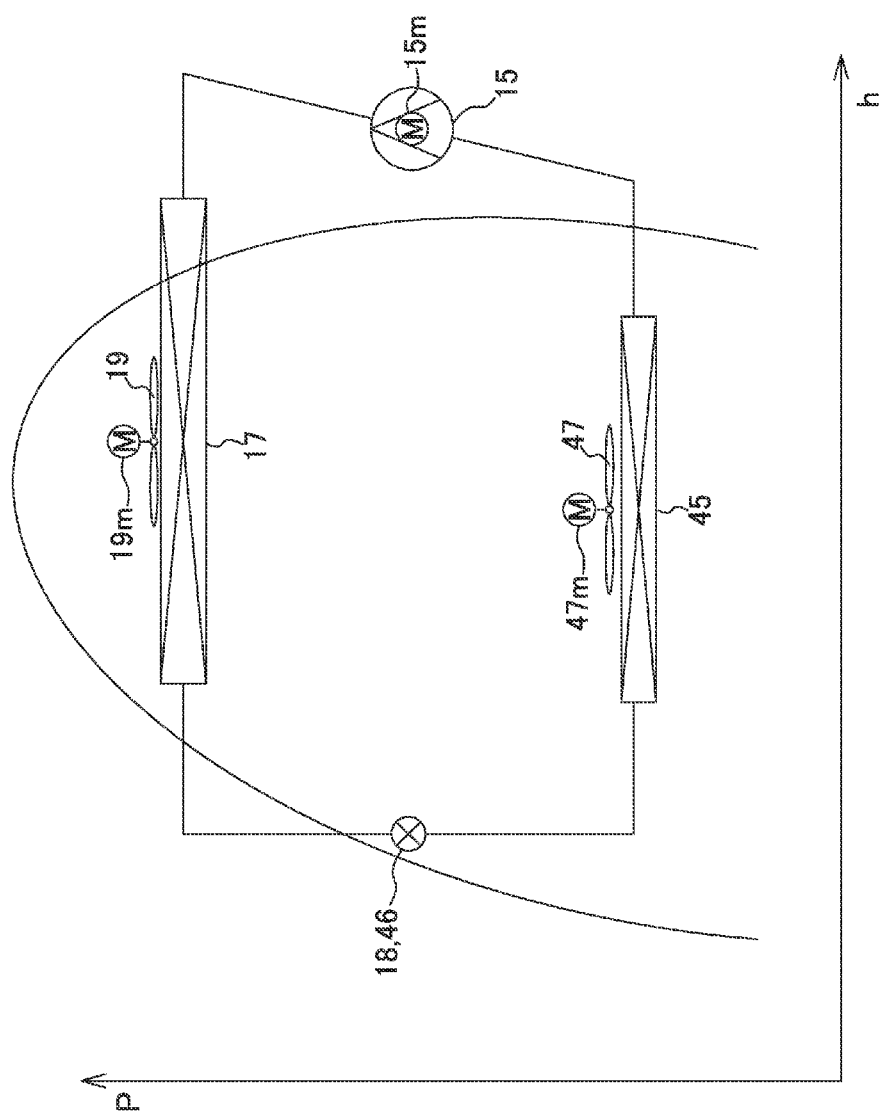
FIG. 3 is a PH diagram according to the first embodiment.

FIG. 1 shows a refrigerant circuit diagram of a refrigeration cycle system 100. FIG. 2 shows a block diagram. FIG. 3 shows a PH diagram.

(1-1) Overall Configuration of the Refrigeration Cycle System 100

The refrigeration cycle system 100 is provided with a refrigerant circuit 10, in which an outdoor unit 1 and an indoor unit 4 connected via a refrigerant communication piping.

The refrigerant circuit 10 is configured with a compressor 115, a four-way switching valve 16, an outdoor heat exchanger 17, an outdoor expansion valve 18, an indoor expansion valve 46, and an indoor heat exchanger 45 that are connected to each other. The refrigerant circuit 10 is capable of switching between and executing an air-cooling operation and an air-warming operation by using the connection state of the four-way switching valve 16. During air-cooling operation, the four-way switching valve 16 is in the connected state indicated by the solid line in FIG. 1, and a refrigeration cycle is performed in which a refrigerant is made to circulate in sequence through the compressor 15, the four-way switching valve 16, the outdoor heat exchanger 17, the outdoor expansion valve 18, the indoor expansion valve 46, the indoor heat exchanger 45, the four-way switching valve 16, and the compressor 115. The four-way switching valve 16 is in the connection state indicated by the dotted line during air-warming operation.

Figure 4:
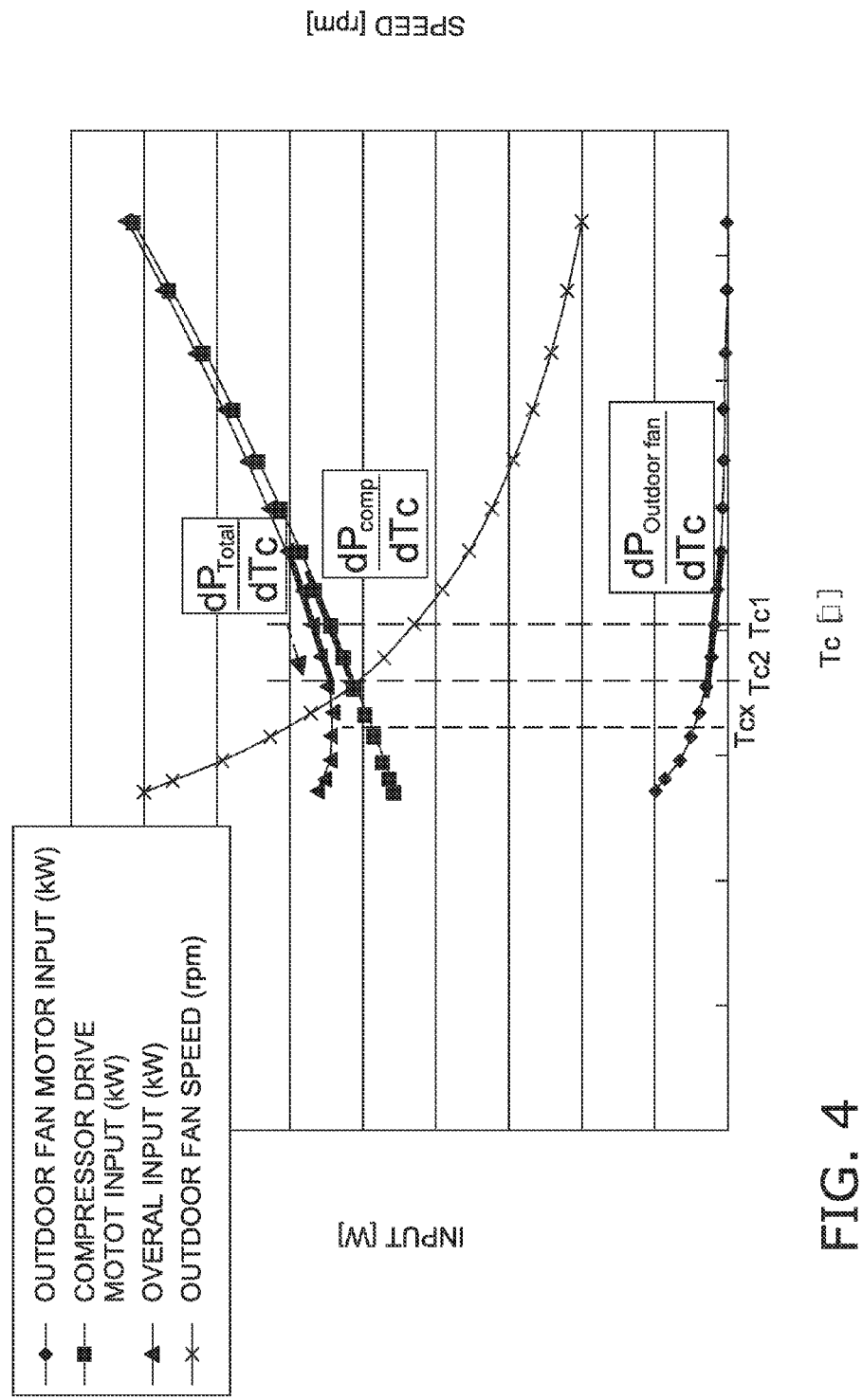
FIG. 4 is a diagram of energy-savings control using the first-order differentiation technique in accordance with the first embodiment.

Not only are the compressor 15, the four-way switching valve 16, the outdoor heat exchanger 17, and the outdoor expansion valve 18 described above disposed inside the outdoor unit 1, but also disposed therein are an outdoor fan 19, an outdoor temperature sensor 11, a discharge refrigerant temperature sensor 12, a discharge refrigerant pressure sensor 13, and an outdoor heat exchanger temperature sensor 14. A compressor drive motor 15m, an outdoor fan motor 19m, a first outdoor CPU 1a, a first outdoor storage unit 1b, and a first outdoor communication unit 1c are furthermore disposed inside the outdoor unit 1. The outdoor temperature sensor 11 detects the temperature of outdoor air prior to its passage through the interior of the outdoor heat exchanger 17, and sends information about the outdoor temperature to the first outdoor CPU 1a. The discharge refrigerant temperature sensor 12 detects the temperature of refrigerant flowing through the discharge side of the compressor 15, and sends information about the discharge refrigerant temperature to the first outdoor CPU 1a. The discharge refrigerant pressure sensor 13 detects the pressure of refrigerant flowing through the discharge side of the compressor 15, and sends information about the discharge refrigerant pressure to the first outdoor CPU 1a. The outdoor heat exchanger temperature sensor 14 detects the temperature of refrigerant flowing through the interior of the outdoor heat exchanger 17, and sends information about the outdoor heat exchanger temperature to the first outdoor CPU 1a. The compressor drive motor 15m is an actuator for the compressor 15, the outdoor fan motor 19m is an actuator for the outdoor fan 19, and these motors are driven under the control of the first outdoor CPU 1a. The first outdoor communication unit 1c is connected to a first indoor communication unit 41 in the indoor unit 4 and to a remote-control communication unit 91 of a controller 9 via a transmission line, and carries out information exchange. A relational expression of the input energy to the outdoor fan motor 19m in relation to the condensing temperature Tc, a relational expression of the input energy to the compressor drive motor 15m in relation to the condensing temperature Tc, a relational expression of the input energy to the compressor drive motor 15m in relation to the evaporation temperature Te, and other relational expressions are stored in the first outdoor storage unit 1b and are used in energy-saving control carried out by a later-described control unit 7. In FIG. 4, the line connecting the plot of diamond shapes shows the relational expression for the case in which the horizontal axis represents the condensing temperature Tc and the vertical axis represents the input energy P to the outdoor fan motor 19m. Also in FIG. 4, the line connecting the plot of squares shows the relational expression for the case in which the horizontal axis represents the condensing temperature Tc and the vertical axis represents the input energy P to the compressor drive motor 15m. The line connecting the plot of triangles in FIG. 4 shows the relational expression for the case in which the horizontal axis represents the condensing temperature Tc and the vertical axis represents the total of the input energy P to the outdoor fan motor 19m and the input energy P to the compressor drive motor 15m. Furthermore, the line connecting the plot of × marks in FIG. 4 shows the relational expression fir the case in which the horizontal axis represents the condensing temperature Tc and the vertical axis represents the rotating speed (rpm) of the outdoor fan motor 19m so as to correspond to the line connecting the plot of diamond shapes. In this example, total of the input energy can be minimized when the condensing temperature is at a minimum condensing temperature Tex, but there are cases in which a target condensing temperature cannot be brought to the minimum condensing temperature Tex because consideration is given to constraints and the like related to later described capacity maintenance.

The method for specifying the relational expression of the input energy to the outdoor fan motor 19m in relation to the condensing temperature Tc is not particularly limited; it being possible to specify the relational expression in the manner of, e.g., formula (1) below.

$$\frac{dP_{Outdoor fan}}{dTc} = \frac{dP_{Outdoor fan}}{dN} \cdot \frac{dN}{dGa} \cdot \frac{dGa}{dTc} \quad \langle \text{Formula 1} \rangle$$

In the formula, the term $dP_{Outdoor\ fan}/dN$ can be obtained by differentiating a fan input characteristic formula (e.g., $P_{Outdoor\ fan} = C_1 N^3 + C_2 N^2 + C_3 N$), which is established by each performance of the outdoor fan motor 19m, at a rotating speed N.

The term dN/dGa can be obtained by differentiating the fan airflow volume characteristic formula (in the scope considered in the present embodiment, the rotating speed N and the airflow volume Ga can be regarded as being in a proportional relationship), which is determined by each type of outdoor fan 19 at an airflow volume Ga.

The term dGa/Tc can be obtained by differentiating the heat exchanger characteristics formula (a relational expression established by the relationship of ΔT× airflow volume Ga ∂ capacity, where ΔT is the difference between the temperature of the refrigerant that flows through the heat exchanger and the temperature of air that flows around the heat exchanger (i.e., a proportionality coefficient×the temperature difference ΔT, which is the difference between the temperature of the refrigerant that flows through the heat exchanger and the temperature of the air that flows around the heat exchanger, × airflow volume Ga)) at the condensing temperature Tc under conditions of constant capacity (Q=const).

The relational expression itself of the input energy to the outdoor fan motor 19m in relation to the condensing temperature Tc is not required to be stored in the first outdoor storage unit 1b, and, e.g., the fan input characteristic formula (e.g., $P_{Outdoor\ fan} = C_1 N^3 + C_2 N^2 + C_3 N$), the fan airflow volume characteristic formula, and the heat exchanger characteristic formula may be stored (first information may be stored) in the first outdoor storage unit 1b or in another location. The control unit 7 may process these formulas in the form of information to thereby produce a relational expression of the input energy to the outdoor fan motor 19m in relation to the condensing temperature Tc.

The method for specifying the relational expression of the input energy to the compressor drive motor 15m in relation to the condensing temperature Tc is not particularly limited; it being possible to specify the relational expression in the manner of, e.g., formula (2) below.

$$\frac{dP_{Comp}}{dTc} = fc(R, Te, Tc) \qquad \langle \text{Formula 2} \rangle$$

In the formula, the term fc(R, Te, Tc) can be expressed as a regression formula that includes the drive frequency ft (r/min) of the compressor, the evaporation temperature Te, and the condensing temperature Tc as parameters, and the formula can be differentiated using the condensing temperature Tc and/or the evaporation temperature Te. The regression formula may be expressed by furthermore using the degree of superheating SH as a parameter.

The relational expression of the input energy to the compressor drive motor 15m in relation to the condensing temperature Tc can be established, as appropriate, by a person skilled in the art by experimentation using a refrigeration cycle and a computer with consideration given to, e.g., the fact that: an increase in input energy is required in commensurate fashion to a higher drive frequency; an increase in the energy inputted to the compressor drive motor 15m is required in commensurate fashion to greater differential pressure between the intake pressure and the discharge pressure of the compressor 15 (i.e., in commensurate fashion to a greater compression ratio); the saturation temperature of the refrigerant at the discharge pressure is related to the condensing temperature Tc; and the saturation temperature of the refrigerant at the intake pressure is related to the evaporation temperature Te. The relational expression of the input energy to the compressor drive motor 15m in relation to the condensing temperature Tc can be expressed as a polynomial expression that includes the condensing temperature Tc and the evaporation temperature Te as parameters, and the relational expression can be differentiated using the condensing temperature Tc and the evaporation temperature Te.

The method for specifying the relational expression of the input energy to the compressor drive motor 15m in relation to the evaporation temperature Te is not particularly limited; it being possible to specify the relational expression in the manner of, e.g., formula (3) below.

$$\frac{dP_{Comp}}{dTe} = fe(R, Te, Tc) \qquad \langle \text{Formula 3} \rangle$$

In the formula, the term fe(R, Te, Tc) can be expressed as a regression formula that includes the drive frequency R (r/min) of the compressor, the evaporation temperature Te, and the condensing temperature Tc as parameters, and the formula can be differentiated using the condensing temperature Tc and/or the evaporation temperature Te. The regression formula may be expressed by furthermore using the degree of superheating SFr as a parameter.

The term fc R, Te, Tc) and the term fe(R, Te, Tc) may be expressed as the same regression formula.

Not only are the indoor expansion valve 46 and the indoor heat exchanger 45 disposed in the indoor unit 4, but also disposed therein are an indoor fan 47, an indoor heat exchanger temperature sensor 44, and an indoor temperature sensor 49. An indoor fan motor 47m, a first indoor communication unit 41, a first indoor storage unit 42, and a first indoor CPU 43 are furthermore disposed in the indoor unit 4. The indoor heat exchanger temperature sensor 44 detects the temperature of refrigerant that flow through the interior of the indoor heat exchanger 45, and sends information about the indoor heat exchange refrigerant temperature to the first indoor CPU 43. The indoor temperature sensor 49 detects the temperature of indoor air prior to its passage through the indoor heat exchanger 45, and sends information about the indoor temperature to the first indoor CPU 43. The indoor fan motor 47m is an actuator of the indoor fan 47 and is driven under the control of the first indoor CPU 43. The first indoor communication unit 41 is connected to the first outdoor communication unit 1c of the outdoor unit 1 via a transmission line and carries out various exchanges of information. The first indoor storage unit 42 stores a relational expression or the like of the input energy to the indoor fan motor 47m in relation to the evaporation temperature Te, and is used in energy-saving control carried out by a later-described control unit 7.

The method for specifying the relational expression of the input energy to the indoor fan motor 47m in relation to the evaporation temperature Te is not particularly limited; it being possible to specify the relational expression in the manner of, e.g., formula (4) below.

$$\frac{dP_{Indoorfan}}{dTe} = \frac{dP_{Indoorfan}}{dN} \cdot \frac{dN}{dGa} \cdot \frac{dGa}{dTe} \qquad \langle \text{Formula 4} \rangle$$

In the formula, the term $dP_{Indoor\ fan}/dN$ can be obtained by differentiating the fan input characteristic formula (e.g., $P_{Indoor\ fan} = C_4 N^3 + C_5 N^2 + C_6 N$), which is established by the performance of each indoor fan motor 47m, at a rotating speed N.

The term dN/dGa can be obtained by differentiating the fan airflow volume characteristic formula (in the scope considered in the present embodiment, the rotating speed N and the airflow volume Ga can be regarded as being in a proportional relationship), which is determined by each type of indoor fan 47, at an airflow volume Ga.

The term dGa/Te can be obtained by differentiating the heat exchanger characteristics formula (a relational expression established by the relationship of ΔT× airflow volume Ga ac capacity, where ΔT is the difference between the temperature of the refrigerant that flows through the heat exchanger and the temperature of air that flows around the heat exchanger), which is established for each type of heat exchanger using as the indoor heat exchanger 45, at the evaporation temperature Te.

The relational expression for the input energy to the indoor fan motor 47$m$ in relation to the evaporation temperature Te is not required to be stored in the first indoor storage unit 42, and, e.g., the fan input characteristic formula (e.g., $P_{Indoor\,fan}=C_4N^3+C_5N^2+C_6N$), the fan airflow volume characteristic formula, and the heat exchanger characteristic formula may be stored (first information may be stored) in the first indoor storage unit 42 or in another location. The control unit 7 may process these formulas in the form of information to thereby produce a relational expression of the input energy to the indoor fan motor 47$m$ in relation to the evaporation temperature Te.

The controller 9 has a remote-control communication unit 91 connected to the first outdoor communication unit via a transmission line, a remote-control storage unit 92, a remote-control CPU 93, and a display output unit 94, which is a liquid-crystal display unit. The remote-control storage unit 92 saves information and the like about the setting conditions inputted by a user. The remote-control CPU 93 transmits various settings information and the like received from the user to the first outdoor communication unit 1$c$ via a transmission line, outputs information received from the first outdoor communication unit 1$c$ to the display output unit 94 and displays the information as character information, and performs other processing.

The control unit 7 is configured by mutual connection via a transmission line of: the first outdoor CPU 1$a$, the first outdoor storage unit 1$b$, and the first outdoor communication unit 1$c$ in the outdoor unit 1; the first indoor communication unit 41, the first indoor storage unit 42, and the first indoor CPU 43 in the indoor unit 4; and the remote-control communication unit 91, the remote-control storage unit 92, and the remote-control CPU 93 in the controller 9, as shown in FIG. 2. The control unit 7 changes the state of the refrigerant in the manner indicated by, e.g., the PH diagram shown in FIG. 3 to carry out a refrigeration cycle in the case that an air-cooling operation is to be carried out in the refrigeration cycle system 100. In this case, the control unit 7 controls the drive frequency of the compressor drive motor 15$m$, the rotating speed of the outdoor fan motor 19$m$, the opening degree of the outdoor expansion valve 18 and the indoor expansion valve 46, and the rotating speed of the indoor fan motor 47$m$. The process for computing the target value of the condensing temperature and/or the evaporation temperature updated in the manner described below may be carried out by any CPU, and may be carried out by, e.g., the first outdoor CPU 1$a$ in the outdoor unit 1.

(1-1-1) Air-Cooling Operation Control

During air-cooling operation, the control unit 7 controls the opening degree of the indoor expansion valve 46 on that the degree of superheating of the exit refrigerant of the indoor heat exchanger 45 (or the intake refrigerant of the compressor 15) is constant, while the outdoor expansion valve 18 is controlled so as to be in a fully open state.

Also during air-cooling operation, the control unit 7 controls the drive frequency of the compressor drive motor 15$m$ of the compressor 15 so that the evaporation temperature of the refrigeration cycle reaches the most recent target evaporation temperature (the updated target evaporation temperature described for each control below).

Also during air-cooling operation, the control unit 7 controls the rotating speed of the outdoor fan motor 19$m$ of the outdoor fan 19 so that the condensing temperature of the refrigeration cycle reaches the most recent target condensing temperature (the updated target condensing temperature described for each control below).

Furthermore, during air-cooling operation, the control unit 7 controls the rotating speed of the indoor fan motor 47$m$ of the indoor fan 47 on as to achieve the indoor temperature set in the indoor unit 4.

(1-1-2) Air-Warming Operation Control

During air-warming operation, the control unit 7 controls the opening degree of the outdoor expansion valve 18 so that the degree of superheating of the exit refrigerant of the outdoor heat exchanger 17 (or the intake refrigerant of the compressor 15) is constant, while setting the indoor expansion valve 46 in a fully open state.

Also during air-warming operation, the control unit 7 also controls the drive frequency of the compressor drive motor 15$m$ of the compressor 15 so that the condensing temperature of the refrigeration cycle reaches the most recent target condensing temperature (the updated target condensing temperature described for each control below).

Also during air-warming operation, the control unit 7 controls the rotating speed of the outdoor fan motor 19$m$ of the outdoor fan 19 so that the evaporation temperature of the refrigeration cycle reaches the most recent target evaporation temperature (the updated target evaporation temperature described for each control below).

Furthermore, during air-warming operation, the control unit 7 controls the rotating speed of the indoor fan motor 47$m$ of the indoor fan 47 so as to achieve the indoor temperature set in the indoor unit 4.

(1-2) Energy-Saving Control by Optimization of the Condensing Temperature Tc

Described below is an example of energy-saving control by optimization of the condensing temperature Tc in the case that an air-cooling operation is to be carried out in the refrigeration cycle system 100. In an air-warming operation, the compressor drive motor 15$m$ is controlled so that a target condensing temperature is achieved, the outdoor fan motor 19$m$ is controlled so that a target evaporation temperature is achieved, and the updated target condensing temperature Tc is kept within a range that allows the capacity of the indoor heat exchanger 45 to be maintained. Control is otherwise the same as in the air-cooling operation described below, and a description of air-warming operation is therefore omitted.

Figure 5:
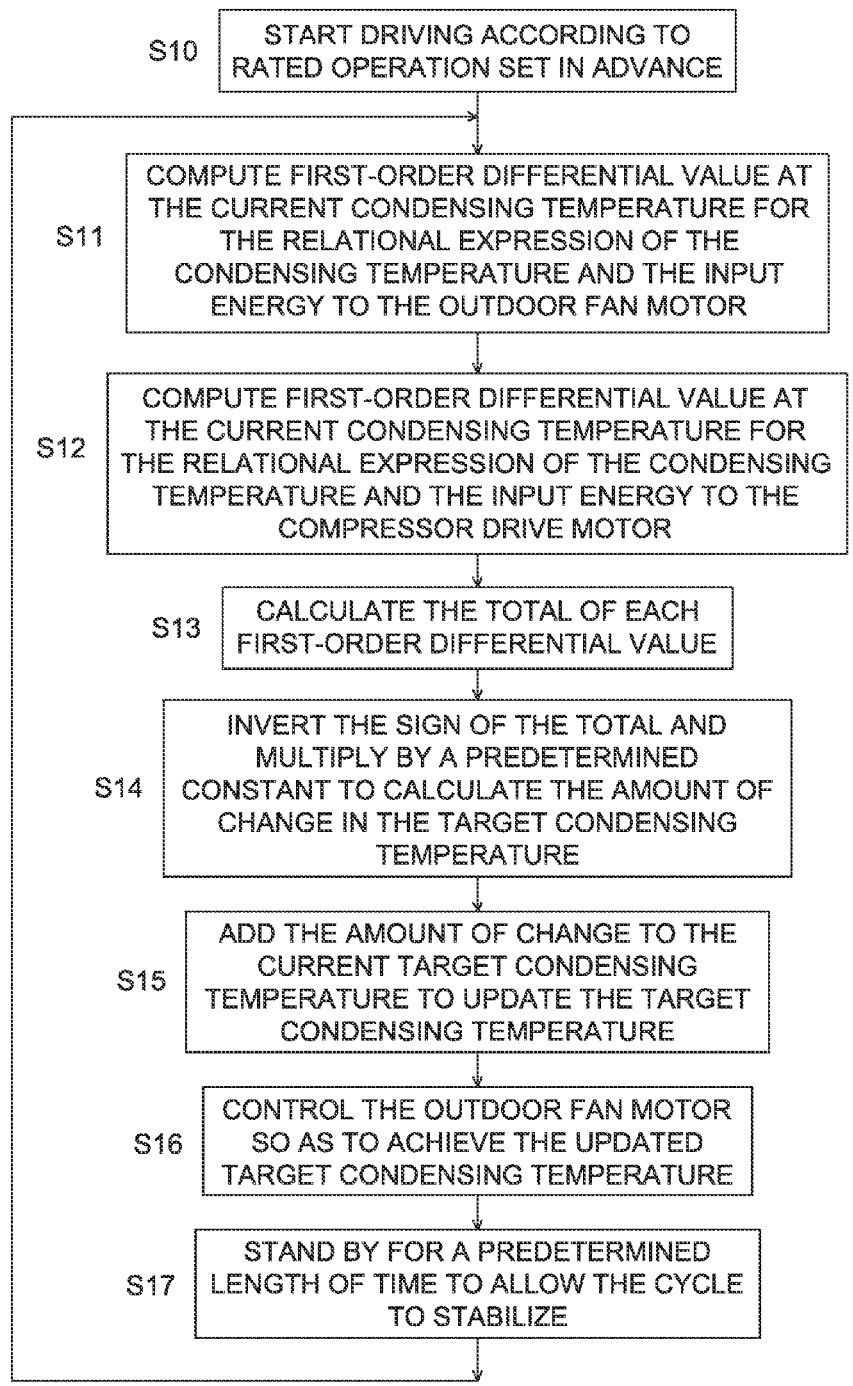
FIG. 5 is a control flowchart of energy-savings control carried out by optimization of the condensing temperature in accordance with the first embodiment.

FIG. 5 shows a flowchart of energy-savings control by optimization of the condensing temperature Tc carried out by the control unit 7.

With this control, processing is carried out to update the current target condensing temperature to a target condensing temperature capable of reducing the total of the input energy to the outdoor fan motor 19$m$ and the input energy to the compressor drive motor 115$m$ to less than the current level.

In step S10, the control unit 7 controls the outdoor fan motor 19$m$ and the compressor drive motor 15$m$ so as to comply with rated operating conditions set in advance when an instruction to start execution of energy-saving control by optimization of the condensing temperature Tc is received via the controller 9. Specifically, the rotating speed of the outdoor fan motor 19*m* is controlled so that the condensing temperature arrives at an initial target condensing temperature. The drive frequency of the compressor drive motor 15*m* is controlled so that the evaporation temperature arrives at an initial target evaporation temperature.

In step S11, the control unit 7 obtains the relational expression of a first-order differential based on the condensing temperature for the relational expression of the input energy $P_{Outdoor\ fan}$ to the outdoor fan motor 19*m* in relation to the condensing temperature Tc. The current condensing temperature is thereafter substituted into the relational expression of the first-order differential thus obtained to ascertain the trend of the change in the input energy $P_{Outdoor\ fan}$ to the outdoor fan motor 19*m* when the current condensing temperature has been changed. Specifically, $P_{Outdoor\ fan}/dTc$ (Tc=Tc1) is ascertained as the slope of the tangent at the current condensing temperature Tc1 for the relational expression of the input energy $P_{Outdoor\ fan}$ to the outdoor fan motor 19*m* in relation to the condensing temperature Te (the value attained by substituting the current condensing temperature Tc1 into the relational expression attained in the first-order differential based on the condensing temperature), as shown in FIG. 4.

In step S12, the control unit 7 obtains the relational expression of a first-order differential based on the condensing temperature for the relational expression of the input energy to the compressor drive motor 15*m* in relation to the condensing temperature Tc. The current condensing temperature is thereafter substituted into the relational expression of the first-order differential thus obtained to ascertain the trend of the change in the input energy $P_{Comp}$ to the compressor drive motor 15*m* when the current condensing temperature has been changed. Specifically, $dP_{Comp}/dTc$ (Tc=Tc1) is ascertained as the slope of the tangent at the current condensing temperature Tc1 for the relational expression of the input energy $P_{Comp}$ to the compressor drive motor 15*m* in relation to the condensing temperature Tc (the value attained by substituting the current condensing temperature Tc1 into the relational expression attained in the first-order differential based on the condensing temperature), as shown in FIG. 4.

In step S13, the control unit 7 calculates the total of: the value (the value ascertained in step S11) obtained by substituting the current condensing temperature Tc1 into a relational expression obtained by using the condensing temperature to carry out a first-order differential of the relational expression of the input energy $P_{Outdoor\ fan}$ to the outdoor fan motor 19*m* in relation to the condensing temperature Te; and the value (the value ascertained in step S12) obtained by substituting the current condensing temperature Tc1 into a relational expression obtained by using the condensing temperature to carry out a first-order differential of the relational expression of the input energy $P_{Comp}$ to the compressor drive motor 15*m* in relation to the condensing temperature Tc.

In step S14, the control unit 7 multiplies the total attained in step S13 by a predetermined constant Kc white inverting the sign to calculate the amount of change in the target condensing temperature updated from the current condensing temperature. Specifically, the amount of change ΔTcs in the target condensing temperature is ascertained in the manner shown in formula (5) below $$\Delta Tcs = -\frac{Kc}{P_{now}} \cdot \frac{dP_{Total}}{dTc} \quad \langle\text{Formula 5}\rangle$$

In the formula, $P_{now}$ is the current total of the input energy to the outdoor fan motor 19*m* and the input energy to the compressor drive motor 15*m*. The term $dP_{Total}/dTc$ is the total calculated in step S13. The predetermined constant Kc is a constant for regulating the speed of change in the target condensing temperature and is a value set in advance. In this case, the reason for inverting the sign is to update the target condensing temperature to the direction of reduction when the slope is positive, and to update the target condensing temperature to the direction of increase when the slope is negative.

In step S15, the control unit 7 adds the amount of change ΔTcs in the target condensing temperature ascertained in step S14 to the current condensing temperature to update the target condensing temperature.

In step S16, the control unit 7 controls the outdoor fan motor 19*m* so as to achieve target condensing temperature Tc2 updated in step S15. Specifically, the control unit 7 controls the rotating speed of the outdoor fan motor 19*m* so that the condensing temperature of the refrigeration cycle reaches the updated target condensing temperature. Thus, the refrigeration cycle is controlled so that the updated target condensing temperature is reached, whereby the rotating speed of the indoor fan motor 47*m* of the indoor fan 47, which has been controlled so that the indoor temperature set for the indoor unit 4 is achieved, is changed as a result.

In step S17, the control unit 7 stands by for a predetermined length of time (in this case, five minutes) in order to allow the operating state of the refrigeration cycle to stabilize at the target condensing temperature Tc2. The process thereafter returns to step S11 and processing is continued.

(1-3) Energy-Saving Control by Optimization of the Evaporation Temperature Te

Described below is an example of energy-saving control by optimization of the evaporation temperature Te in the case that an air-cooling operation is to be carried out in the refrigeration cycle system 100. The energy-saving control carried out by optimization of the evaporation temperature Te may be allowed to proceed at the same time as energy-saving control carried out by optimization of the condensing temperature Tc described above, and in such a case, the timing for processing the energy-saving controls is preferably offset. In an air-warming operation, the compressor drive motor 15*m* is controlled so that a target condensing temperature is achieved, and the outdoor fan motor 19*m* is controlled so that a target evaporation temperature is achieved. Control is otherwise the same as in the air-cooling operation described below, and a description of air-warming operation is therefore omitted.

Figure 6:
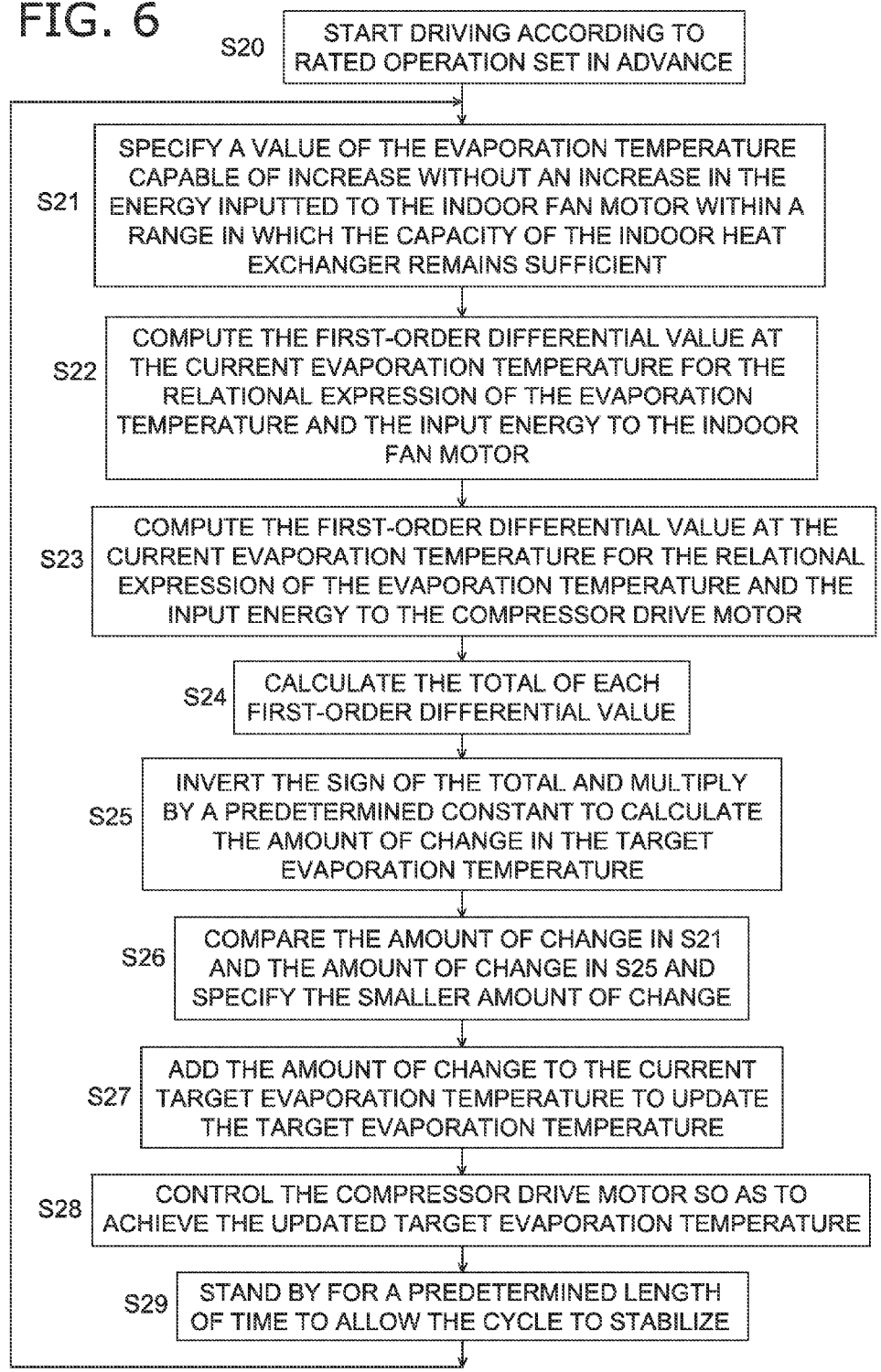
FIG. 6 is a control flowchart of energy-savings control carried out by optimization of the evaporation temperature in accordance with the first embodiment.

FIG. 6 shows a flowchart of energy-savings control carried out by the control unit 7 by optimization of the evaporation temperature Te.

With this control, processing is carried out to update the current target evaporation temperature to a target evaporation temperature capable of reducing the total of the input energy to the indoor fan motor 47*m* and the input energy to the compressor drive motor 15*m* to less than the current level.

In step S20, the control unit 7 controls the indoor fan motor 47*m* and the compressor drive motor 15*m* so as to comply with rated operating conditions set in advance when an instruction for energy-saving control carried out by optimization of the evaporation temperature Te is received via the controller 9. Specifically, the rotating speed of the outdoor fan motor 19*m* is controlled so that the condensing temperature arrives at an initial target condensing temperature. The drive frequency of the compressor drive motor 15*m* is controlled so that the evaporation temperature arrives at an initial target evaporation temperature.

In step S21, the control unit 7 calculates the amount of change in the evaporation temperature that can be increased from the current level in a range in which the capacity required in the indoor heat exchanger 45 does not become insufficient.

The control unit 7 calculates the capacity required in the indoor heat exchanger 45 on the basis of the temperature setting set for the indoor unit 4, the indoor temperature detected by the indoor temperature sensor 49, the current value of the input energy to the indoor fan motor 47*m*, and the heat exchanger characteristic formula of the indoor heat exchanger 45 (more preferably, also the fan input characteristic formula of the indoor fan motor 47*m*).

In step S22, the control unit 7 obtains the relational expression of a first-order differential based on the evaporation temperature for the relational expression of the input energy $P_{Indoor\ fan}$ to the indoor fan motor 47*m* in relation to the evaporation temperature Te. The current evaporation temperature is thereafter substituted into the relational expression of the first-order differential thus obtained to ascertain the trend of the change in the input energy $P_{Indoor\ fan}$ to the indoor fan motor 47*m* when the current evaporation temperature has been changed. Specifically, the slope of the tangent at the current evaporation temperature Te for the relational expression of the input energy $P_{Fan}$ to the indoor fan motor 47*m* in relation to the evaporation temperature Te (the value attained by substituting the current evaporation temperature into the relational expression attained in the first-order differential based on the evaporation temperature) is ascertained.

In step S23, the control unit 7 obtains the relational expression of the first-order differential based on the evaporation temperature for the relational expression of the input energy to the compressor drive motor 15*m* in relation to the evaporation temperature Te. The current evaporation temperature is substituted into the relational expression of the first-order differential thus obtained to ascertain the trend of the change in the input energy $P_{Comp}$ to the compressor drive motor 15*m* when the current evaporation temperature has been changed. Specifically, the slope of the tangent at the current evaporation temperature for the relational expression of the input energy $P_{Comp}$ to the compressor drive motor 15*m* in relation to the evaporation temperature (the value attained by substituting the current evaporation temperature into the relational expression attained in the first-order differential based on the evaporation temperature), is ascertained.

In step S24, the control unit 7 calculates the total of the value (the value ascertained in step S22) attained by substituting the current evaporation temperature into a relational expression attained by using the evaporation temperature to carry out a first-order differential of the relational expression of the input energy $P_{Fan}$ to the indoor fan motor 47*m* in relation to the evaporation temperature Te; and the value (the value ascertained in step S23) attained by substituting the current evaporation temperature into a relational expression attained by using the evaporation temperature to carry out a first-order differential of the relational expression of the input energy $P_{Comp}$ to the compressor drive motor 15*m* in relation to the evaporation temperature Te.

In step S25, the control unit 7 multiplies the total attained in step S2.4 by a predetermined constant Ke while inverting the sign to calculate the amount of change in the target evaporation temperature updated from the current evaporation temperature. Specifically, the amount of change ΔTes in the target evaporation temperature is ascertained in the manner shown in formula (6) below.

$$\Delta Tes = -\frac{Ke}{P_{now}} \cdot \frac{dP_{Total}}{dTe} \qquad \langle\text{Formula 6}\rangle$$

In the formula, $P_{now}$ is the current total of the input energy to the indoor fan motor 47*m* and the input energy to the compressor drive motor 15*m*. The term $dP_{Total}/dTe$ is the total calculated in step S24. The predetermined constant Ke is a constant for regulating the speed of change in the target evaporation temperature and is a value set in advance. In this case, the reason for inverting the sign is to update the target evaporation temperature to the direction of reduction when the slope is positive, and to update the target evaporation temperature to the direction of increase when the slope is negative.

In step S26, the control unit 7 compares the amount of change in the evaporation temperature calculated in step S21 and the amount of change in the evaporation temperature Te obtained in step S25, and specifies the smaller amount of change. The amount of change in the target evaporation temperature updated from the current evaporation temperature and that allows energy to be saved can be thereby ascertained in a range in which the capacity required in the indoor heat exchanger 45 will not be insufficient.

In step S27, the control unit 7 adds the amount of change in the target evaporation temperature ascertained in step S26 to the current evaporation temperature to update the target evaporation temperature.

In step S28, the control unit 7 controls the compressor drive motor 15*m* so as to achieve the target evaporation temperature updated in step S27. Specifically, the drive frequency of the compressor drive motor 15*m* is controlled so that the evaporation temperature of the refrigeration cycle reaches the updated target evaporation temperature.

Thus, the refrigeration cycle is controlled so that the updated target evaporation temperature is reached, whereby the rotating speed of the indoor fan motor 47*m* of the indoor fan 47, which has been controlled so that the indoor temperature set for the indoor unit 4 is achieved, is changed as a result.

In step S29, the control unit 7 stands by for a predetermined length of time (in this case, five minutes) in order to allow the operating state of the refrigeration cycle to stabilize at the target evaporation temperature. The process thereafter returns to step S21 and processing is continued.

(1-4) Energy-Saving Control by Optimization of the Condensing Temperature Tc and the Evaporation Temperature Te Described below is an example of energy-saving control by optimization of both the condensing temperature Tc and the evaporation temperature Te in the case that an air-cooling operation is to be carried out in the refrigeration cycle system 100. In an air-warming operation, the compressor drive motor 15*m* is controlled so that a target condensing temperature is achieved, the outdoor fan motor 19*m* is controlled so that a target evaporation temperature is achieved, and the updated condensing temperature Tc is kept within a range that allows the capacity of the indoor heat exchanger 45 to be maintained. Control is otherwise the same as in the air-cooling operation described below, and a description of air-warming operation is therefore omitted.

Figure 7:
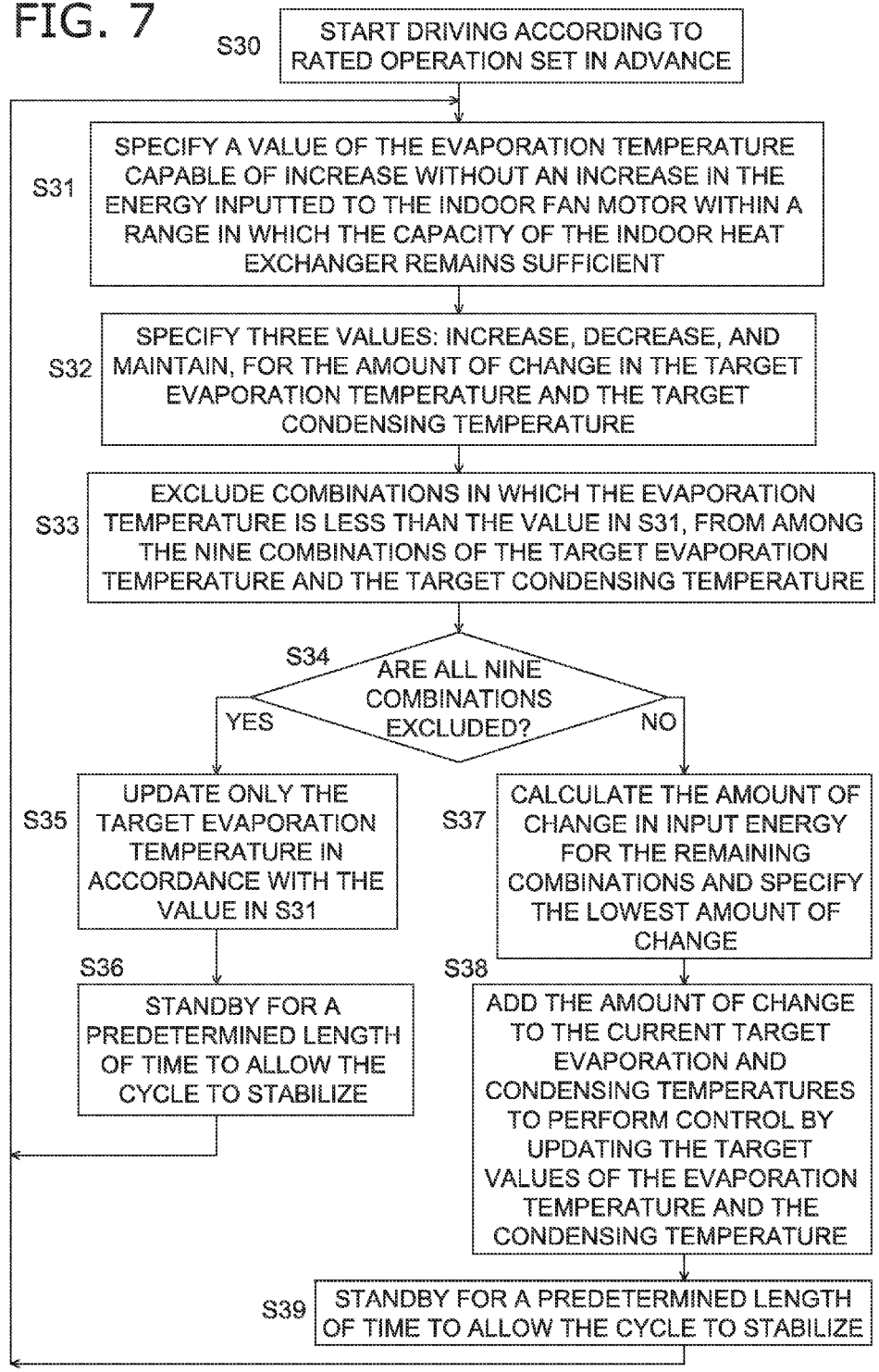
FIG. 7 is a control flowchart of energy-savings control carried out by optimization of both the condensing temperature and the evaporation temperature in accordance with the first embodiment.

FIG. 7 shows a flowchart of energy-savings control by optimization of both the condensing temperature Tc and the evaporation temperature Te carried out by the control unit 7.

With this control, processing is carried out to update the current target condensing temperature and the current target evaporation temperature to a target condensing temperature and a target evaporation temperature capable of reducing the total of the input energy to the outdoor fan motor 19m, the input energy to the indoor fan motor 47m, and the input energy to the compressor drive motor 15m to less than the current level.

In step S30, the control unit 7 controls the outdoor fan motor 19m, the indoor fan motor 47m, and the compressor drive motor 15m so as to comply with rated operating conditions set in advance when an instruction for energy-saving control by optimization of both the condensing temperature Tc and the evaporation temperature Te is received via the controller 9. Specifically, the rotating speed of the outdoor fan motor 19m is controlled so that the condensing temperature arrives at an initial target condensing temperature. The drive frequency of the compressor drive motor 15m is controlled so that the evaporation temperature arrives at an initial target evaporation temperature.

In step S31, the control unit 7 calculates the amount of change in the target evaporation temperature capable of an increase from the current level in a range in which the capacity required in the indoor heat exchanger 45 will not be insufficient. In this case, the amount of change in the evaporation temperature is calculated as a negative value when there is no leeway in the capacity of the indoor heat exchanger 45 and the evaporation temperature Te must be reduced (i.e., when the capacity must be increased).

The capacity required in the indoor heat exchanger 45 is calculated by the control unit 7 on the basis of the setting temperature set for the indoor unit 4, the indoor temperature detected by the indoor temperature sensor 49, and the current value of the input energy to the indoor fan motor 47m.

In step S32, the control unit 7 provides three values for the amount of change $\Delta Te$ the target evaporation temperature updated from the current evaporation temperature, and also provides three values for the amount of change $\Delta Tc$ in the target condensing temperature updated from the current condensing temperature.

Specifically, the following values a) to c) are provided as the amount of change $\Delta Te$ to the target evaporation temperature updated from the current evaporation temperature.

a) A ($T_{Indoor\ temperature}$−Te)
b) −A ($T_{Indoor\ temperature}$−Te)
c) 0

In this case, A is a constant equal to or less than 1 for regulating the evaporation temperature, and is a value set in advance (may be set in a range of, e.g., 0.03 to 0.05 as a preferred range). Te is the current evaporation temperature. $T_{Indoor\ temperature}$ is the temperature detected by the indoor temperature sensor 49. Also, a) corresponds to a change that increases the target evaporation temperature, b) corresponds to a change that reduces the target evaporation temperature, and c) corresponds to when the target evaporation temperature is not modified.

Specifically, the following values e) to g) are provided as the amount of change $\Delta Tc$ to the target condensing temperature updated from the current condensing temperature.

e) B (Tc−$T_{Outdoor\ temperature}$)
f) −B (Tc−$T_{Outdoor\ temperature}$)
g) 0

In this case, B is a constant equal to or less than 1 for regulating the condensing temperature, and is a value set in advance (may be set in a range of, e.g., 0.03 to 0.05 as a preferred range.). Tc is the current condensing temperature. $T_{Outdoor\ temperature}$ is the temperature detected by the outdoor temperature sensor H. Also, e) corresponds to a change that increases the target condensing temperature, f) corresponds to a change that reduces the target condensing temperature, and g) corresponds to when the target condensing temperature is not modified.

In step S33, the control unit 7 processes nine combinations available from the three "amounts of change $\Delta Te$ to the target evaporation temperature updated from the current evaporation temperature" and the three "amounts of change $\Delta Tc$ to the target condensing temperature updated from the current condensing temperature," provided above and excludes the combinations that exceed the amount of change in the evaporation temperature calculated in step S31.

In step S34, the control unit 7 determines whether all of the nine combinations have been excluded in step S33. An example of a case in which all of the combinations would be excluded is when there is no leeway in the capacity of the indoor heat exchanger 45, the evaporation temperature Te must be reduced, and the amount of change in the evaporation temperature has been calculated to be a negative value in step S31. When it has been determined that all nine combinations have been excluded, the process proceeds to step S35. When there are no excluded combinations or when a portion of the nine combinations have been excluded, the process proceeds to step S37.

In step S35, the control unit 7 sets the value attained by changing the current evaporation temperature by the amount of change in the evaporation temperature calculated in step S31 to be the updated target evaporation temperature. The control unit 7 controls the drive frequency of the compressor drive motor 15m so that the evaporation temperature of the refrigeration cycle reaches the updated target evaporation temperature, and the process proceeds to step S36. Thus, the refrigeration cycle is controlled so that the updated target evaporation temperature is reached, whereby the rotating speed of the indoor fan motor 47m of the indoor fan 47, which has been controlled so that the indoor temperature set for the indoor unit 4 is achieved, is changed as a result.

In step S36, the control unit 7 stands by for a predetermined length of time (in this case, five minutes) in order to allow the operating state of the refrigeration cycle to stabilize at the target evaporation temperature. The process thereafter returns to step S31 and processing is continued.

In step S37, the control unit 7 calculates the total of the amount of change in the input energy for each of the remaining combinations that were not excluded in step S34 from among the nine combinations described above.

Specifically, the control unit 7 obtains the relational expression of a first-order differential based on the evaporation temperature for the relational expression of the input energy $P_{Indoor\ fan}$ to the indoor fan motor 47m in relation to the evaporation temperature Te. The current evaporation temperature is thereafter substituted into the relational expression of the first-order differential thus obtained to ascertain the current slope of the tangent related to the indoor fan motor 47m. The control unit 7 furthermore obtains the relational expression of a first-order differential based on the evaporation temperature for the relational expression of the input energy to the compressor drive motor 15m in relation to the evaporation temperature Te. The current evaporation temperature is thereafter substituted into the relational expression of the first-order differential thus obtained to ascertain the current slope of the tangent related to the relationship between the compressor drive motor 15m and the evaporation temperature. The control unit 7 then obtains the total of the slopes of the tangents, which is the total of the current slope of the tangent related to the indoor fan motor 47m and the current slope of the tangent related to the relationship between the compressor drive motor 15m and the evaporation temperature. Moreover, the control unit 7 multiplies the total of the slopes of tangents by the value of a), b), and c) for each combination to thereby calculate the amount of change in the input energy assumed for the case in which the current evaporation temperature has been changed.

The control unit 7 carries out the same processing for the condensing temperature Tc. In other words, the control unit 7 obtains the relational expression of a first-order differential based on the condensing temperature for the relational expression of the input energy $P_{Outdoor\ fan}$ to the outdoor fan motor 19m in relation to the condensing temperature Tc. The current condensing temperature is thereafter substituted into the relational expression of the first-order differential thus Obtained to ascertain the current slope of the tangent related to the outdoor fan motor 19m. The control unit 7 furthermore obtains the relational expression of a first-order differential based on the condensing temperature for the relational expression of the input energy to the compressor drive motor 15m in relation to the condensing temperature Tc. The current condensing temperature is thereafter substituted into the relational expression of the first-order differential thus obtained to ascertain the current slope of the tangent related to the relationship between the compressor drive motor 15m and the condensing temperature. The control unit 7 then obtains the total of the slopes of the tangents, which is the total of the current slope of the tangent related to the outdoor fan motor 19m and the current slope of the tangent related to the relationship between the compressor drive motor 15m and the condensing temperature. Moreover, the control unit 7 multiplies the total of the slopes of tangents by the value of e), f), and g) for each combination to thereby calculate the amount of change in the input energy assumed for the case in which the current condensing temperature has been changed.

In accordance with the above, the total of the amounts of change in the input energy is calculated for each of the remaining combinations that were not excluded in step S34. The combination in which the total of the amounts of change in the input energy is at the minimum value is specified, the combination being the amount of change in the evaporation temperature and the amount of change in the condensing temperature.

In step S38, the control unit 7 reflects the combination of the amount of change in the condensing temperature and the amount of change in the evaporation temperature specified in step S37 to have the minimum total amount of change in the input energy, and updates the target condensing temperature while also updating the target evaporation temperature. In other words, the value attained by adding the amount of change in the evaporation temperature, which has been specified as being the combination having the minimum total amount of change in the input energy in step S37, to the current evaporation temperature is used as the updated target evaporation temperature. Also, the value attained by adding the amount of change in the condensing temperature, which has been specified as being the combination having the minimum total amount of change in the input energy in step S37, to the current condensing temperature is used as the updated target condensing temperature. The control unit 7 controls the rotating speed of the outdoor fan motor 19m so that the condensing temperature of the refrigeration cycle reaches the updated target condensing temperature, and controls the drive frequency of the compressor drive motor 15m so that the evaporation temperature of the refrigeration cycle reaches the updated target evaporation temperature. Thus, control is carried out so that the target evaporation temperature and the target condensing temperature of the refrigeration cycle are updated, whereby the rotating speed of the indoor fan motor 47m of the indoor fan 47, which has been controlled so that the indoor temperature set for the indoor unit 4 is achieved, is changed as a result.

In step S39, the control unit 7 stands by for a predetermined length of time (in this case, five minutes) in order to allow the operating state of the refrigeration cycle to stabilize at the updated target evaporation temperature and the updated target condensing temperature. The process thereafter returns to step S31 and processing is continued.

(1-5) Characteristics of the First Embodiment

For example, when the input energy to the outdoor fan motor 19m for driving the outdoor fan 19 has been increased, the pressure on the high-pressure side of the refrigeration cycle is reduced, and the compression ratio in the compressor 15 is thereby reduced because the difference between high pressure and low pressure is reduced. The input energy required in the compressor drive motor 15m is thereby reduced in this manner, the input energy to the outdoor fan motor 19m, the compressor drive motor 15m, and other components are correlated, and there are operating conditions capable of keeping the input energy as low as possible.

In the refrigeration cycle system 100 of the first embodiment described above, changes in the input energy to each actuator when the refrigerant state quantity is changed is ascertained from relational expressions or the like stored in advance in the storage unit or the like, and the target value can be updated to a refrigerant state quantity for which energy-saving operation possible on the basis of the directionality and extent of change in the total amount of input energy required when the refrigerant state quantity has been changed.

In a conventional system in which the control content of the actuators is recorded in advance in correspondence with all operating conditions, control can reflect only matter considered in advance at the time the system is designed, and the control content of the actuators for which energy-saving effect is determined to be maximum at the time of design for each operating condition is fixed. Accordingly, in a conventional system, control content cannot be set so as to correspond to the installation environment or the like, and the energy-saving effect initially envisioned may not necessarily be optimized when the system is actually installed and put into operation. In contrast, in the refrigeration cycle system 100 of the first embodiment described above, it is determined whether control tier increasing or control for reducing the control target value of the condensing temperature and/or the evaporation temperature should be carried out in order to reduce the current input energy in a state in which the system is stabilized. In other words, in each stable state, the directionality of control that allows the input energy to be reduced from the current level is found and made to be the updated target. Therefore, in the refrigeration cycle system 100, carrying out such control makes it possible to continuously search for operating conditions having greater energy-saving effect, and it is possible to obtain operating conditions in which the total amount of required input energy is kept low in view of the actual installation conditions. Also, since that which is modified in such a case is the condensing temperature and/or the evaporation temperature, fluctuation can be kept low in comparison with the fluctuation in the energy inputted to the actuators (when the actuator input is controlled as a target value, the target value is doubled when output is modified from 50% output to maximum output, and although the fluctuation width is high, setting the condensing temperature and/or the evaporation temperature to be the target value makes it possible to kept the fluctuation width to a small value of about ±1° C.). Operating conditions in which energy-saving effect is attained can thereby be rapidly stabilized. In terms of the data required for such energy-saving control, the amount of information required to be set in advance can be reduced because, in comparison with the case in which control content for each actuator corresponding to all operating conditions is stored in advance as in a conventional system, it is sufficient to merely record characteristic formulas for each actuator and the relational expressions therefor. Moreover, the computational processing load can be reduced because the directionality and extent of change in the total amount of input energy can be ascertained for energy-saving control by using refrigerant state quantities such as the condensing temperature and/or the evaporation temperature, in simple processing for total deriving functions in which the input energies of the actuators have been totaled.

The above-described processing can be carried out within the range of the capability required in the indoor heat exchanger 45.

In the refrigeration cycle system 100 of the embodiment described above, when the target value is to be updated to a refrigerant state quantity capable of energy-saving operation, the update is carried out in accordance with a prediction based on a relational expression or the like rather than by ascertaining the trend (the trend in energy-savings ability) when the target value has been changed by carrying out operation while actually varying the target value, and rather than by carrying out operation in which the target value has been actually varied. The trend can thereby be predicted without actually changing the target value, and it is therefore possible to approximate an optimal operating state with good efficiency.

(2) Second Embodiment

Figure 8:
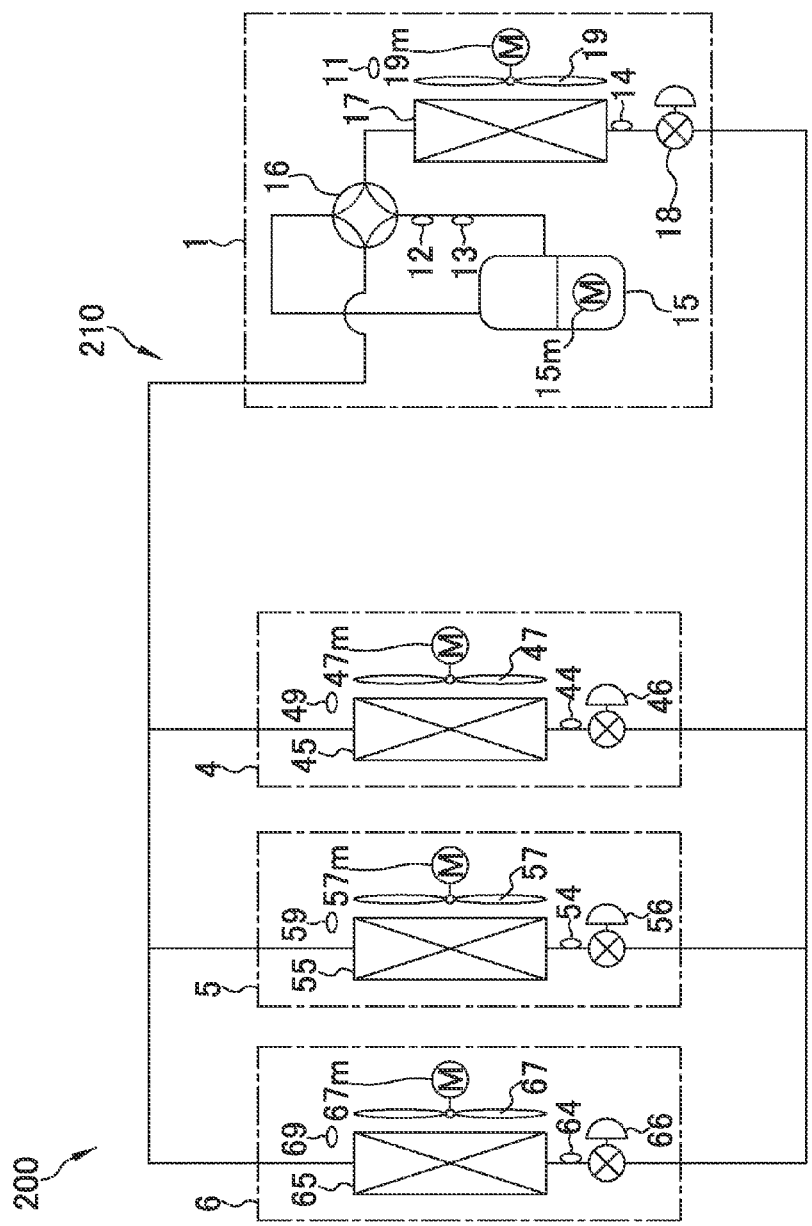
FIG. 8 is a refrigerant circuit diagram of the refrigeration cycle system of the second embodiment.
Figure 9:
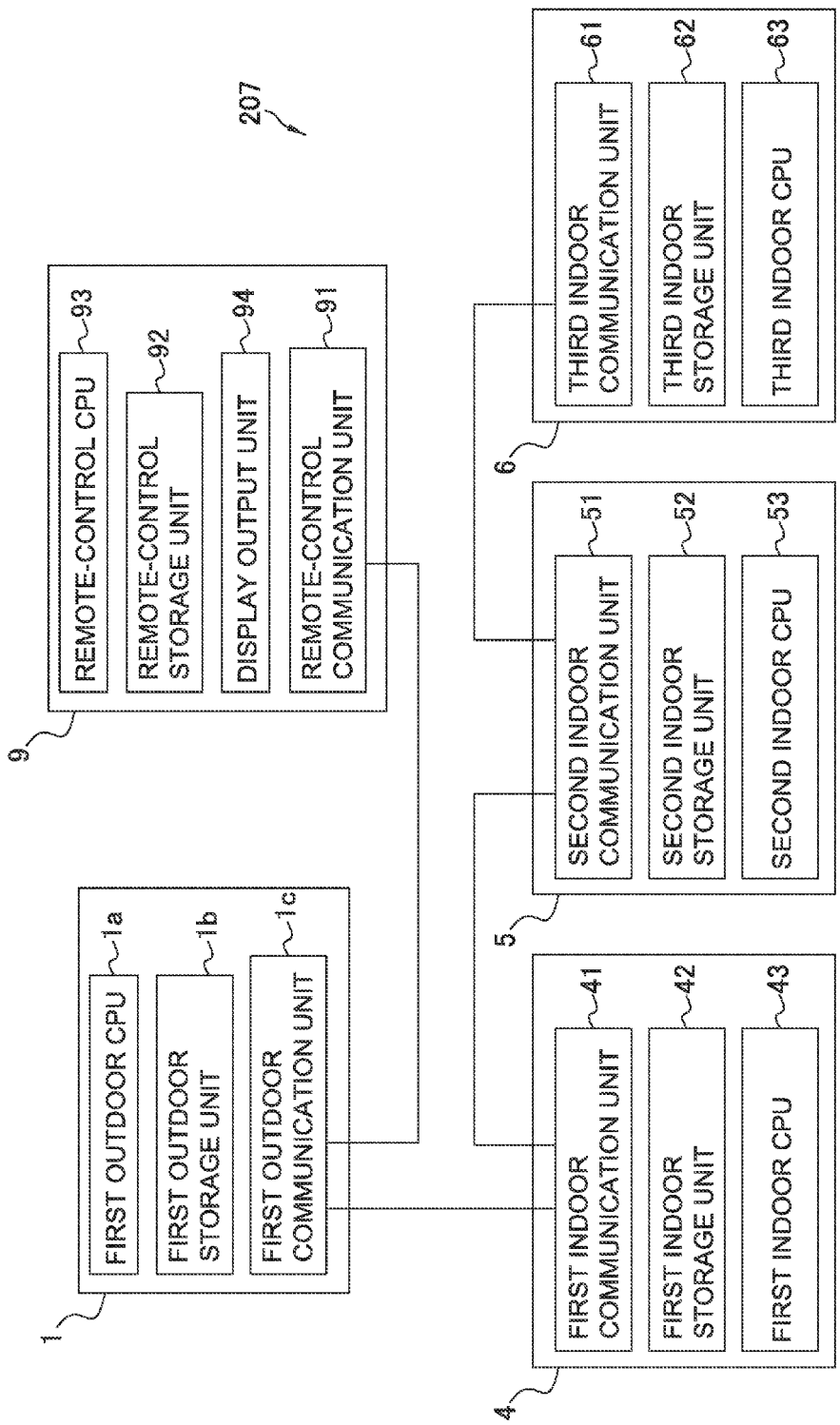
FIG. 9 is a block diagram of the second embodiment.
Figure 10:
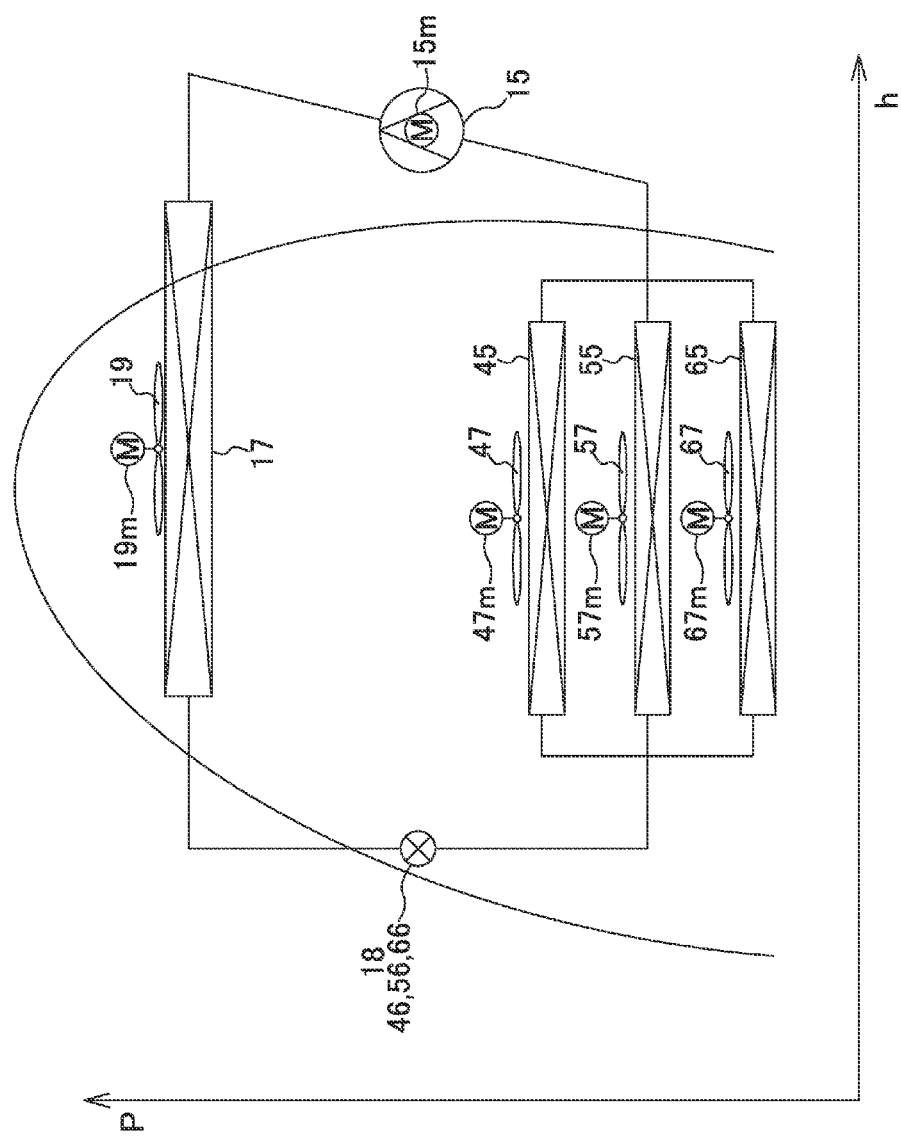
FIG. 10 is a PH diagram according to the second embodiment.

An example of the refrigeration cycle system of a second embodiment of the present invention will be described below with reference to the drawings, FIG. 8 shows a refrigerant circuit diagram of a refrigeration cycle system 200. FIG. 9 shows a block diagram. FIG. 10 shows a PH diagram.

(2-1) Overall Configuration of the Refrigeration Cycle System 200

The refrigeration cycle system 200 is provided with a refrigerant circuit 210 in which an indoor unit 5 and an indoor unit 6 have been added in parallel to the refrigerant circuit 10 of the refrigeration cycle system 100 in the first embodiment described above. The same reference numerals are used for essentially the same members as in the first embodiment, and a description thereof is omitted.

A relational expression of the input energy to the compressor drive motor 15*m* in relation to the evaporation temperature Te is provided for each of the indoor units 4, 5, 6 and is saved in the first outdoor storage unit 1*b* in the outdoor unit 1. A specific example of the relational expression is the same as that in the first embodiment.

An indoor expansion valve 56, an indoor heat exchanger 55, an indoor fan 57, an indoor heat exchanger temperature sensor 54, and an indoor temperature sensor 59 are disposed inside the indoor unit 5. An indoor fan motor 57*m*, a second indoor communication unit 51, a second indoor storage unit 52, and a second indoor CPU 53 are furthermore disposed inside the indoor unit 5. The indoor heat exchanger temperature sensor 54 detects the temperature of the refrigerant that flows through the interior of the indoor heat exchanger 55, and sends information about the temperature of the indoor heat exchange refrigerant to the second indoor CPU 53. The indoor temperature sensor 59 detects the temperature of indoor air prior to its passage through the indoor heat exchanger 55, and sends information about the indoor temperature to the second indoor CPU 53. The indoor fan motor 57*m* is an actuator of the indoor fan 57 and is driven under the control of the second indoor CPU 53. The second indoor communication unit 51 is connected to the first indoor communication unit 41 of the first indoor unit 4 and to a third indoor communication unit 61 of a third indoor unit 6 via a transmission line and carries out various information exchange. The second indoor storage unit 52 stores a relational expression or the like of the input energy to the indoor fan motor 57*m* in relation to the evaporation temperature Te, and is used in energy-saving control carried out by a later-described control unit 207. The method for specifying the relational expression of the input energy to the indoor fan motor 57*m* in relation to the evaporation temperature Te is the same as in the embodiment described above.

An indoor expansion valve 66, an indoor heat exchanger 65, an indoor fan 67, an indoor heat exchanger temperature sensor 64, and an indoor temperature sensor 69 are disposed in the indoor unit 6. An indoor fan motor 67*m*, a third indoor communication unit 61, a third indoor storage unit 62, and a third indoor CPU 63 are furthermore disposed inside the indoor unit 6. The indoor heat exchanger temperature sensor 64 detects the temperature of the refrigerant that flows through the interior of the indoor heat exchanger 65, and sends information about the temperature of the indoor heat exchange refrigerant to the third indoor CPU 63. The indoor temperature sensor 69 detects the temperature of indoor air prior to its passage through the indoor heat exchanger 65, and sends information about the indoor temperature to the third indoor CPU 63. The indoor fan motor 67*m* is an actuator of the indoor fan 67 and is driven under the control of the third indoor CPU 63. The third indoor communication unit 61 is connected to the second indoor communication unit 51 of the second indoor unit 5 via a transmission line and carries out various exchanges of information. The third indoor storage unit 62 stores a relational expression or the like of the input energy to the indoor fan motor 67*m* in relation to the evaporation temperature Te, and is used in energy-saving control carried out by a later-described control unit 207. The method for specifying the relational expression of the input energy to the indoor fan motor 67*m* in relation to the evaporation temperature Te is the same as in the embodiment described above.

The control unit 207 of the present embodiment configured by mutual connection of the first outdoor CPU 1*a*, the first outdoor storage unit 1*b*, and the first outdoor communication unit 1*c* of the outdoor unit 1; the first indoor communication unit 41, first indoor storage unit 42, and first indoor CPU 43 in the indoor unit 4; the second indoor communication unit 51, the second indoor storage unit 52, and the second indoor CPU 53 of the indoor unit 5; the third indoor communication unit 61, the third indoor storage unit 62, and the third indoor CPU 6 of the indoor unit 6; and the remote-control communication unit 91, the remote-control storage unit 92, and the remote-control CPU 93 in the controller 9 via a transmission line, as shown in FIG. 9. The control unit 207 changes the state of the refrigerant in the manner indicated by, e.g., the PH diagram shown in FIG. 10 to carry out a refrigeration cycle in the case that an air-cooling operation is to be carried out in the refrigeration cycle system 200. In this case, the control unit 207 controls the drive frequency of the compressor drive motor 15$m$, the rotating speed of the outdoor fan motor 19$m$, the opening degree of the outdoor expansion valve 18 and the indoor expansion valve 46, the rotating speed of the indoor fan motor 47$m$, the opening degree of the indoor expansion valve 56, the rotating speed of the indoor fan motor 57$m$, the opening degree of the indoor expansion valve 66, and the rotating speed of the indoor fan motor 67$m$.

(2-1-1) Air-Cooling Operation Control

During air-cooling operation, the control unit 207 controls the opening degree of the indoor expansion valves 46, 56, 66 so that the degree of superheating of the intake refrigerant of the compressor 15 is constant at the same value, while the outdoor expansion valve 18 is controlled so as to be in a fully open state.

Also during air-cooling operation, the control unit 207 also controls the drive frequency of the compressor drive motor 15$m$ of the compressor 15 so that the evaporation temperature of the refrigeration cycle reaches the most recent target evaporation temperature (the updated target evaporation temperature described for each control below).

Also during air-cooling operation, the control unit 207 controls the rotating speed of the outdoor fan motor 19$m$ of the outdoor fan 19 so that the condensing temperature of the refrigeration cycle reaches the most recent target condensing temperature (the updated target condensing temperature described for each control below).

Furthermore, during air-cooling operation, the control unit 207 controls the rotating speed of the indoor fan motor 47$m$ of the indoor fan 47 so as to achieve the indoor temperature set in the indoor unit 4, controls the rotating speed of the indoor fan motor 57$m$ of the indoor fan 57 so as to achieve the indoor temperature set in the indoor unit 5, and controls the rotating speed of the indoor fan motor 67$m$ of the indoor fan 67 so as to achieve the indoor temperature set in the indoor unit 6.

(2-1-2) Air-Warming Operation Control

During air-warming operation, the control unit 207 controls the opening degree of the outdoor expansion valve 18 so that the degree of superheating of the intake refrigerant of the compressor 15 is constant, while setting the indoor expansion valves 46, 56, 66 in a fully open state.

Also during air-warming operation, the control unit 207 controls the drive frequency of the compressor drive motor 15$m$ of the compressor 15 so that the condensing temperature of the refrigeration cycle reaches the most recent target condensing temperature (the updated target condensing temperature described for each control below).

Also during air-warming operation, the control unit 207 controls the rotating speed of the outdoor fan motor 19$m$ of the outdoor fan 19 so that the evaporation temperature of the refrigeration cycle reaches the most recent target evaporation temperature (the updated target evaporation temperature described for each control below).

Furthermore, during air-warming operation, the control unit 207 controls the rotating speed of the indoor fan motor 47$m$ of the indoor fan 47 so as to achieve the indoor temperature set in the indoor unit 4, controls the rotating speed of the indoor fan motor 57$m$ of the indoor fan 57 so as to achieve the indoor temperature set in the indoor unit 5, and controls the rotating speed of the indoor fan motor 67$m$ of the indoor fan 67 so as to achieve the indoor temperature set in the indoor unit 6.

(2-2) Energy-Saving Control by Optimization of the Condensing Temperature Tc

Described below is an example of energy-saving control by optimization of the condensing temperature Tc in the case that an air-cooling operation is to be carried out in the refrigeration cycle system 200. In an air-warming operation, the compressor drive motor 15$m$ is controlled so that a target condensing temperature is achieved, the outdoor fan motor 19$m$ is controlled so that a target evaporation temperature is achieved, and the updated target condensing temperature Tc is kept within a range that allows the capacity of the indoor heat exchangers 45, 55, 65 to be maintained. Control is otherwise the same as in the air-cooling operation described below, and a description of air-warming operation is therefore omitted.

Figure 11:
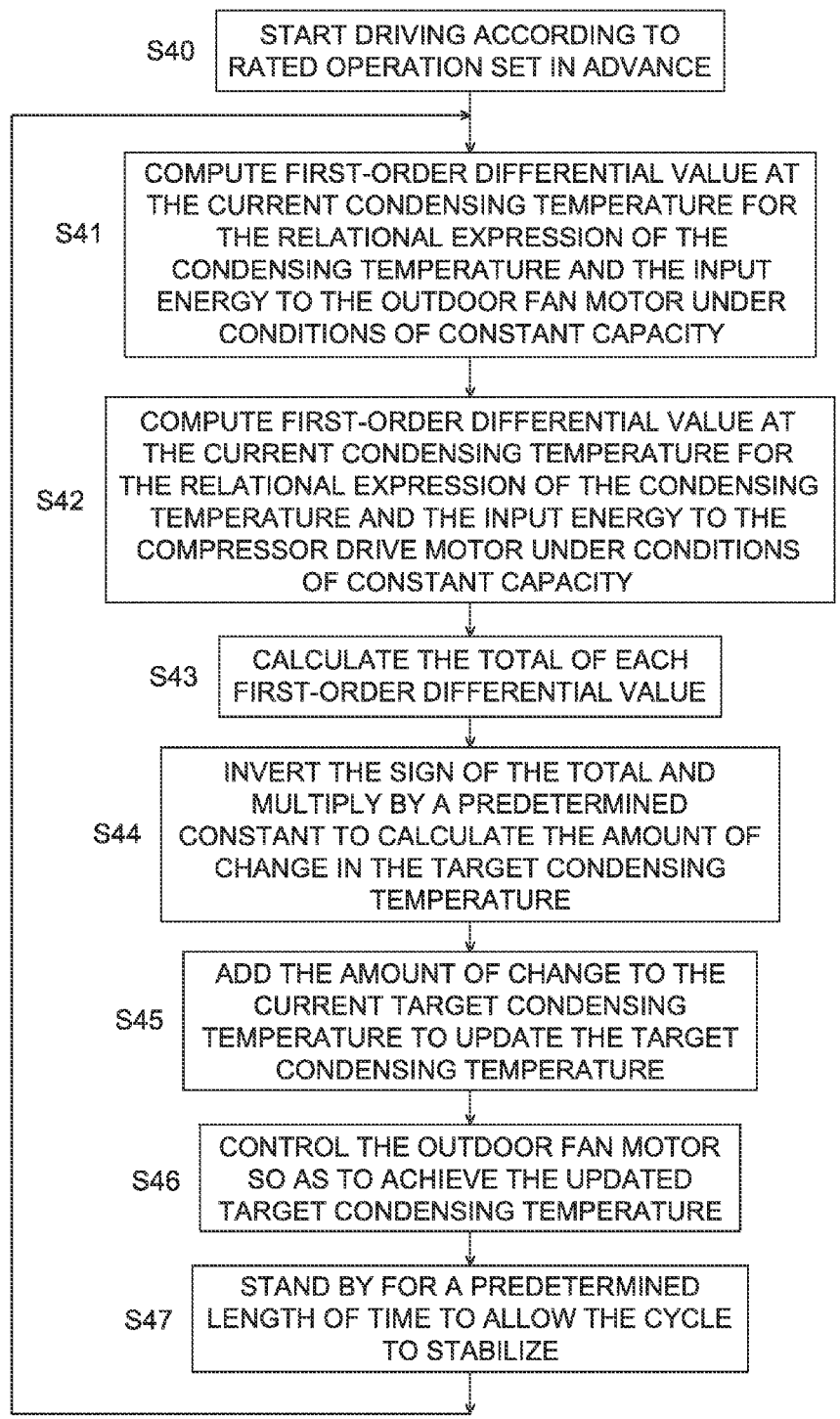
FIG. 11 is a control flowchart of energy-savings control carried out by optimization of the condensing temperature in accordance with the second embodiment.

FIG. 11 shows a flowchart of energy-savings control by optimization of the condensing temperature Tc carried out by the control unit 207.

With this control, processing is carried out to update the current target condensing temperature to a target condensing temperature capable of reducing the total of the input energy to the outdoor fan motor 19$m$ and the input energy to the compressor drive motor 15$m$ to less than the current level.

In step S40, the control unit 207 controls the outdoor fan motor 19$m$ and the compressor drive motor 15$m$ so as to comply with rated operating conditions set in advance when an instruction to start execution of energy-saving control by optimization of the condensing temperature Tc is received via the controller 9. Specifically, the rotating speed of the outdoor fan motor 19$m$ is controlled so that the condensing temperature arrives at an initial target condensing temperature. The drive frequency of the compressor drive motor 15$m$ is controlled so that the evaporation temperature arrives at an initial target evaporation temperature.

In step S41, the control unit 207 obtains the relational expression of a first-order differential based on the condensing temperature under conditions in which the capacity Q of the outdoor heat exchanger 17 is kept constant, for the relational expression of the input energy $P_{Outdoor\ fan}$ to the outdoor fan motor 19$m$ in relation to the condensing temperature Tc. The method for obtaining the relational expression of the first-order differential is not particularly limited; it being possible to, e.g., consider dN/dGa to be a constant and to obtain dGa/dTc using the formula Ga=Q×(Tc−T)), which is established from the relationship of the capacity Q=the proportionality constant K×the temperature difference ΔT between the refrigerant and air×the airflow volume Ga, thereby making it possible to obtain the relational expression of the first-order differential based on the condensing temperature under conditions in which the capacity Q of the outdoor heat exchanger 17 are kept constant. The current condensing temperature is thereafter substituted into the relational expression of the first-order differential thus obtained to ascertain the trend of the change in the input energy $P_{Outdoor\ fan}$ to the outdoor fan motor 19$m$ when the current condensing temperature has been changed. Specifically, $dP_{Outdoor\ fan}/dTc$ is ascertained as the slope of the tangent at the current condensing temperature for the relational expression of the input energy $P_{Outdoor\ fan}$ to the outdoor fan motor 19*m* in relation to the condensing temperature Tc (the value attained by substituting the current condensing temperature Tc1 into the relational expression attained in the first-order differential based on the condensing temperature).

In step S42, the control unit 207 obtains the relational expression of a first-order differential based on the condensing temperature under conditions in which the capacity Q of the outdoor heat exchanger 17 is kept constant, for the relational expression of the input energy to the compressor drive motor 15*m* in relation to the condensing temperature Tc. The current condensing temperature is thereafter substituted into the relational expression of the first-order differential thus obtained to ascertain the trend of the change in the input energy $P_{Comp}$ to the compressor drive motor 15*m* when the current condensing temperature has been changed. Specifically, $dP_{Comp}/dTc$ is ascertained as the slope of the tangent at the current condensing temperature Tc1 for the relational expression of the input energy $P_{Comp}$ to the compressor drive motor 15*m* in relation to the condensing temperature Tc (the value attained by substituting the current condensing temperature Tc1 into the relational expression attained in the first-order differential based on the condensing temperature).

In step S43, the control unit 207 calculates the total of the value (the value ascertained in step S41) attained by substituting the current condensing temperature into a relational expression attained by using the condensing temperature to carry out a first-order differential of the relational expression of the input energy $P_{Outdoor\ fan}$ to the outdoor fan motor 19*m* in relation to the condensing temperature Tc; and the value (the value ascertained in step S42) attained by substituting the current condensing temperature into a relational expression attained by using the condensing temperature to carry out a first-order differential of the relational expression of the input energy $P_{Comp}$ to the compressor drive motor 15*m* in relation to the condensing temperature Tc.

In step S44, the control unit 207 multiplies the total attained in step S43 by a predetermined constant Kc white inverting the sign to calculate the amount of change ΔTcs in the target condensing temperature updated from the current condensing temperature in the same manner as the first embodiment).

In step S45, the control unit 207 adds the amount of change ΔTcs in the target condensing temperature ascertained in step S44 to the current condensing temperature to update the target condensing temperature.

In step S46, the control unit 207 controls the outdoor fan motor 19*m* so as to achieve the updated target condensing temperature. Specifically, the control unit 207 controls the rotating speed of the outdoor fan motor 19*m* so that the condensing temperature of the refrigeration cycle reaches the updated target condensing temperature. Thus, the refrigeration cycle is controlled so that the updated target condensing temperature is reached, whereby the rotating speed of the indoor fan motor 47*m* of the indoor fan 47, which has been controlled so that the indoor temperature set for the indoor unit 4 is achieved, the rotating speed of the indoor fan motor 57*m* of the indoor fan 57, which has been controlled so that the indoor temperature set for the indoor unit 5 is achieved, and the rotating speed of the indoor fan motor 67*m* of the indoor fan 67, which has been controlled so that the indoor temperature set for the indoor unit 6 is achieved, are changed as a result.

In step S47, the control unit 207 stands by for a predetermined length of time (in this case, five minutes) in order to allow the operating state of the refrigeration cycle to stabilize at the target condensing temperature. The process thereafter returns to step S41 and processing is continued.

(2-3) Energy-Saving Control by Optimization of the Evaporation Temperature Te

Figure 12:
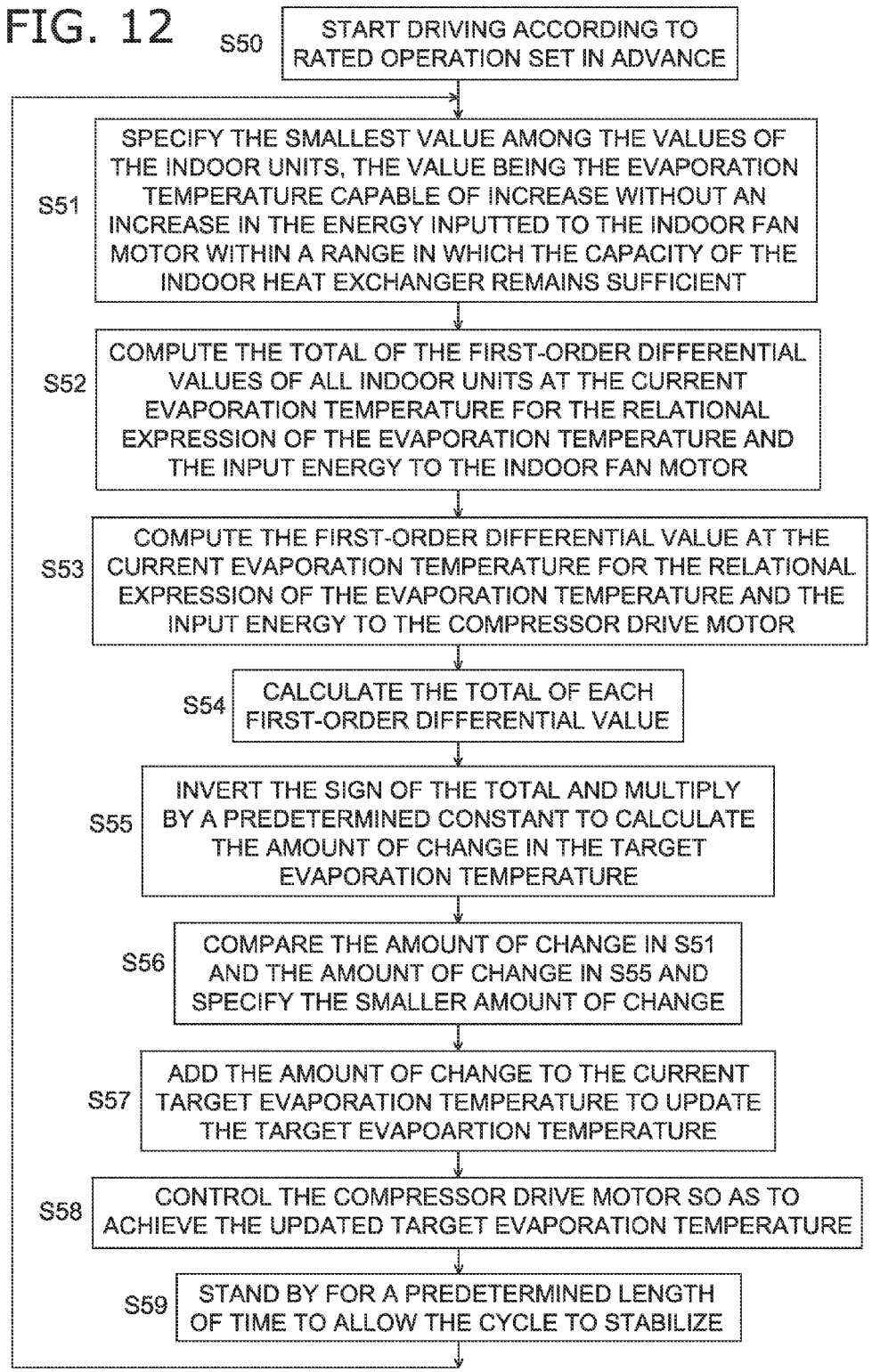
FIG. 12 is a control flowchart of energy-savings control carried out by optimization of the evaporation temperature in accordance with the second embodiment.

Described below is an example of energy-saving control by optimization of the evaporation temperature Te in the case that an air-cooling operation is to be carried out in the refrigeration cycle system 200. The energy-saving control carried out by optimization of the evaporation temperature Te may be allowed to proceed at the same time as energy-saving control carried out by optimization of the condensing temperature Te described above, and in such a case, the timing for processing the energy-saving controls is preferably offset. In an air-warming operation, the compressor drive motor 15*m* is controlled so that a target condensing temperature is achieved, and the outdoor fan motor 19*m* is controlled so that a target evaporation temperature is achieved. Control is otherwise the same as in the air-cooling operation described below, and a description of air-warming operation is therefore omitted, FIG. 12 shows a flowchart of energy-savings control carried out by the control unit 207 by optimization of the evaporation temperature Te.

With this control, processing is carried out to update the current target evaporation temperature to a target evaporation temperature capable of reducing the total of the input energy to the indoor fan motor 47*m*, the input energy to the indoor fan motor 57*m*, the input energy to the indoor fan motor 67*m*, and the input energy to the compressor drive motor 15*m* to less than the current level.

In step S50, the control unit 207 controls the indoor fan motor 47*m*, the indoor fan motor 57*m*, the indoor fan motor 67*m*, and the compressor drive motor 15*m* so as to comply with rated operating conditions set in advance when an instruction for energy-saving control carried out by optimization of the evaporation temperature Te is received via the controller 9. Specifically, the rotating speed of the outdoor fan motor 19*m* is controlled so that the condensing temperature arrives at an initial target condensing temperature. The drive frequency of the compressor drive motor 15*m* is controlled so that the evaporation temperature arrives at an initial target evaporation temperature.

In step S51, the control unit 207 calculates the amount of change ΔTe in the evaporation temperature that can be increased from the current level in a range in which the capacity required in the indoor heat exchanger 45 does not become insufficient.

The control unit 207 calculates the capacity required in the indoor heat exchanger 45 on the basis of the temperature setting set for the indoor unit 4, the indoor temperature detected by the indoor temperature sensor 49, the current value of the input energy to the indoor fan motor 47*m*, and the heat exchanger characteristic formula of the indoor heat exchanger 45 (more preferably, also the fan input characteristic formula of the indoor fan motor 47*m*).

In the same fashion, the control unit 207 calculates the amount of change ΔTe in the evaporation temperature that can be increased from the current level in a range in which the capacity required in the indoor heat exchanger 55 does not become insufficient. The control unit 207 calculates the capacity required in the indoor heat exchanger 55 on the basis of the temperature setting set for the indoor unit 5, the indoor temperature detected by the indoor temperature sensor 59, the current value of the input energy to the indoor fan motor 57$m$, and the heat exchanger characteristic formula of the indoor heat exchanger 55 (more (preferably, also the fan input characteristic formula of the indoor fan motor 57$m$).

Furthermore, the control unit 207 calculates the amount of change $\Delta$Te in the evaporation temperature that can be increased from the current level in a range in which the capacity required in the indoor heat exchanger 65 does not become insufficient. The control unit 207 calculates the capacity required in the indoor heat exchanger 65 on the basis of the temperature setting set for the indoor unit 6, the indoor temperature detected by the indoor temperature sensor 69, the current value of the input energy to the indoor fan motor 67$m$, and the heat exchanger characteristic formula of the indoor heat exchanger 65 (more preferably, also the fan input characteristic formula of the indoor fan motor 67$m$).

The control unit 207 moreover selects the lowest value from among the values of the amount of change $\Delta$Te in the evaporation temperature that can be increased from the current level as calculated for the indoor units 4, 5, 6, and sets the selected value to be the $\Delta$Tes$_a$. In this case, specifying $\Delta$Tes$_a$ having the minimum value of the amount of change $\Delta$Te in the evaporation temperature that can be increased from the current value ensures that there is never insufficient capacity in any of the indoor units 4, 5, 6.

In step S52, the control unit 207 obtains the sum of the trends in change (slopes of the tangent) in the energy inputted to the indoor fan motors 47$m$, 0.57$m$, 67$m$ of the indoor units 4, 5, 6.

First, the control unit 207 obtains the relational expression of a first-order differential based on the evaporation temperature Te under conditions in which the capacity Q of the indoor heat exchanger 45 is kept constant, for the relational expression of the input energy $P_{Indoor\,fan\,1}$ (e.g., $P_{Indoor\,fan\,1} = y_1N^3 + y_2N^3 + y_3N$) to the indoor fan motor 47$m$ in relation to the evaporation temperature Te, and substitutes the current evaporation temperature into the relational expression of a first-order differential to ascertain the trend in change of the input energy $P_{Indoor\,fan\,1}$ to the indoor fan motor 47$m$ (the slope of the tangent at the current evaporation temperature for the relational expression of the input energy $P_{Indoor\,fan\,1}$ to the indoor fan motor 47$m$ in relation to the evaporation temperature Te) when the current evaporation temperature has been changed.

In the same fashion, the control unit 207 obtains the relational expression of a first order differential based on the evaporation temperature Te under conditions in which the capacity Q of the indoor heat exchanger 55 is kept constant, for the relational expression of the input energy $P_{Indoor\,fan\,2}$ (e.g., $P_{Indoor\,fan\,2} = y_4N^3 + y_5N^2 + y_6N$, which may be exactly the same as or different from $P_{Indoor\,fan\,1}$) to the indoor fan motor 57$m$ in relation to the evaporation temperature Te, and substitutes the current evaporation temperature into the relational expression of a first-order differential to ascertain the trend in change of the input energy $P_{Indoor\,fan\,2}$ to the indoor fan motor 57$m$ (the slope of the tangent at the current evaporation temperature for the relational expression of the input energy $P_{Indoor\,fan\,2}$ to the indoor fan motor 57$m$ in relation to the evaporation temperature Te) when the current evaporation temperature has been changed.

The control unit 207 furthermore obtains the relational expression of a first-order differential based on the evaporation temperature Te under conditions in which the capacity Q of the indoor heat exchanger 65 is kept constant, for the relational expression of the input energy $P_{Indoor\,fan\,3}$ (e.g., $P_{Indoor\,fan\,3} = y_7N^3 + y_8N^2 + y_9N$, which may be exactly the same as or different from $P_{Indoor\,fan\,1}$ and/or $P_{Indoor\,fan\,2}$) to the indoor fan motor 67$m$ in relation to the evaporation temperature Te, and substitutes the current evaporation temperature into the relational expression of a first-order differential to ascertain the trend in change of the input energy $P_{Indoor\,fan\,3}$ to the indoor fan motor 67$m$ (the slope of the tangent at the current evaporation temperature for the relational expression of the input energy $P_{Indoor\,fan\,3}$ to the indoor fan motor 67$m$ in relation to the evaporation temperature Te) when the current evaporation temperature has been changed.

The control unit 207 obtains the sum by totaling the values of the slopes of the tangent obtained for each of the indoor units 4, 5, 6.

In step S53, the control unit 207 obtains the relational expression of the first-order differential based on the evaporation temperature Te for the relational expression of the input energy to the compressor drive motor 15$m$ in relation to the evaporation temperature Te. The current evaporation temperature is thereafter substituted into the relational expression of the first-order differential thus obtained to ascertain the trend of the change in the input energy $P_{Comp}$ to the compressor drive motor 15$m$ (the slope of the tangent at the current evaporation temperature for the relational expression of the input energy $P_{Comp}$ to the compressor drive motor 15$m$ in relation to the evaporation temperature) when the current evaporation temperature has been changed.

In step S54, the control unit 207 calculates the total of the value ascertained in step S52 and the value ascertained in step S53.

In step S55, the control unit 207 multiplies the total attained in step S54 by a predetermined constant Ke while inverting the sign to calculate the amount of change $\Delta$Tes$_b$ in the target evaporation temperature updated from the current evaporation temperature, in the same manner as in the first embodiment.

In step S56, the control unit 207 compares the amount of change $\Delta$Tes$_a$ in the evaporation temperature calculated in step S51 and the amount of change $\Delta$Tes$_b$ in the evaporation temperature obtained in step S55, and specifies the smaller amount of change. The amount of change $\Delta$Tes in the target evaporation temperature updated from the current evaporation temperature and that allows energy to be saved can be thereby ascertained in a range in which the capacity required in the indoor units 4, 5, 6 will not be insufficient.

In step S57, the control unit 207 adds the amount of change $\Delta$Tes in the target evaporation temperature ascertained in step S56 to the current evaporation temperature to update the target evaporation temperature.

In step S58, the control unit 207 controls the compressor drive motor 15$m$ so as to achieve the target evaporation temperature updated in step S57. Specifically, the drive frequency of the compressor drive motor 15$m$ is controlled so that the evaporation temperature of the refrigeration cycle reaches the updated target evaporation temperature.

Thus, the refrigeration cycle is controlled so that the updated target evaporation temperature is reached, whereby the rotating speed of the indoor fan motor 47$m$ of the indoor fan 47, which has been controlled so that the indoor temperature set for the indoor unit 4 is achieved, the rotating speed of the indoor fan motor 57$m$ of the indoor fan 57, which has been controlled so that the indoor temperature set for the indoor unit 5 is achieved, and the rotating speed of the indoor fan motor 67$m$ of the indoor fan 67, which has been controlled so that the indoor temperature set for the indoor unit 6 is achieved, are changed as a result.

In step S59, the control unit 207 stands by for a predetermined length of time (in this case, five minutes) in order to allow the operating state of the refrigeration cycle to stabilize at the target evaporation temperature. The process thereafter returns to step S51 and processing is continued, (2-4) Energy-Saving Control by Optimization of the Condensing Temperature Tc and the Evaporation Temperature Te Described below is an example of energy-saving control by optimization of both the condensing temperature Tc and the evaporation temperature Te in the case that an air-cooling operation is to be carried out in the refrigeration cycle system 200. In an air-warming operation, the compressor drive motor 15*m* is controlled so that a target condensing temperature is achieved, the outdoor fan motor 19*m* is controlled so that a target evaporation temperature is achieved, and the updated condensing temperature Tc is kept within a range that allows the capacity of the indoor heat exchanger 45, 55, 65 to be maintained. Control is otherwise the same as in the air-cooling operation described below, and a description of air warming operation is therefore omitted.

Figure 13:
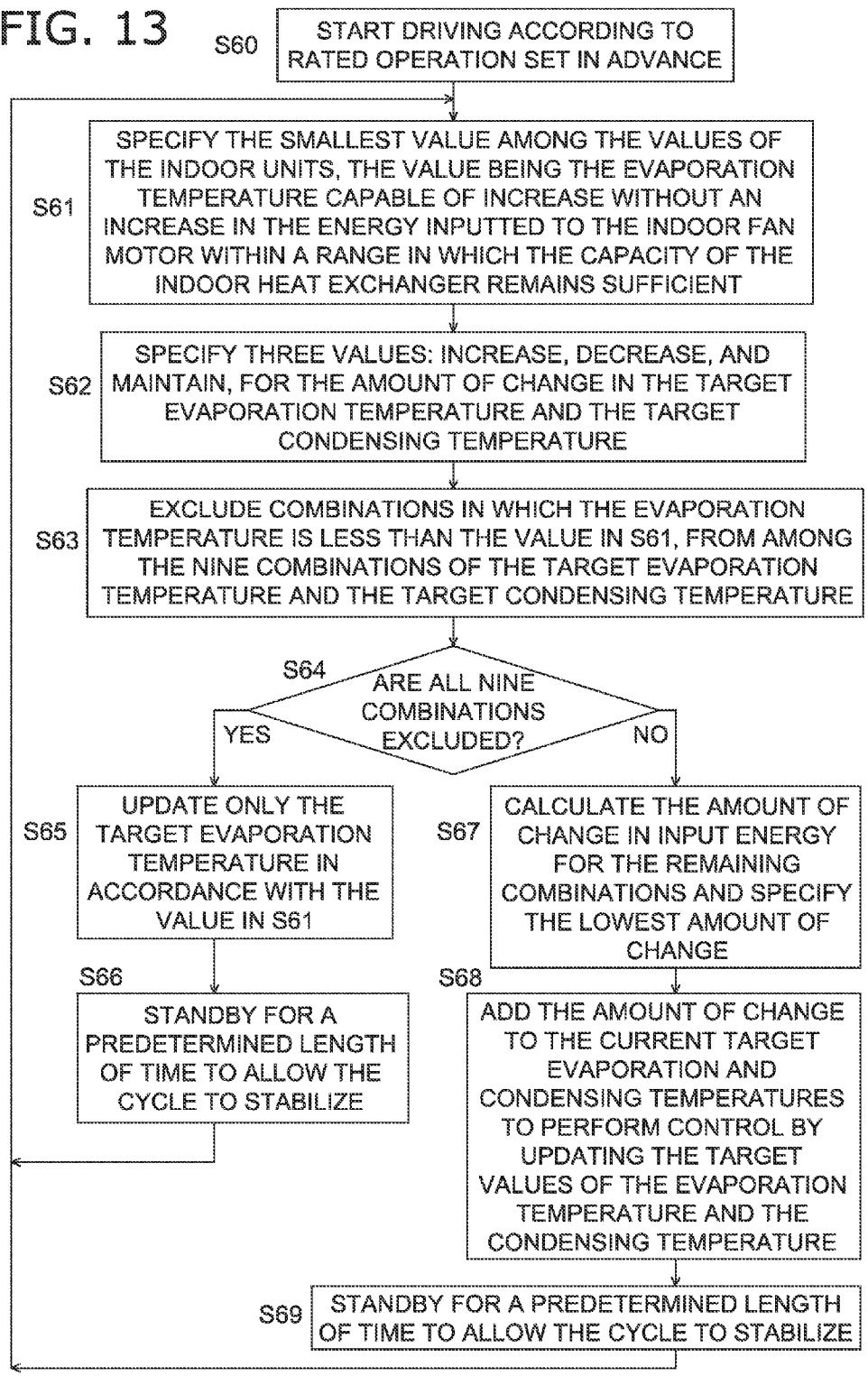
FIG. 13 is a control flowchart of energy-savings control carried out by optimization of both the condensing temperature and the evaporation temperature in accordance with the second embodiment.

FIG. 13 shows a flowchart of energy-savings control by optimization of both the condensing temperature Te and the evaporation temperature Te carried out by the control unit 207. With this control, processing is carried out to update the current target condensing temperature and the current target evaporation temperature to a target condensing temperature and a target evaporation temperature capable of reducing the total of the input energy to the indoor fan motor 47*m*, the input energy to the indoor fan motor 57*m*, the input energy to the indoor fan motor 67*m*, the input energy to the compressor drive motor 15*m*, and the input energy to the outdoor fan motor 19*m* to less than the current level.

In step S60, the control unit 207 controls the outdoor fan motor 19*m*, the indoor fan motor 47*m*, the indoor fan motor 57*m*, the indoor fan motor 67*m*, and the compressor drive motor 15*m* so as to comply with rated operating conditions set in advance when an instruction for energy-saving control by optimization of both the condensing temperature Tc and the evaporation temperature Te is received via the controller 9. Specifically; the rotating speed of the outdoor fan motor 19*m* is controlled so that the condensing temperature arrives at an initial target condensing temperature. The drive frequency of the compressor drive motor 15*m* is controlled so that the evaporation temperature arrives at an initial target evaporation temperature.

In step S61, the control unit 207 selects the lowest value from among the values in the indoor units 4, 5, 6 having an amount of change ΔTe in the evaporation temperature that can be increased from the current level and uses the selected value as the $\Delta Tes_a$, in the same manner as in step S51 for energy-saving control by optimization of the evaporation temperature Te. The amount of change in the evaporation temperature is calculated as a negative value when there is no leeway in the capacity of the indoor heat exchangers 45, 55, 65 and the evaporation temperature Te must be reduced (i.e., when the capacity must be increased).

In step S62, the control unit 207 provides three values for the amount of change ΔTe in the target evaporation temperature updated from the current evaporation temperature, and also provides three values for the amount of change ΔTc in the target condensing temperature updated from the current condensing temperature.

Specifically, the following values h) to j) are provided as the amount of change ΔTe to the target evaporation temperature updated from the current evaporation temperature.

h) A ($T_{Average\ room\ temperature}$−Te)
i) −A ($T_{Average\ room\ temperature}$−Te)
j) 0

In this case, A is a constant equal to or less than 1 for regulating the evaporation temperature, and is a value set in advance (may be set in a range of e.g., 0.03 to 0.05 as a preferred range.). Te is the current target evaporation temperature. $T_{Average\ room\ temperature}$ is the average value of the temperature detected by the indoor temperature sensor 49, the temperature detected by the indoor temperature sensor 59, and the temperature detected by the indoor temperature sensor 69. Also, h) corresponds to a change that increases the target evaporation temperature, i) corresponds to a change that reduces the target evaporation temperature, and j) corresponds to when the target evaporation temperature is not modified.

Specifically, the following values k) to in) are provided as the amount of change ΔTc to the target condensing temperature updated from the current condensing temperature.

k) B (Tc−$T_{Outdoor\ temperature}$)
l) −B (Tc−$T_{Outdoor\ temperature}$)
m) 0

In this case, B is a constant equal to or less than 1 for regulating the condensing temperature, and is a value set in advance (may be set in a range of, e.g., 0.03 to 0.05 as a preferred range). Tc is the current target condensing temperature. $T_{Outdoor\ temperature}$ is the temperature detected by the outdoor temperature sensor 11. Also, k) corresponds to a change that increases the target condensing temperature, l) corresponds to a change that reduces the target condensing temperature, and in) corresponds to when the target condensing temperature is not modified.

In step S63, the control unit 207 processes nine combinations available from the three "amounts of change ΔTe to the target evaporation temperature updated from the current evaporation temperature" and the three "amounts of change ΔTc to the target condensing temperature updated from the current condensing temperature," described above and excludes the combinations that exceed the amount of change $\Delta Tes_a$ in the evaporation temperature calculated in step S61.

In step S64, the control unit 207 determines whether all of the nine combinations have been excluded in step S63. When it has been determined that all nine combinations have been excluded, the process proceeds to step S65. When there are no excluded combinations or when a portion of the nine combinations have been excluded, the process proceeds to step S67.

In step S65, the control unit 207 sets the value attained by changing the current evaporation temperature by the amount of change $\Delta Tes_a$ in the evaporation temperature calculated in step S61 to be the updated target evaporation temperature. The control unit 207 controls the drive frequency of the compressor drive motor 15*m* so that the evaporation temperature of the refrigeration cycle reaches the updated target evaporation temperature, and the process proceeds to step S66. Thus, the refrigeration cycle is controlled so that the updated target evaporation temperature is reached, whereby the rotating speed of the indoor fan motor 47*m* of the indoor fan 47, which has been controlled so that the indoor temperature set for the indoor unit 4 is achieved, the rotating speed of the indoor fan motor 57*m* of the indoor fan 57, which has been controlled so that the indoor temperature set for the indoor unit 5 is achieved, and the rotating speed of the indoor fan motor 67*m* of the indoor fan 67, which has been controlled on that the indoor temperature set for the indoor unit 6 is achieved, are changed as a result.

In step S66, the control unit 207 stands by for a predetermined length of time (in this case, five minutes) in order to allow the operating state of the refrigeration cycle to stabilize at the target evaporation temperature. The process thereafter returns to step Sol and processing is continued.

In step S67, the control unit 207 calculates the total of the amount of change in the input energy for each of the remaining combinations that were not excluded in step S64 from among the nine combinations described above.

Specifically, the control unit 207 obtains the relational expression of a first-order differential based on the evaporation temperature for the relational expression of the input energy $P_{Indoor\ fan\ 1}$ to the indoor fan motor 47m in relation to the evaporation temperature Te. The current evaporation temperature is thereafter substituted into the relational expression of the first-order differential thus obtained to obtain the current slope of the tangent related to the indoor fan motor 47m. This processing is similarly carried out for the indoor fan motor 57m and the indoor fan motor 67m as welt. The control unit 207 furthermore obtains the relational expression of a first-order differential based on the evaporation temperature for the relational expression of the input energy to the compressor drive motor 15m in relation to the evaporation temperature Te. The current evaporation temperature is thereafter substituted into the relational expression of the first-order differential thus obtained to obtain the current slope of the tangent related to the relationship between the compressor drive motor 15m and the evaporation temperature. The control unit 207 then obtains the total of the slopes of the tangents, i.e., the total of the current slope of the tangent related to the indoor fan motor 47m, the current slope of the tangent related to the indoor fan motor 57m, the current slope of the tangent related to the indoor fan motor 67m, and the current slope of the tangent related to the relationship between the compressor drive motor 15m and the evaporation temperature. Moreover, the control unit 207 multiplies the total of the slopes of tangents by the value of h), i), and j) for each combination to thereby calculate the amount of change in the input energy assumed for the case in which there has been a change from the current evaporation temperature.

The control unit 207 carries out the same processing for the condensing temperature Tc. In other words, the control unit 207 obtains the relational expression of a first-order differential based on the condensing temperature for the relational expression of the input energy $P_{Outdoor\ fan}$ to the outdoor fan motor 19m in relation to the condensing temperature Tc. The current condensing temperature is thereafter substituted into the relational expression of the first-order differential thus obtained to obtain the current slope of the tangent related to the outdoor fan motor 19m. The control unit 207 furthermore obtains the relational expression of a first-order differential based on the condensing temperature for the relational expression of the input energy to the compressor drive motor 15m in relation to the condensing temperature Tc. The current condensing temperature is thereafter substituted into the relational expression of the first-order differential thus Obtained to obtain the current slope of the tangent related to the relationship between the compressor drive motor 15m and the condensing temperature. The control unit 207 then obtains the total of the slopes of the tangents, which is the total of the current slope of the tangent related to the outdoor fan motor 19m and the current slope of the tangent related to the relationship between the compressor drive motor 15m and the condensing temperature. Moreover, the control unit 207 multiplies the total of the slopes of tangents by the value of k), l), and m) for each combination to thereby calculate the amount of change in the input energy assumed for the case in which there has been a change from the current condensing temperature.

In accordance with the above, the total of the amounts of change in the input energy is calculated for each of the remaining combinations that were not excluded in step S64. The combination in which the total of the amounts of change in the input energy is at the minimum value is specified, the combination being the amount of change $\Delta Te$ to the target evaporation temperature updated from the current evaporation temperature and the amount of change $\Delta Tc$ to the target condensing temperature updated from the current condensing temperature.

In step S68, the control unit 207 reflects the combination of the amount of change $\Delta Tc$ in the condensing temperature and the amount of change $\Delta Te$ in the evaporation temperature specified in step S67 to have the minimum total amount of change in the input energy, and updates the target condensing temperature while also updating the target evaporation temperature. In other words, the value attained by adding the amount of change $\Delta Te$ in the evaporation temperature, which has been specified as being the combination having the minimum total amount of change in the input energy in step S67, to the current evaporation temperature is used as the updated target evaporation temperature. Also, the value attained by adding the amount of change $\Delta Tc$ in the condensing temperature, which has been specified as being the combination having the minimum total amount of change in the input energy in step S67, to the current condensing temperature is used as the updated target condensing temperature. The control unit 207 controls the rotating speed of the outdoor fan motor 19m on that the condensing temperature of the refrigeration cycle reaches the updated target condensing temperature, and controls the drive frequency of the compressor drive motor 15m so that the evaporation temperature of the refrigeration cycle reaches the updated target evaporation temperature.

Thus, control is carried out an that the updated target evaporation temperature and the updated target condensing temperature of the refrigeration cycle are achieved, whereby the rotating speed of the indoor fan motor 47m of the indoor fan 47, which has been controlled so that the indoor temperature set for the indoor unit 4 is achieved, the rotating speed of the indoor fan motor 57m of the indoor fan 57, which has been controlled so that the indoor temperature set for the indoor unit 5 is achieved, and the rotating speed of the indoor fan motor 67m of the indoor fan 67, which has been controlled so that the indoor temperature set for the indoor unit 6 is achieved, are changed as a result.

In step S69, the control unit 207 stands by for a predetermined length of time (in this case, five minutes) in order to allow the operating state of the refrigeration cycle to stabilize at the updated target evaporation temperature and the updated target condensing temperature.

The process thereafter returns to step S61 and processing is continued.

(2-5) Characteristics of the Second Embodiment

The same effects as in the first embodiment can be attained in the refrigeration cycle system 200 of the second embodiment.

In the refrigeration cycle system 200 of the second embodiment, the computational processing load can be reduced while the amount of information required to be specified in advance is reduced, and it is possible to obtain rapid stabilization of the operating state, with the total amount of required input energy being minimized white consideration is given to actual installation conditions, even when a plurality of indoor units 4, 5, 6 are disposed.

The processing described above can be carried out within the range of capacity required in the indoor heat exchanger 45, the indoor heat exchanger 55, and the indoor heat exchanger 65.

Ordinarily, in a system with a small number of indoor units, e.g., a single indoor unit, the input energy consumed by the compressor drive motor 15m is the majority of the entire amount of input energy in the system. Accordingly, energy-saving effect is readily attained even when control is carried out to focus on energy-savings in the input energy consumed by the compressor drive motor 15m without condensing the input energy consumed inside the indoor unit. In contrast, in the refrigeration cycle system 200 of the second embodiment, a plurality of indoor units 4, 5, 6 are disposed. Accordingly, the ratio of the input energy consumed by a plurality of indoor fan motors 47m, 57m, 67m in a plurality of indoor units 4, 5, 6 in relation to the entire input energy in the system is higher in comparison with a system having a single indoor unit and a single indoor fan motor. Therefore, as described above, energy-saving effect is easily attained when control is carried out to minimize the total input energy to the compressor drive motor 15m, the indoor fan motors 47m, 57m, 67m, and the outdoor fan motor 19m.

(3) Third Embodiment

An example of the refrigeration cycle system of a third embodiment of the present invention will be described below with reference to the drawings.

Figure 14:
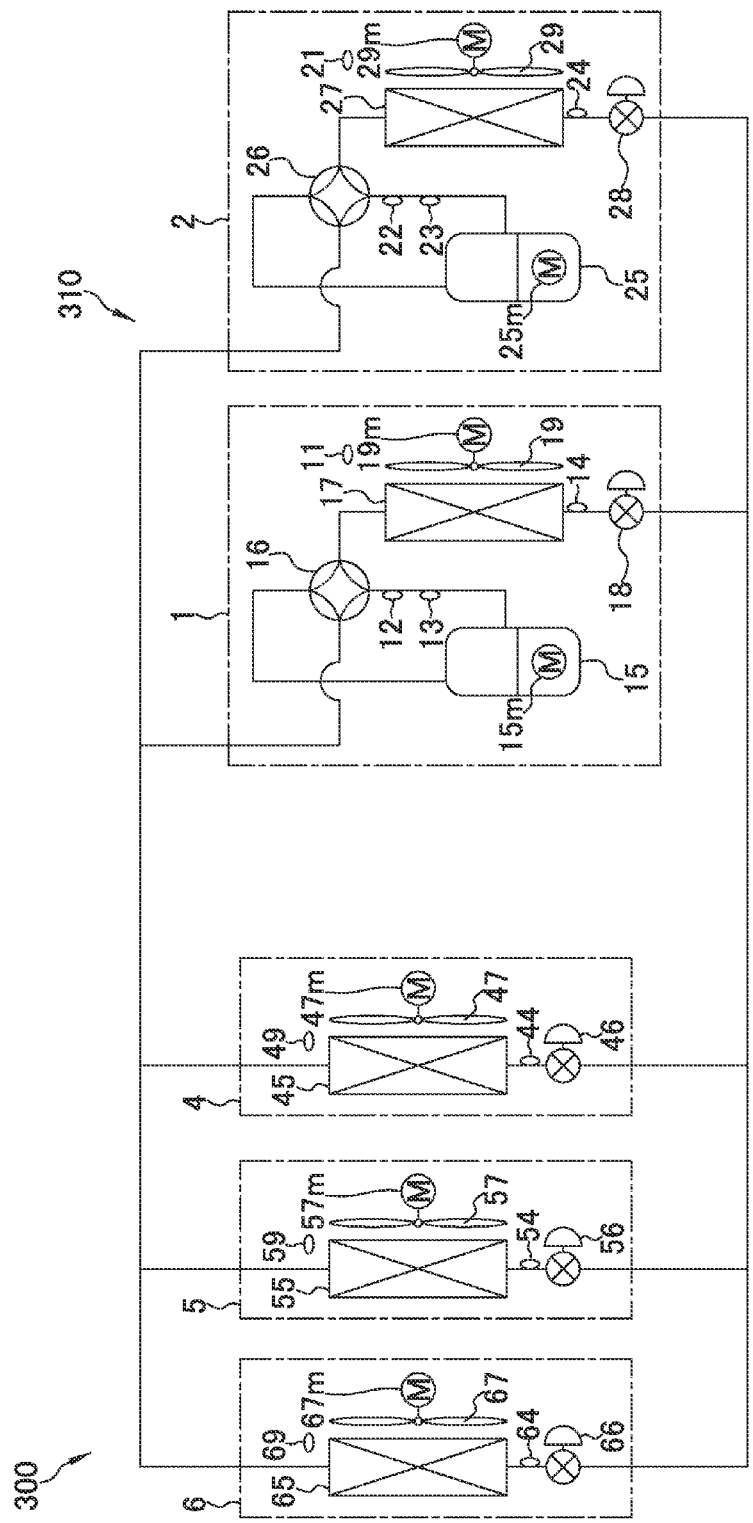
FIG. 14 is a refrigerant circuit diagram of the refrigeration cycle system of the third embodiment.
Figure 15:
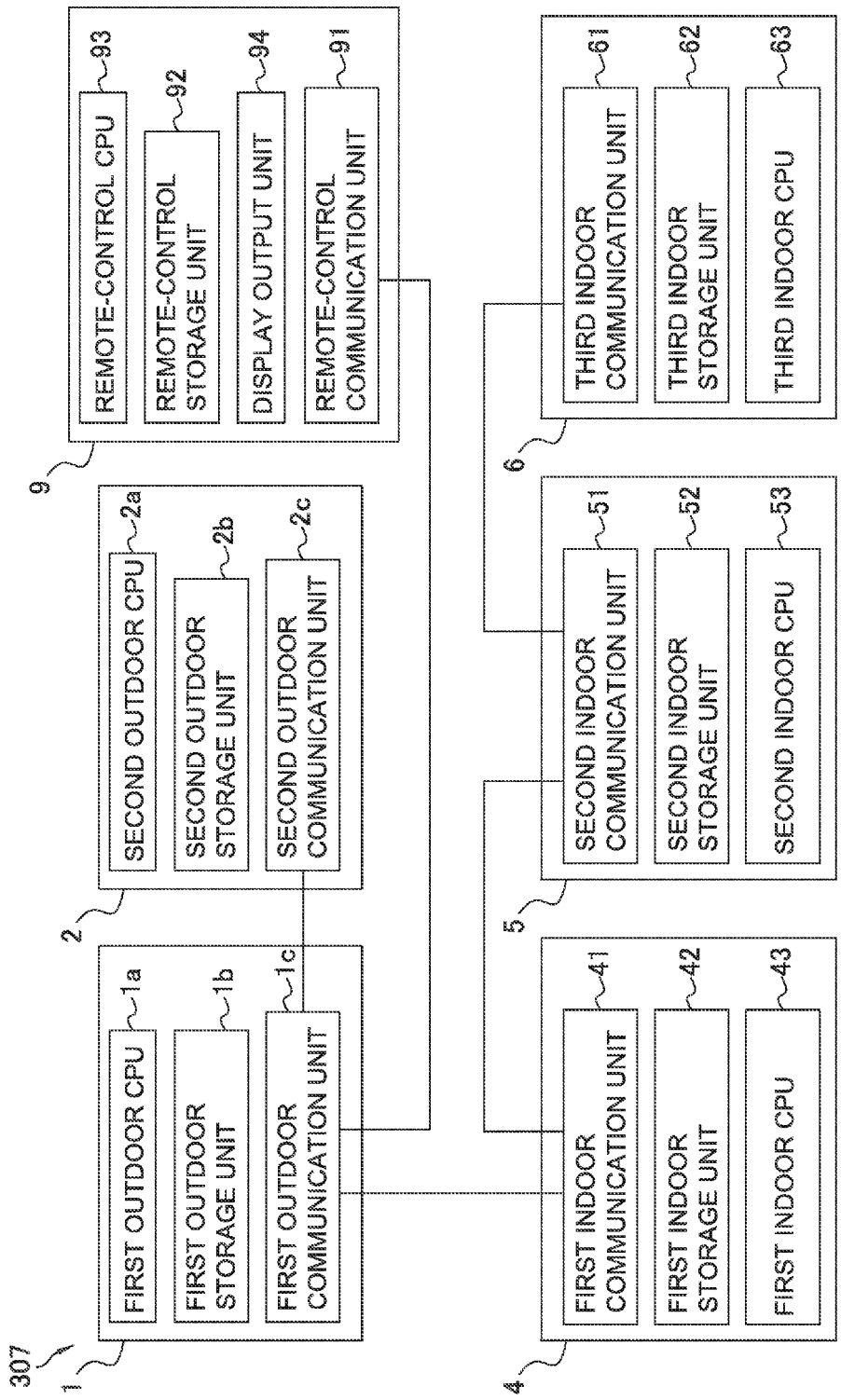
FIG. 15 is a block diagram of the third embodiment.
Figure 16:
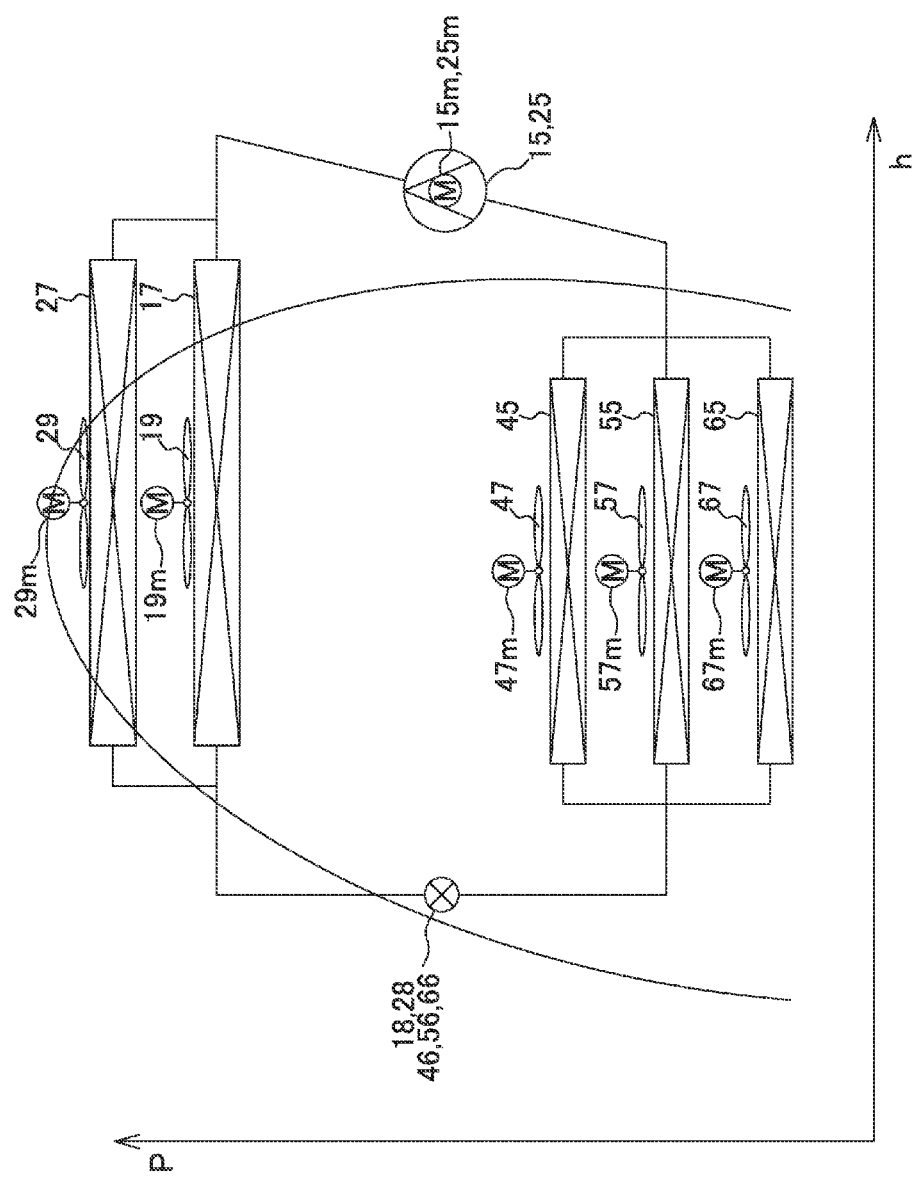
FIG. 16 is a PH diagram according to the third embodiment.

FIG. 14 shows a refrigerant circuit diagram of a refrigeration cycle system 300. FIG. 15 shows a block diagram. FIG. 16 shows a PH diagram, (3-1) Overall Configuration of the Refrigeration Cycle System 300

The refrigeration cycle system 300 is provided with a refrigerant circuit 310 in which an outdoor unit 2 has been added in parallel to the refrigerant circuit 210 of the refrigeration cycle system 200 in the second embodiment described above. The same reference numerals are used for essentially the same members as in the first and second embodiments, and a description thereof is omitted.

A compressor 25, a four-way switching valve 26, an outdoor heat exchanger 27, an outdoor expansion valve 28, an outdoor fan 29, an outdoor temperature sensor 21, a discharge refrigerant temperature sensor 22, a discharge refrigerant pressure sensor 23, and an outdoor heat exchanger temperature sensor 24 are disposed inside the outdoor unit 2. A compressor drive motor 25m, an outdoor fan motor 29m, a second outdoor CPU 2a, a second outdoor storage unit 2b, and a second outdoor communication unit 2c are furthermore disposed inside the outdoor unit 2. The outdoor temperature sensor 21 detects the temperature of outdoor air prior to its passage through the outdoor heat exchanger 27, and sends information about the outdoor temperature to the second outdoor CPU 2a. The discharge refrigerant temperature sensor 22 detects the temperature of refrigerant flowing through the discharge side of the compressor 25, and sends information about the discharge refrigerant temperature to the second outdoor CPU 2a. The discharge refrigerant pressure sensor 23 detects the pressure of refrigerant flowing through the discharge side of the compressor 25, and send information about the discharge refrigerant pressure to the second outdoor CPU 2a. The outdoor heat exchanger temperature sensor 24 detects the temperature of refrigerant flowing through the interior of the outdoor heat exchanger 27, and sends the information about the outdoor heat exchanger temperature to the second outdoor CPU 2a. The compressor drive motor 25m is an actuator for the compressor 25, the outdoor fan motor 29m is an actuator for the outdoor fan 29, and these motors are driven under the control of the second outdoor CPU 2a. The second outdoor communication unit 2c is connected to the first outdoor communication unit 1c in the outdoor unit 1 via a transmission line, and carries out information exchange. A relational expression of the input energy to the outdoor fan motor 29m in relation to the condensing temperature Tc, a relational expression of the input energy to the compressor drive motor 25m in relation to the condensing temperature Tc, a relational expression of the input energy to the compressor drive motor 15m in relation to the evaporation temperature Te for each of the indoor units 4, 5, 6, and other relational expressions are stored in the second outdoor storage unit 2b, and are used in energy-saving control carried out by a later-described control unit 307. A specific example of the relational expression is the same as that in the first and second embodiments described above.

The control unit 307 of the present embodiment is configured by mutual connection via a transmission line of: a first outdoor CPU 1a, a first outdoor storage unit 1b, and a first outdoor communication unit 1c in the outdoor unit 1; the second outdoor CPU 2a, the second outdoor storage unit 2b, and the second outdoor communication unit 2c in the outdoor unit 2; a first indoor communication unit 41, a first indoor storage unit 42, and a first indoor CPU 43 in the indoor unit 4; a second indoor communication unit 51, a second indoor storage unit 52, and a second indoor CPU 53 in the indoor unit 5; a third indoor communication unit 61, a third indoor storage unit 62, and a third indoor CPU 63 in the indoor unit 6; and a remote-control communication unit 91, a remote-control storage unit 92, and a remote-control CPU 93 in the controller 9, as shown in FIG. 15. The control unit 307 changes the state of the refrigerant in the manner indicated by, e.g., the PH diagram shown in FIG. 16 to carry out a refrigeration cycle in the case that an air-cooling operation is to be carried out in the refrigeration cycle system 300. In this case, the control unit 307 controls the drive frequency of the compressor drive motor 15m, the rotating speed of the outdoor fan motor 19m, the opening degree of the outdoor expansion valve 18, the drive frequency of the compressor drive motor 25m, the rotating speed of the outdoor fan motor 29m, the opening degree of the outdoor expansion valve 28 and the indoor expansion valve 46, the rotating speed of the indoor fan motor 47m, the opening degree of the indoor expansion valve 56, the rotating speed of the indoor fan motor 57m, the opening degree of the indoor expansion valve 66, and the rotating speed of the indoor fan motor 67m.

(3-1-1) Air-Cooling Operation Control

During air-cooling operation, the control unit 307 controls the opening degree of the indoor expansion valves 46, 56, 66 so that the degree of superheating of the intake refrigerant of the compressor 15 and the compressor 25 is constant at the same value, while the outdoor expansion valve 18 is controlled so as to be in a fully open state.

Also during air-cooling operation, the control unit 307 also controls the drive frequency of the compressor drive motor 15m of the compressor 15 and the drive frequency of the compressor drive motor 25m of the compressor 25 so that the evaporation temperature of the refrigeration cycle reaches the most recent target evaporation temperature (the updated target evaporation temperature described for each control below).

Also during air-cooling operation, the control unit 307 controls the rotating speed of the outdoor fan motor 19m of the outdoor fan 19 and the rotating speed of the outdoor fan motor 29m of the outdoor fan 29 so that the condensing temperature of the refrigeration cycle reaches the most recent target condensing temperature (the updated target condensing temperature described for each control below).

Furthermore, during air-cooling operation, the control unit 307 controls the rotating speed of the indoor fan motor 47m of the indoor fan 47 so as to achieve the indoor temperature set in the indoor unit 4, controls the rotating speed of the indoor fan motor 57m of the indoor fan 57 on as to achieve the indoor temperature set in the indoor unit 5, and controls the rotating speed of the indoor fan motor 67m of the indoor fan 67 so as to achieve the indoor temperature set in the indoor unit 6.

(3-1-2) Air-Warming Operation Control

During air-warming operation, the control unit 307 controls the opening degree of the outdoor expansion valve 18 and the outdoor expansion valve 28 so that the degree of superheating of the intake refrigerant of the compressor 15 and the intake refrigerant of the compressor 25 are constant as the same value, while setting the indoor expansion valves 46, 56, 66 in a fully open state.

Also during air-warming operation, the control unit 307 controls the drive frequency of the compressor drive motor 15m of the compressor 15 and the drive frequency of the compressor drive motor 25m of the compressor 25 so that the condensing temperature of the refrigeration cycle reaches the most recent target condensing temperature (the updated target condensing temperature described for each control below).

Also during air-warming operation, the control unit 307 controls the rotating speed of the outdoor fan motor 19m of the outdoor fan 19 and the rotating speed of the outdoor fan motor 29m of the outdoor fan 29 so that the evaporation temperature of the refrigeration cycle reaches the most recent target evaporation temperature (the updated target evaporation temperature described for each control below).

Furthermore, during air-warming operation, the control unit 307 controls the rotating speed of the indoor fan motor 47m of the indoor fan 47 so as to achieve the indoor temperature set in the indoor unit 4, controls the rotating speed of the indoor fan motor 57m of the indoor fan 57 so as to achieve the indoor temperature set in the indoor unit 5, and controls the rotating speed of the indoor fan motor 67m of the indoor fan 67 so as to achieve the indoor temperature set in the indoor unit 6.

(3-2) Energy-Saving Control by Optimization of the Condensing Temperature Tc

Described below is an example of energy-saving control by optimization of the condensing temperature Tc in the case that an air-cooling operation is to be carried out in the refrigeration cycle system 300. In an air-warming operation, the compressor drive motors 15m, 25m are controlled so that a target condensing temperature is achieved, the outdoor fan motors 19m, 29m are controlled so that a target evaporation temperature is achieved, and the updated target condensing temperature Tc is kept within a range that allows the capacity of the indoor heat exchangers 45, 55, 65 to be maintained. Control is otherwise the same as in the air-cooling operation described below, and a description of air-warming operation is therefore omitted.

Figure 17:
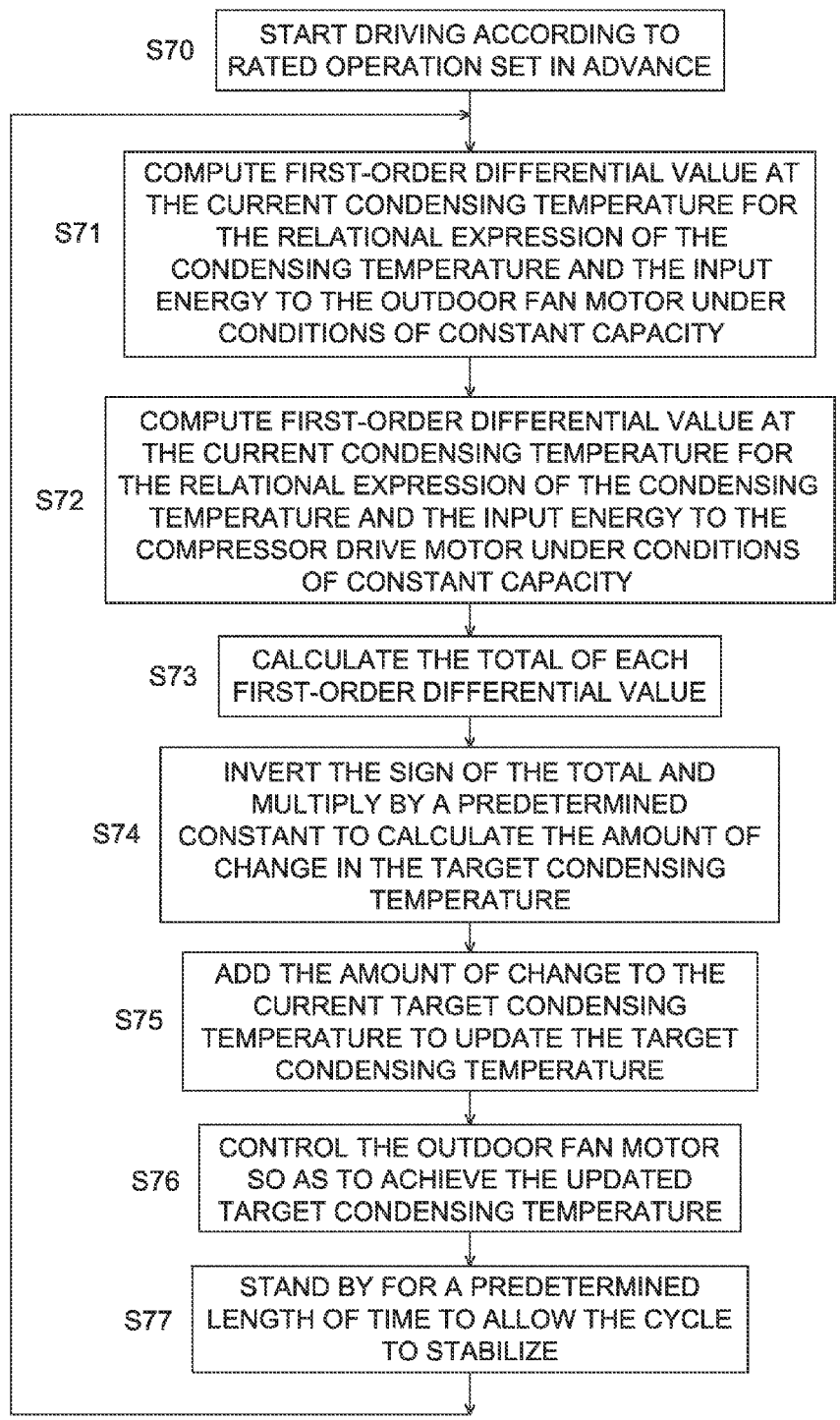
FIG. 17 is a control flowchart of energy-savings control carried out by optimization of the condensing temperature in accordance with the third embodiment.

FIG. 17 shows a flowchart of energy-savings control by optimization of the condensing temperature Tc carried out by the control unit 307.

With this control, processing is carried out to update the current target condensing temperature to a target condensing temperature capable of reducing the total of the input energy to the outdoor fan motor 19m, the input energy to the outdoor fan motor 29m, the input energy to the compressor drive motor 15m, and the input energy to the compressor drive motor 25m to less than the current level.

In step S70, the control unit 307 controls the outdoor fan motor 19m, the outdoor fan motor 29m, the compressor drive motor 15m, and the compressor drive motor 25m so as to comply with rated operating conditions set in advance when an instruction to start execution of energy-saving control by optimization of both the condensing temperature Tc and the evaporation temperature Te is received via the controller 9. Specifically, the rotating speed of the outdoor fan motor 19m and the outdoor fan motor 29m is controlled so that the condensing temperature arrives at an initial target condensing temperature. The drive frequency of the compressor drive motor 15m and the compressor drive motor 25m is controlled so that the evaporation temperature arrives at an initial target evaporation temperature.

In step S71, the control unit 307 obtains the relational expression of a first-order differential based on the condensing temperature under conditions in which the capacity Q of the outdoor heat exchanger 17 is kept constant, for the relational expression of the input energy $P_{Outdoor\ fan\ 1}$ (e.g., $P_{Outdoor\ fan\ 1} = x_1 N^3 + x_2 N^2 + x_3 N$) to the outdoor fan motor 19m in relation to the condensing temperature Tc. The current condensing temperature is thereafter substituted into the relational expression of the first-order differential thus obtained to ascertain the trend of the change in the input energy $P_{Outdoor\ fan\ 1}$ to the outdoor fan motor 19m (the slope of the tangent at the current condensing temperature for the relational expression of the input energy $P_{Outdoor\ fan\ 1}$ to the outdoor fan motor 19m in relation to the condensing temperature Tc) when the current condensing temperature has been changed.

The control unit 307 similarly obtains the relational expression of the first-order differential based on the condensing temperature under conditions in which the capacity Q of the outdoor heat exchanger 27 is kept constant for the relational expression of the input energy $P_{Outdoor\ fan\ 2}$ to the outdoor fan motor 29m (e.g., $P_{Outdoor\ fan\ 2} = x_4 N^3 + x_5 N^2 + x_6 N$, and may be exactly the same as or different from $P_{Outdoor\ fan\ 1}$) in relation to the condensing temperature Tc. The current condensing temperature is thereafter substituted into the relational expression of the first-order differential thus obtained to ascertain the trend of the change in the input energy $P_{Outdoor\ fan\ 2}$ to the outdoor fan motor 29m (the slope of the tangent at the current condensing temperature for the relational expression of the input energy $P_{Outdoor\ fan\ 2}$ to the outdoor fan motor 29m in relation to the condensing temperature Tc) when the current condensing temperature has been changed.

The control unit 307 calculates the total of the value of the slope of the tangent in relation to the outdoor fan motor 19m and the value of the slope of the tangent in relation to the outdoor fan motor 29m. The total of the condensing temperature-based differential values of the input energy is thereby attained for all of the outdoor fan motors 19m, 29m.

In step S72, the control unit 307 obtains the relational expression of a first-order differential based on the condensing temperature under conditions in which the capacity Q of the outdoor heat exchanger 17 is kept constant, for the relational expression of the input energy to the compressor drive motor 15m in relation to the condensing temperature Tc. The current condensing temperature is thereafter substituted into the relational expression of the first-order differential thus obtained to ascertain the trend of the change in the input energy $P_{Comp\ 1}$ to the compressor drive motor 15m (the slope of the tangent at the current condensing temperature for the relational expression of the input energy $P_{Comp\ 1}$ to the outdoor fan motor 15m in relation to the condensing temperature Tc) when the condensing temperature has been changed from the current condensing temperature.

The control unit 307 similarly obtains the relational expression of a first-order differential based on the condensing temperature under conditions in which the capacity Q of the outdoor heat exchanger 27 is kept constant, for the relational expression of the input energy to the compressor drive motor 25m in relation to the condensing temperature Tc. The current condensing temperature is thereafter substituted into the relational expression of the first-order differential thus obtained to ascertain the trend of the change in the input energy $P_{Comp\ 2}$ to the compressor drive motor 25m (the slope of the tangent at the current condensing temperature for the relational expression of the input energy $P_{Comp\ 2}$ to the compressor drive motor 25m in relation to the condensing temperature Tc) when the condensing temperature has been changed from the current condensing temperature.

The control unit 307 calculates the total of the value of the slope of the tangent relation to the compressor drive motor 15m and the value of the slope of the tangent in relation to the compressor drive motor 25m. The total of the condensing temperature-based differential values of the input energy is thereby attained for all of the compressor drive motors 15m, 25m.

In step S73, the control unit 307 calculates the total of the total attained in step S71 and the total attained in step S72.

In step S74, the control unit 307 multiplies the total attained in step S73 by a predetermined constant Kc while inverting the sign to calculate the amount of change ΔTcs in the target condensing temperature updated from the current condensing temperature in the same manner as the first embodiment.

In step S75, the control unit 307 adds the amount of change ΔTcs in the target condensing temperature ascertained in step S74 to the current condensing temperature to update the target condensing temperature.

In step S76, the control unit 307 controls the outdoor fan motor 19m and the outdoor fan motor 29m so as to achieve the updated target condensing temperature. Specifically, the control unit 307 controls the rotating speed of the outdoor fan motor 19m and the outdoor fan motor 29m so that the condensing temperature of the refrigeration cycle reaches the updated target condensing temperature.

Thus, the refrigeration cycle is controlled so that the updated target condensing temperature is reached, whereby the rotating speed of the indoor fan motor 47m of the indoor fan 47, which has been controlled so that the indoor temperature set for the indoor unit 4 is is achieved, the rotating speed of the indoor fan motor 57m of the indoor fan 57, which has been controlled so that the indoor temperature set for the indoor unit 5 is achieved, and the rotating speed of the indoor fan motor 67m of the indoor fan 67, which has been controlled so that the indoor temperature set for the indoor unit 6 is achieved, are changed as a result.

In step S77, the control unit 307 stands by for a predetermined length of time (in this case, five minutes) in order to allow the operating state of the refrigeration cycle to stabilize at the updated target condensing temperature. The process thereafter returns to step S71 and processing is continued.

(3-3) Energy-Saving Control by Optimization of the Evaporation Temperature Te

Described below is an example of energy-saving control by optimization of the evaporation temperature Te in the case that an air-cooling operation is to be carried out in the refrigeration cycle system 300. The energy-saving control carried out by optimization of the evaporation temperature Te may be allowed to proceed at the same time as energy-saving control carried out by optimization of the condensing temperature Tc described above, and in such a case, the timing for processing the energy-saving controls is preferably offset. In an air-warming operation, the compressor drive motors 15m, 25m are controlled so that a target condensing temperature is achieved, and the outdoor fan motors 19m, 29m are controlled so that a target evaporation temperature is achieved. Control is otherwise the same as in the air-cooling operation described below, and a description of air-warming operation is therefore omitted.

FIG. 18 shows a flowchart of energy-savings control by optimization of the evaporation temperature Te carried out by the control unit 307.

With this control, processing is carried out to update the current target evaporation temperature to a target evaporation temperature capable of reducing the total of the input energy to the indoor fan motor 47m, the input energy to the indoor fan motor 57m, the input energy to the indoor fan motor 67m, and the input energy to the compressor drive motor 15m to less than the current level.

In step S80, the control unit 307 controls the indoor fan motor 47m, the indoor fan motor 57m, the indoor fan motor 67m, and the compressor drive motor 15m so as to comply with rated operating conditions set in advance when an instruction for energy-saving control carried out by optimization of the evaporation temperature Te is received via the controller 9. Specifically, the rotating speed of the outdoor fan motor 19m and the outdoor fan motor 29m is controlled so that the condensing temperature arrives at an initial target condensing temperature. Also, the drive frequency of the compressor drive motor 15m and the compressor drive motor 25m is controlled so that the evaporation temperature arrives at an initial target evaporation temperature.

In step S81, the control unit 307 carries out the same processing as in step S51 for energy-saving control by optimization of the evaporation temperature Te in the second embodiment described above.

In step S82, the control unit 307 carries out the same processing as in step S52 for energy-saving control by optimization of the evaporation temperature Te in the second embodiment described above and Obtains the sum of the slopes of the tangents.

In step S83, the control unit 307 obtains the relational expression of a first-order differential based on the evaporation temperature Te for the relational expression of the input energy to the compressor drive motor 15m in relation to the evaporation temperature Te. The current evaporation temperature is thereafter substituted into the relational expression of the first-order differential thus obtained to ascertain the trend of the change in the input energy $P_{Comp\ 1}$ to the compressor drive motor 15m (the slope of the tangent at the current evaporation temperature for the relational expression of the input energy $P_{Comp\ 1}$ to the compressor drive motor 15m in relation to the evaporation temperature) when a change has been made from the current evaporation temperature.

The control unit 307 obtains the relational expression of a first-order differential based on the evaporation temperature Te for the relational expression of the input energy to the compressor drive motor 25m in relation to the evaporation temperature Te. The current evaporation temperature is thereafter substituted into the relational expression of the first order differential thus obtained to ascertain the trend of the change in the input energy $P_{Comp\ 2}$ to the compressor drive motor 25m (the slope of the tangent at the current evaporation temperature for the relational expression of the input energy $P_{Comp\ 2}$ to the compressor drive motor 25m in relation to the evaporation temperature) when a change has been made from the current evaporation temperature.

The control unit 307 thereby calculates the total of: the value of the slope of the tangent in relation to the compressor drive motor 15m; and the value of the slope of the tangent in relation to the compressor drive motor 25m. The total of the evaporation temperature-based differential values of the input energy is thereby attained for all of the compressor drive motors 15m, 25m.

In step S84, the control unit 307 calculates the total of the value ascertained in step S82 and the value ascertained in step S83.

In step S85, the control unit 307 multiplies the total attained in step S84 by a predetermined constant Ke while inverting the sign to calculate the amount of change $\Delta Tes_b$ in the target condensing temperature updated from the current condensing temperature in the same manner as the first embodiment.

In step S86, the control unit 307 compares the amount of change $\Delta Tes_a$ in the evaporation temperature calculated in step S81 and the amount of change $\Delta Tes_b$ in the evaporation temperature obtained in step S85, and specifies the smaller amount of change. The amount of change $\Delta Tes$ in the target evaporation temperature updated from the current evaporation temperature and that allows energy to be saved can be thereby ascertained in a range in which the capacity required in the indoor units 4, 5, 6 will not be insufficient.

In step S87, the control unit 307 adds the amount of change $\Delta Tes$ in the target evaporation temperature ascertained in step S86 to the current evaporation temperature to update the target evaporation temperature.

In step S88, the control unit 307 controls the compressor drive motor 15m and the compressor drive motor 25m so as to achieve the target evaporation temperature updated in step S87. Specifically, the drive frequency of the both compressor drive motor 15m and the compressor 25m is controlled so that the evaporation temperature of the refrigeration cycle reaches the updated target evaporation temperature. Thus, the refrigeration cycle is controlled so that the updated target evaporation temperature is reached, whereby the rotating speed of the indoor fan motor 47m of the indoor fan 47, which has been controlled so that the indoor temperature set for the indoor unit 4 is achieved, the rotating speed of the indoor fan motor 57m of the indoor fan 57, which has been controlled so that the indoor temperature set for the indoor unit 5 is achieved, and the rotating speed of the indoor fan motor 67m of the indoor fan 67, which has been controlled so that the indoor temperature set for the indoor unit 6 is achieved, are changed as a result.

The control unit 307 stands by for a predetermined length of time (in this case, five minutes) in order to allow the operating state of the refrigeration cycle to stabilize at the target evaporation temperature. The process thereafter returns to step S81 and processing is continued, (3-4) Energy-Saving Control by Optimization of the Condensing Temperature Te and the Evaporation Temperature Te Described below is an example of energy-saving control by optimization of both the condensing temperature Tc and the evaporation temperature Te in the case that an air-cooling operation is to be carried out in the refrigeration cycle system 300. In an air-warming operation, the compressor drive motors 15m, 25m are controlled so that a target condensing temperature is achieved, the outdoor fan motors 19m, 29m are controlled so that a target evaporation temperature is achieved, and the updated condensing temperature Tc is kept within a range that allows the capacity of the indoor heat exchangers 45, 55, 65 to be maintained. Control is otherwise the same as in the air-cooling operation described below, and a description of air-warming operation is therefore omitted.

FIG. 19 shows a flowchart of energy-savings control by optimization of both the condensing temperature Tc and the evaporation temperature Te carried out by the control unit 307.

With this control, processing is carried out to update the current target condensing temperature and the current target evaporation temperature to a target condensing temperature and a target evaporation temperature capable of reducing the total of the input energy to the indoor fan motor 47m, the input energy to the indoor fan motor 57m, the input energy to the indoor fan motor 67m, the input energy to the compressor drive motor 15m, the input energy to the compressor drive motor 25m, the input energy to the outdoor fan motor 19m, and the input energy to the outdoor fan motor 29m to less than the current level.

In step S90, the control unit 307 controls the indoor fan motor 47m, the indoor fan motor 57m, the indoor fan motor 67m, the compressor drive motor 15m, the compressor drive motor 25m, the outdoor fan motor 19m, and the outdoor fan motor 29m so as to comply with rated operating conditions set in advance when an instruction for energy-saving control by optimization of both the condensing temperature Tc and the evaporation temperature Te is received via the controller 9. Specifically, the rotating speed of the outdoor fan motor 19m and the outdoor fan motor 29m is controlled so that the condensing temperature arrives at an initial target condensing temperature. The drive frequency of the compressor drive motor 15m and the compressor drive motor 25m is controlled so that the evaporation temperature arrives at an initial target evaporation temperature.

In step S91, the control unit 307 selects the lowest value from among the values in the indoor units 4, 5, 6 having an amount of change $\Delta Te$ in the evaporation temperature that can be increased from the current level and uses the selected value as the $\Delta Tes_a$ in the same manner as in step S51 for energy-saving control by optimization of the evaporation temperature Te in the second embodiment.

In step S92, the control unit 307 provides three values for the amount of change $\Delta Te$ in the target evaporation temperature in the same manner as step S62 for energy-saving control by optimization of both the condensing temperature Tc and the evaporation temperature Te in the second embodiment, and also provides three values for the amount of change $\Delta Tc$ in the target condensing temperature. The control unit 307 obtains $T_{Outdoor\ air\ temperate}$ by averaging the temperature detected by the outdoor temperature sensor 11 and the temperature detected by the outdoor temperature sensor 21.

In step S93, the control unit 307 furthermore processes nine combinations available from the three amounts of change $\Delta Te$ in the target evaporation temperature provided above and the three amounts of change $\Delta Te$ in the target condensing temperature, and excludes the combinations that exceed the amount of change $\Delta Tes_a$ in the evaporation temperature calculated in step S91.

In step S94, the control unit 307 determines whether all of the nine combinations have been excluded in step S93.

When it has been determined that all nine combinations have been excluded, the process proceeds to step S95. When there are no excluded combinations or when a portion of the nine combinations have been excluded, the process proceeds to step S97.

In step S95, the control unit 307 sets the value attained by changing the current evaporation temperature by the amount of change $\Delta Tes_a$ in the evaporation temperature calculated in step S91 to be the updated target evaporation temperature. The control unit 307 controls the drive frequency of the compressor drive motor 15m and the compressor drive motor 25m so that the evaporation temperature of the refrigeration cycle reaches the updated target evaporation temperature, and the process proceeds to step S96.

Thus, the refrigeration cycle is controlled so that the updated target evaporation temperature is reached, whereby the rotating speed of the indoor fan motor 47m of the indoor fan 47, which has been controlled so that the indoor temperature set for the indoor unit 4 is achieved, the rotating speed of the indoor fan motor 57m of the indoor fan 57, which has been controlled so that the indoor temperature set for the indoor unit 5 is achieved, and the rotating speed of the indoor fan motor 67m of the indoor fan 67, which has been controlled so that the indoor temperature set for the indoor unit 6 is achieved, are changed as a result.

In step S96, the control unit 307 stands by for a predetermined length of time (in this case, five minutes) in order to allow the operating state of the refrigeration cycle to stabilize at the target evaporation temperature. The process thereafter returns to step S91 and processing is continued.

In step S97, the control unit 307 calculates the total of the amount of change in the input energy for the remaining combinations that were not excluded in step S94 from among the nine combinations described above.

Specifically, the control unit 307 obtains the relational expression of a first-order differential based on the evaporation temperature for the relational expression of the input energy $P_{Indoor\ fan\ 1}$ to the indoor fan motor 47m in relation to the evaporation temperature Te. The current evaporation temperature is thereafter substituted into the relational expression of the first-order differential thus obtained to obtain the current slope of the tangent related to the indoor fan motor 47m. The control unit 307 similarly carries out this processing for the indoor fan motor 57m and the indoor fan motor 67m as well. The control unit 307 furthermore obtains the relational expression of a first-order differential based on the evaporation temperature for the relational expression of the input energy to the compressor drive motor 15m in relation to the evaporation temperature Te. The current evaporation temperature is thereafter substituted into the relational expression of the first-order differential thus obtained to obtain the current slope of the tangent related to the relationship between the compressor drive motor 15m and the evaporation temperature. The control unit 307 similarly carries out this processing for the compressor drive motor 25m as well. The control unit 307 then obtains the total of the slopes of the tangents, i.e., the total of the current slope of the tangent related to the indoor fan motor 47m, the current slope of the tangent related to the indoor fan motor 57m, the current slope of the tangent related to the indoor fan motor 67m, the current slope of the tangent related to the relationship between the compressor drive motor 15m and the evaporation temperature, and the current slope of the tangent related to the relationship between the compressor drive motor 25m and the evaporation temperature. Moreover, the control unit 307 multiplies the total of the slopes of tangents by the value of h), i), and j) for each combination to thereby calculate the amount of change in the input energy assumed for the case in which there has been a change from the current evaporation temperature.

The control unit 307 carries out the same processing for the condensing temperature Tc. In other words, the control unit 307 obtains the relational expression of a first-order differential based on the condensing temperature for the relational expression of the input energy $P_{Outdoor\ fan\ 1}$ to outdoor fan motor 19m in relation to the condensing temperature Tc. The current condensing temperature is thereafter substituted into the relational expression of the first-order differential thus obtained to obtain the current slope of the tangent related to the outdoor fan motor 19m. The control unit 307 similarly carries out this processing for the outdoor fan motor 29m as well. The control unit 307 furthermore obtains the relational expression of a first-order differential based on the condensing temperature for the relational expression of the input energy to the compressor drive motor 15m in relation to the condensing temperature Tc. The current condensing temperature is thereafter substituted into the relational expression of the first-order differential thus obtained to obtain the current slope of the tangent related to the relationship between the compressor drive motor 15m and the condensing temperature. The control unit 307 similarly carries out this processing for the compressor drive motor 25m as well. The control unit 307 then obtains the total of the slopes of the tangents, i.e., the total of the current slope of the tangent related to the outdoor fan motor 19m, the current slope of the tangent related to the outdoor fan motor 29m, the current slope of the tangent related to the relationship between the compressor drive motor 15m and the condensing temperature, and the current slope of the tangent related to the relationship between the compressor drive motor 25m and the condensing temperature. Moreover, the control unit 307 multiplies the total of the slopes of tangents by the value of k), l), and m) for each combination to thereby calculate the amount of change in the input energy assumed for the case in which there has been a change from the current condensing temperature.

The total of the amount of change in the input energy for the remaining combinations that have not been excluded in step S94 is thereby calculated, and the combination of the amount of change $\Delta Te$ in the evaporation temperature and the amount of change $\Delta Tc$ in the condensing temperature in which the total of the amount of change in the input energy is a minimum value is specified.

In step S98, the control unit 307 reflects the combination of the amount of change $\Delta Tc$ in the condensing temperature and the amount of change $\Delta Te$ in the evaporation temperature specified in step S97 to have the minimum total amount of change in the input energy, and updates the target condensing temperature white also updating the target evaporation temperature. In other words, the value attained by adding the amount of change $\Delta Te$ in the evaporation temperature, which has been specified as being the combination having the minimum total amount of change in the input energy in step S97, to the current evaporation temperature is used as the updated target evaporation temperature. Also, the value attained by adding the amount of change $\Delta Tc$ in the condensing temperature, which has been specified as being the combination having the minimum total amount of change in the input energy in step S97, to the current condensing temperature is used as the updated target condensing temperature. The control unit 307 controls the rotating speed of the outdoor fan motor 19m and the outdoor fan motor 29m so that the condensing temperature of the refrigeration cycle reaches the updated target condensing temperature, and controls the drive frequency of the compressor drive motor 15*m* and the compressor drive motor 25*m* so that the evaporation temperature of the refrigeration cycle reaches the updated target evaporation temperature.

Thus, the refrigeration cycle is controlled so that the updated target evaporation temperature and the updated target condensing temperature are reached, whereby the rotating speed of the indoor fan motor 47*m* of the indoor fan 47, which has been controlled so that the indoor temperature set for the indoor unit 4 is achieved, the rotating speed of the indoor fan motor 57*m* of the indoor fan 57, which has been controlled so that the indoor temperature set for the indoor unit 5 is achieved, and the rotating speed of the indoor fan motor 67*m* of the indoor fan 67, which has been controlled so that the indoor temperature set for the indoor unit 6 is achieved, are changed as a result.

In step S99, the control unit 307 stands by for a predetermined length of time (in this case, five minutes) in order to allow the operating state of the refrigeration cycle to stabilize at the updated target evaporation temperature and the updated target condensing temperature. The process thereafter returns to step S91 and processing is continued.

(3-5) Characteristics of the Third Embodiment

The same effects as in the first and second embodiments can be attained in the refrigeration cycle system 300 of the third embodiment.

In the refrigeration cycle system 300 of the third embodiment, the computational processing load can be reduced while the amount of information required to be specified in advance is reduced, and it is possible to obtain rapid stabilization of the operating state, with the total amount of required input energy being minimized while consideration is given to actual installation conditions, even when a plurality of indoor units 4, 5, 6 are disposed and a plurality of outdoor units 1, 2 are disposed.

The processing described above can be carried out within the range of capacity required in the indoor heat exchanger 45, the indoor heat exchanger 55, and the indoor heat exchanger 65.

(4) Other Embodiments

The embodiments of the present invention are not limited to the first to third embodiments described above, and, e.g., the following embodiments are included in the embodiments of the present invention.

(4-1)

In the first to third embodiments described above, the case in which a target condensing temperature or a target evaporation temperature capable of reducing input energy is updated is described as an example that places focus on the slope of the tangent at the current condensing temperature or the current evaporation temperature, by using a first-order differential of a function of input energy to the actuators in relation to the condensing temperature or the evaporation temperature.

However, the embodiments of the present invention are not limited thereto; e.g., it is also possible to update the current condensing temperature or the current evaporation temperature to a target condensing temperature or a target evaporation temperature capable of reducing the input energy with focus on the change in input energy in relation to a predetermined very small increase or decrease width from a current value.

(4-2)

In the first to third embodiments described above, examples are given in which energy-saving control by optimization of the condensing temperature Tc, energy-saving control by optimization of the evaporation temperature Te, and energy-saving control by optimization of the condensing temperature Tc and the evaporation temperature Te could all be selectively carried out.

However, the embodiments of the present invention are not limited thereto; e.g., it is also possible to configure a system so that at least one of the energy-saving control by optimization of the condensing temperature Tc, energy-saving control by optimization of the evaporation temperature Te, and energy-saving control by optimization of the condensing temperature Tc and the evaporation temperature Te can be carried out.

In the case that energy-saving control by optimization of the condensing temperature Tc and energy-saving control by optimization of the evaporation temperature Te are to be carried out simultaneously, it is preferred that, during air-cooling operation, control be carried out in a repeating fashion in which: the process first waits until the system stabilizes at the target value of the evaporation temperature Te (e.g., the change in the evaporation temperature is equal to or less than a predetermined level within a predetermined length of time), which has been updated by energy-saving control by optimization of the evaporation temperature Te; the process subsequently carries out energy-saving control by optimization of the condensing temperature Tc and waits until the system stabilizes at the target value of the updated condensing temperature Tc; and the process again carries out energy-saving control by optimization of the evaporation temperature Te.

In the case that energy-saving control by optimization of the condensing temperature Tc and energy-saving control by optimization of the evaporation temperature Te are to be carried out simultaneously, it is preferred that, during air-warm operation, control be carried out in a repeating fashion in which: the process first waits until the system stabilizes at the target value of the condensing temperature Tc (e.g., the change in the condensing temperature is equal to or less than a predetermined level within a predetermined length of time), which has been updated by energy-saving control by optimization of the condensing temperature Tc; the process subsequently carries out energy-saving control by optimization of the evaporation temperature Te and waits until the system stabilizes at the target value of the updated evaporation temperature Te; and the process again carries out energy-saving control by optimization of the condensing temperature Tc.

(4-3)

In the first to third embodiments described above, examples are given in which energy-saving control is carried out with focus on the change in the energy inputted to the compressor, fan, and/or other actuators in relation to the evaporation temperature or the condensing temperature.

However, the embodiments of the present invention are not limited thereto. For example, it is also possible to, e.g., carry out energy-saving control with focus on the change in the energy inputted to the compressor, fan, and/or other actuators in relation to at least one of the evaporation pressure, condensing pressure, degree of superheating, degree of supercooling, and dryness.

(4-4)

In the first to third embodiments described above, the outdoor fans 19, 29 are described as examples of a heat-source-side fluid supply unit for supplying air as the fluid to the outdoor heat exchangers 17, 27, and the indoor fans 47, 57, 67 are described as examples of a usage-side fluid supply unit for supplying air as the fluid to the indoor heat exchangers 45, 55, 65.

However, the embodiments of the present invention are not limited to feeding air. For example, it is also possible to use a fluid supply unit for feeding a secondary refrigerant in place of the outdoor fan and/or indoor fan in a refrigeration system. Also, in a hot-water system, a pump (fluid supply unit) for feeding water may be used in place of the outdoor fan and/or the indoor fan.

(4-5)

In the first to third embodiments described above, examples are given in which the value of a current refrigerant state quantity is used as a value to be substituted into a formula attained from a first-order differential of a relational expression at the refrigerant state quantity, whereby the trend is ascertained for the case in which the refrigerant state quantity has been changed.

However, no limitation is imposed by the current value of the refrigerant state quantity, and the trend for the case in which the refrigerant state quantity has been changed may be ascertained by substituting the target value of the refrigerant state quantity into the formula attained from a first-order differential of a relational expression at the refrigerant state quantity, at the point in time that it has been determined that the target value of the current refrigerant state quantity has been achieved by satisfying predetermined stabilization conditions or by using another criterion.

(4-6)

In the first to third embodiments described above, examples are given in which the evaporation temperature and/or the condensing temperature are updated as examples of the refrigerant state quantity.

However, the embodiments of the present invention are not limited thereto. For example, it is also possible to update the evaporation pressure and/or the condensing pressure.

(4-7)

In the embodiments described above, an example is described in which the formula for obtaining the amount of change $\Delta Tcs$ in the target condensing temperature is expressed in "Formula (5)," an example is described in which the formula for obtaining the amount of change $\Delta Tes$ in the target evaporation temperature is expressed in "Formula (6).

However, the term Kc may be used as a dimensionless parameter by squaring the difference between the condensing temperature Tc and the outdoor air temperature when the amount of change $\Delta Tcs$ in the target condensing temperature is to be obtained.

Also, the term Ke may be used as a dimensionless parameter by squaring the difference between the evaporation temperature Te and the outdoor air temperature when the amount of change $\Delta Tes$ in the target evaporation temperature is to be obtained.

(4-8)

In the third embodiment, in the case that the term "$dP_{Outdoor\ fan}/dN$" is used in the method for specifying the relational expression of the input energy to the outdoor fan motors 19m, 29m in relation to the condensing temperature Tc, "$dP_{Outdoor\ fan}/dN$" is described as a term attained by differentiating the fan input characteristic formula, which is established by each performance of the outdoor fan motors 19m, 29m, at a rotating speed N. In other words, an example is described using the case in which "$dP_{Outdoor\ fan\ 1}/dN_{Outdoor\ fan\ 1}$" is obtained from $P_{Outdoor\ fan\ 1} = x_1 N^3 + x_2 N^2 + x_3 N$, which is the fan input characteristic formula established by the performance of the outdoor fan motor 19m, and "$dP_{Outdoor\ fan\ 2}/dN_{Outdoor\ fan\ 2}$" is obtained from $P_{Outdoor\ fan\ 2} = x_4 N^3 + x_5 N^2 + x_6 N$, which is the fan input characteristic formula established by the performance of the outdoor fan motor 29m.

In contrast, rather than obtaining the terms "$dP_{Outdoor\ fan\ 1}/dN_{Outdoor\ fan\ 1}$" and/or "$dP_{Outdoor\ fan\ 2}/dN_{Outdoor\ fan\ 2}$" from an input characteristic formula especially established in advance for the outdoor fan motor 19m and from the input characteristic formula especially established in advance for the outdoor fan motor 29m, it is also possible to use a configuration in which the control unit ascertains the current input value and the current rotating speed a value showing the state of the fan) that corresponds to the current input value for each outdoor fan 19m, 29m, and "$dP_{Outdoor\ fan\ 1}/dN_{Outdoor\ fan\ 1}$" and/or "$dP_{Outdoor\ fan\ 2}/dN_{Outdoor\ fan\ 2}$" may be obtained from the ascertained current input value and current rotating speed.

There is thereby no need to store an input characteristic formula for the outdoor fan motor 19m and/or information for creating the input characteristic formula, and/or input characteristic formula for the outdoor fan motor 29m and/or information for creating the input characteristic formula in advance in one or the other the storage units, and there is no need to perform work in advance for obtaining these input characteristic formulas and/or information for creating the input characteristic formulas. The ability to search for the optimal condensing temperature Tc and the optional evaporation temperature Te is the same as the embodiment described above, even using a method in which the current rotating speed, the input, and/or other value is used.

Specifically, rather than having an input characteristic formula in which the value of a specific coefficient has been established as described in the embodiments above for each individual fan, it is also possible to, e.g., obtain "$dP_{Outdoor\ fan\ 1}/dN_{Outdoor\ fan\ 1}$" and "$dP_{Outdoor\ fan\ 2}/dN_{Outdoor\ fan\ 2}$" using the "the fact that, typically, the fan drive force is substantially proportional to the cube of the rotating speed (second information)," and "the current input value and the corresponding current rotating speed ascertained by the control unit for the outdoor fan motors 19m, 29m."

As used herein, the phrase "the fact that, typically, the fan drive force is substantially proportional to the cube of the rotating speed" is not particularly limited; it may also be expressed as a cubic function of the rotating speed. For example, the fan input may be proportional to the cube of the rotating speed ($P_{Outdoor\ fan} = C_a N^3$, where $C_a$ is an arbitrary constant), or the fan input may be expressed as the sum of a multiple of the cube of the rotating speed, a multiple of the square of the rotating speed, and a multiple of the rotating speed ($P_{Outdoor\ fan} = C_b N^3 + C_c N^2 + C_d N$, where $C_b$, $C_c$, $C_d$ are arbitrary constants).

In the case that "$dP_{Outdoor\ fan\ 1}/dN_{Outdoor\ fan\ 1}$" and "$dP_{Outdoor\ fan\ 2}/dN_{Outdoor\ fan\ 2}$" are obtained using the fact that the fan input is proportional to the cube of the rotating speed ($P_{Outdoor\ fan} = C_a N^3$, where $C_a$ is an arbitrary constant), the terms can be obtained, e.g., in the following manner. In other words, using a configuration in which the control unit is able to ascertain the current input value P of the fan and the current rotating speed N corresponding thereto makes it possible to calculate "$dP_{Outdoor\ fan}/dN$" in the following manner. In this case, $P_{Outdoor\ fan} = C_a N^3$ (where $C_a$ is an arbitrary constant) at rotating speed N, and results formula (7) below.

$$\frac{dP_{Outdoorfan}}{dN} = 3 \times C_a \times N^2 \qquad \langle\text{Formula 7}\rangle$$

In this case, $P_{Outdoor\ fan\ 1} = C_a \times N_{Outdoor\ fan\ 1}^3$ is found when the current input value $P_{Outdoor\ fan\ 1}$ and the current rotating speed $N_{Outdoor\ fan\ 1}$ of the outdoor fan motor 19*m* ascertained by the control unit are substituted into the general formula $P_{Outdoor\ fan} = C_a N^3$. The constant $C_a$ in the input characteristic formula of the outdoor fan motor 19*m* is thereby established to be Constant $C_a = P_{Outdoor\ fan\ 1}/N_{Outdoor\ fan\ 1}^3$. Therefore, "$dP_{Outdoor\ fan\ 1}/dN$" of the outdoor fan motor 19*m* is obtained in the manner of Formula (8) below by substituting the constant $C_a$ into Formula (7).

$$\frac{dP_{Outdoorfan1}}{dN} = \qquad \langle\text{Formula 8}\rangle$$

$$3 \times \frac{P_{Outdoorfan1}}{N_{Outdoorfan1}^3} \times N_{Outdoorfan1}^2 = 3 \times \frac{P_{Outdoorfan1}}{N_{Outdoorfan1}}$$

Similarly, $P_{Outdoor\ fan\ 2} = C_a \times N_{Outdoor\ fan\ 2}^3$ is found when the current input value $P_{Outdoor\ fan\ 2}$ and the current rotating speed $N_{Outdoor\ fan\ 2}$ (the value of the outdoor fan motor 29*m*, which is another actuator) ascertained by the control unit are substituted into the general formula $P_{Outdoor\ fan} = C_a N^3$. The constant $C_a$ for the outdoor fan motor 29*m* is thereby established to be Constant $C_a = P_{Outdoor\ fan\ 2}/N_{Outdoor\ fan\ 2}$. Therefore, "$dP_{Outdoor\ fan\ 2}/dN$" of the outdoor fan motor 29*m* is Obtained in the manner of Formula (9) below by substituting the constant $C_a$ into Formula (7).

$$\frac{dP_{Outdoorfan2}}{dN} = \qquad \langle\text{Formula 9}\rangle$$

$$3 \times \frac{P_{Outdoorfan2}}{N_{Outdoorfan2}^3} \times N_{Outdoorfan2}^2 = 3 \times \frac{P_{Outdoorfan2}}{N_{Outdoorfan2}}$$

In this manner, the same effect as in the embodiments described above can be attained even when the input characteristic formulas of the outdoor fan motors 19*m*, 29*m* are not stored in advance.

In this case, "$dP_{Outdoor\ fan\ 1}/dN_{Outdoor\ fan\ 1}$" and/or "$dP_{Outdoor\ fan\ 2}/dN_{Outdoor\ fan\ 2}$" are obtained using the current values of the input value and rotating speed of the fans. It is therefore possible to carry out processing that reflects the influence of change over time after construction of the refrigeration cycle system, and to cause the processing to conform to actual conditions in comparison with the case in which individual input characteristic formulas established at the time of construction of the refrigeration cycle system are stored. For example, when the fan is dually used as a filter (e.g., an indoor fan), the input values of the fan may differ even when the rotating speed of the fans is the same when the amount of clogging differs depending on the usage conditions of the filter. However, such differences can be reflected in processing that uses the above-described current values. In another example, duct length may vary in accordance with the placement environment in the case that the fan is used in a duct-type indoor unit, and the relationship between the fan rotating speed and the fan input cannot be made to correspond to the length of the duct in the actual placement situation in the case that the input characteristic formula of the fan is established in advance prior to placement. In contrast, with processing that uses the above-described current values, the actual length of the duct after placement can be reflected.

Means by which the control unit ascertains the input values of the outdoor fan motors 19*m*, 29*m* is not particularly limited, and also possible is, e.g., means for acquiring primary electric current information and/or secondary electric current information of the inverter of each fan.

(4-9)

In the second embodiment described above, "$dP_{Indoor\ fan}/dN$" is described as a term attained by differentiating the fan input characteristic formula established by each performance of the indoor fan motor 47*m*, 57*m*, 67*m* at the rotating speed N in the case that the term "$dP_{Indoor\ fan}/dN$" is to be used in the method for specifying the relational expression of the input energy to the indoor fan motors 47*m*, 57*m*, 67*m* in relation to the evaporation temperature Te. In other words, an example is described for the case in which "$dP_{Indoor\ fan\ 1}/dN_{Indoor\ fan\ 1}$" is obtained from $P_{Indoor\ fan\ 1} = y_1 N^3 + y_2 N^2 + y_3 N$, which is the fan input characteristic formula established by the performance of the indoor fan motor 47*m*, "$dP_{Indoor\ fan\ 2}/dN_{Indoor\ fan\ 2}$" is obtained from $P_{Indoor\ fan\ 2} = y_4 N^3 + y_5 N^2 + y_6 N$, which is a formula different from that of $P_{Indoor\ fan\ 1}$ and is the fan input characteristic formula established by the performance of the indoor fan motor 57*m*, and "$dP_{Indoor\ fan\ 3}/dN_{Indoor\ fan\ 3}$" is obtained from $P_{Indoor\ fan\ 3} = y_7 N^3 + y_8 N^2 + y_9 N$, which is a formula different from that of $P_{Indoor\ fan\ 1}$ and $P_{Indoor\ fan\ 2}$ and is the fan input characteristic formula established by the performance of the indoor fan motor 67*m*.

In contrast, rather ban "$dP_{Indoor\ fan\ 1}/dN_{indoor\ fan\ 1}$" and/or "$dP_{Indoor\ fan\ 2}/dN_{Indoor\ fan\ 2}$" and/or "$dP_{Indoor\ fan\ 3}/dN_{Indoor\ fan\ 3}$" being obtained from the input characteristic formula of the indoor fan motor 47*m*, the input characteristic formula of the indoor fan motor 57*m*, the input characteristic formula of the indoor fan motor 67*m*, a configuration may be used in which the control unit is able to ascertain the current input value and the current rotating speed for the indoor fan motors 47*m*, 57*m*, 67*m*, and "$dP_{Indoor\ fan\ 1}/dN_{Indoor\ fan\ 1}$" and/or "$dP_{Indoor\ fan\ 2}/dN_{Indoor\ fan\ 2}$" and/or "$dP_{Indoor\ fan\ 3}/dN_{Indoor\ fan\ 3}$" are obtained from the current input value and current rotating speed thus obtained.

Specifically, an input characteristic formula in which the specific value of a coefficient such as that described in the embodiments above is established is not made available in advance, but rather it is also possible to, e.g., obtain "$dP_{Indoor\ fan\ 1}/dN_{Indoor\ fan\ 1}$", "$dP_{Indoor\ fan\ 2}/dN_{Indoor\ fan\ 2}$", and "$dP_{Indoor\ fan\ 3}/dN_{Indoor\ fan\ 3}$" using the "the fact that, typically, the fan drive force is substantially proportional to the cube of the rotating speed (second information)," and "the current rotating speed and the current input value ascertained by the control unit for the indoor fan motor 47*m*, 57*m*, 67*m*."

The specific method for obtaining the above is essentially the same as the content described in (4-8) above.

(4-10)

Described in section (4-8) above is the case in which "$dP_{Outdoor\ fan\ 1}/dN_{Outdoor\ fan\ 1}$" and "$dP_{Outdoor\ fan\ 2}/dN_{Outdoor\ fan\ 2}$" are obtained from the current input value and the current rotating speed rather than from the input characteristic formulas of the outdoor fan motors 19*m*, 29*m*. Described in section (4-9) above is the case in which "$dP_{Outdoor\ fan\ 1}/dN_{Outdoor\ fan\ 1}$," "$dP_{Outdoor\ fan\ 2}/dN_{Outdoor\ fan\ 2}$", and "$dP_{Outdoor\ fan\ 3}/dN_{Outdoor\ fan\ 3}$" are obtained from the current input value and the current rotating speed rather than from the input characteristic formulas of the indoor fan motors 47*m*, 57*m*, 67*m*.

In contrast thereto, it is also possible to obtain all the terms "$dP_{Outdoor\ fan\ 1}/dN_{Outdoor\ fan\ 1}$," "$dP_{Outdoor\ fan\ 2}/dN_{Outdoor\ fan\ 2}$," "$dP_{Indoor\ fan\ 1}/dN_{Indoor\ fan\ 1}$," "$dP_{Indoor\ fan\ 2}/dN_{Indoor\ fan\ 2}$," and "$dP_{Indoor\ fan\ 3}/dN_{Indoor\ fan\ 3}$" from input values and rotating speeds of the outdoor fan motors and the indoor fan motors rather than from input characteristic formulas in a system in which a plurality of outdoor fan motors and a plurality of indoor fan motors are provided as in, e.g., the manner of the third embodiment described above.

The specific method for obtaining the above is essentially the same as the content described in (4-8) and (4-9) above.

(4-11)

Described in an embodiment above is an example of the case in which a relational expression of the input energy to the compressor drive motor 15m in relation to a condensing temperature Tc and a relational expression of the input energy to the compressor drive motor 15m in relation to the evaporation temperature Te that are specified in advance are stored in a first outdoor storage unit 1b or the like as a regression formula in which "$dP_{Comp}/dTe$" includes the drive frequency R (r/min) of the compressor, the evaporation temperature Te, and the condensing temperature Tc as parameters.

In contrast thereto, information (second information) by which a regression formula can be attained using, e.g., the current input value to the compressor and the current compressor state (rotating speed, pressure difference, and/or the like) that corresponds to the input value can be stored in the first outdoor storage unit 1b, and the input characteristic formula that corresponds to the compressor drive motor 15m is not required to be stored in the first outdoor storage unit 1b.

(4-12)

The present invention naturally includes embodiments in which the examples described in the first to third embodiments and the other embodiments (4-1) to (4-11) are used, as appropriate, in combination.

INDUSTRIAL APPLICABILITY

In the refrigeration cycle system of the present invention, it is possible to reduce the amount of information required to be specified in advance, to reduce the computational processing load, and to rapidly stabilize an operating state in which the total amount of required input energy is kept low in view of the actual installation conditions. The present invention is therefore useful when energy-saving operation is to be implemented in a simple manner in a refrigeration cycle system.

What is claimed is:

1. A refrigeration cycle system adapted to circulate a refrigerant in a refrigerant circuit including a compressor, a heat-source-side heat exchanger, an expansion valve, and a usage-side heat exchanger connected together, the refrigeration cycle system comprising:
   a plurality of actuators configured to cause a refrigeration cycle to be performed in the refrigerant circuit;
   a storage unit storing for each of the actuators or each type of the actuators, respectively, at least one of
      a relational expression indicating a relationship between an amount of energy inputted to the actuators and a refrigerant target state quantity of refrigerant flowing through the refrigerant circuit, the refrigerant target state quantity being any of a temperature control target value, a pressure control target value, or a physical-quantity control target value equivalent thereto,
      first information usable to create the relational expression, and
      second information usable to attain the relational expression using values inputted to the actuators and values that indicate states of the actuators corresponding to the input values;
   at least one refrigerant state quantity sensor configured to acquire a current refrigerant state quantity that corresponds to a value of the refrigerant target state quantity; and
   a control unit programmed to
      obtain a sum of the energy inputted to the actuators, or obtain a sum of an amount of change in the energy inputted to the actuators, based on the relational expression in a case where a change has been made from the current refrigerant state quantity, and
      while updating the value of the refrigerant target state quantity so that the sum of energy inputted to the actuators is less than a current level or so that the sum of the amount of change in the energy inputted to the actuators is a low value, control at least one of the actuators so that a value acquired by the at least one refrigerant state quantity sensor approximates an updated value of the refrigerant target state quantity.

2. The refrigeration cycle system according to claim 1, wherein
   the control unit is further programmed to update the value of the refrigerant target state quantity in a range in which a width of change in capacity requested by the usage-side heat exchanger satisfies a predetermined capacity condition.

3. The refrigeration cycle system according to claim 1, further comprising
   a heat-source-side fluid supply unit configured to supply a fluid to the heat-source-side heat exchanger to exchange heat with a refrigerant flowing through the heat-source-side heat exchanger,
   the plurality of actuators including a first actuator driving the compressor and a second actuator driving the heat-source-side fluid supply unit;
   the storage unit further storing
      a first relational expression indicating a relationship of an amount of energy inputted to the first actuator in relation to a control target value of a condensing temperature at which refrigerant flowing through the refrigerant circuit condenses, or information usable to create the first relational expression, and
      a second relational expression indicating a relationship of an amount of energy inputted to the second actuator in relation to a control target value of the condensing temperature, or information usable to create the second relational expression;
   the at least one refrigerant state quantity sensor being further configured to acquire a current value of the condensing temperature, and
   the control unit being further programmed to
      obtain a sum of the energy inputted to the first actuator, or obtain a sum of an amount of change in the energy inputted to the first actuator, based on the first relational expression in a case where a change has been made from the current condensing temperature,
      obtain a sum of the energy inputted to the second actuator, or obtain a sum of an amount of change in the energy inputted to the second actuator, based on the second relational expression in a case where a change has been made from the current condensing temperature, and
      while updating the control target value of the condensing temperature so that the sum of the energy inputted to the first actuator and the second actuator is less than the current level or so that the sum of the amount of change in the energy inputted to the first actuator and the second actuator is a low value, control the second actuator when the usage-side heat exchanger functions as an evaporator and control the first actuator when the usage-side heat exchanger functions as a condenser so that the current value of the condensing temperature acquired by the at least one refrigerant state quantity sensor approximates an updated control target value of the condensing temperature.

4. The refrigeration cycle system according to claim 3, wherein the heat-source-side heat exchanger includes a plurality of heat-source-side heat exchangers;

the compressor includes a plurality of compressors corresponding to the plurality of heat-source-side heat exchangers;

the heat-source-side fluid supply unit includes a plurality of heat-source-side fluid supply units corresponding to the plurality of heat-source-side heat exchangers;

the first actuator includes a plurality of first actuators corresponding to the plurality of compressors;

the second actuator includes a plurality of second actuators corresponding to the plurality of heat-source-side fluid supply units;

the storage unit further stores for each of the plurality of first actuators, the first relational expression or information usable to create the first relational expression, and for each of the plurality of second actuators, the second relational expression or information usable to create the second relational expression; and the control unit is further programmed to obtain a sum of the energy inputted to the plurality of first actuators or the sum of an amount of change in the energy inputted to the plurality of first actuators, based on each first relational expressions in a case where a change has been made from the current condensing temperature, obtain a sum of the energy inputted to the plurality of second actuators or the sum of an amount of change in the energy inputted to the plurality of second actuators, based on each second relational expressions in a case where a change has been made from the current condensing temperature, and while updating the control target value of the condensing temperature so that the sum of the energy inputted to the plurality of first actuators and the plurality of second actuators is less than the current level or so that the sum of the amount of change in energy inputted to the plurality of first actuators and the plurality of second actuators is a low value, control the plurality of second actuators when the usage-side heat exchanger functions as an evaporator and control the plurality of first actuators when the usage-side heat exchanger functions as a condenser so that the current value of the condensing temperature acquired by the at least one refrigerant state quantity sensor approximates the updated control target value of the condensing temperature.

5. The refrigeration cycle system according to claim 3, wherein the control unit is further programmed to calculate the sum of the amount of change in the energy inputted to the first actuator and the second actuator in a case where a change has been made from the current condensing temperature, by obtaining and totaling for each of the actuators a value attained by substituting the current condensing temperature into a formula attained from a first-order differential of the relational expression for each of the actuators based on the condensing temperature.

6. The refrigeration cycle system according to claim 3, wherein the control unit is further programmed to update the control target value of the condensing temperature and thereafter to further update the control target value of the condensing temperature when predetermined standby conditions have been satisfied.

7. The refrigeration cycle system according to claim 1, further comprising a heat-source-side fluid supply unit configured to supply a fluid to the heat-source-side heat exchanger to exchange heat with a refrigerant flowing through the heat-source-side heat exchanger; and a usage-side fluid supply unit configured to supply a fluid to the usage-side heat exchanger to exchange heat with a refrigerant flowing through the usage-side heat exchanger, the plurality of actuators includes a third actuator driving the compressor, a fourth actuator driving the usage-side fluid supply unit, and a fifth actuator driving the heat-source-side fluid supply unit;

the storage unit further storing a third relational expression indicating a relationship of an amount of energy inputted to the third actuator in relation to a control target value of an evaporation temperature at which refrigerant flowing through the refrigerant circuit evaporates, or information usable to create the third relational expression; and a fourth relational expression indicating a relationship of an amount of energy inputted to the fourth actuator in relation to a control target value of the evaporation temperature, or information usable to the fourth relational expression;

the at least one refrigerant state quantity sensor is further configured to acquire a current value of the evaporation temperature at which refrigerant flowing through the refrigerant circuit evaporates; and the control unit being further programmed to obtain a sum of the energy inputted to the third actuator or a sum of an the amount of change in the energy inputted to the third actuator, based on the third relational expression in a case where a change has been made from a current evaporation temperature, and obtain a sum of the energy inputted to the fourth actuator or a sum of an amount of change in the energy inputted to the fourth actuator, based on the fourth relational expression in a case where a change has been made from the current evaporation temperature, and while updating the control target value of the evaporation temperature so that the sum of the energy inputted to the third actuator and the fourth actuator is less than the current level or so that the sum of the amount of change of energy inputted to the third actuator and the fourth actuator is a low value, control the third actuator when the usage-side heat exchanger functions as an evaporator and control the fifth actuator when the usage-side heat exchanger functions as a condenser so that the current value of the evaporation temperature acquired by the at least one refrigerant state quantity sensor approximates the updated control target value of the evaporation temperature.

8. The refrigeration cycle system according to claim 7, wherein
the usage-side heat exchanger includes a plurality of usage-side heat exchangers;
the usage-side fluid supply unit includes a plurality of usage-side fluid supply units corresponding to the plurality of usage-side heat exchangers;
the fourth actuator includes a plurality of fourth actuator, corresponding to the plurality of usage-side fluid supply units;
the storage unit further stores the fourth relational expression, or information usable to create the fourth relational expression, for each of the plurality of fourth actuators; and
the control unit is further programmed to
obtain a sum of the energy inputted to the third actuator or a sum of an amount of change in the energy inputted to the third actuators, based on the third relational expression in a case where a change has been made from the current evaporation temperature,
obtain a sum of the energy inputted to the plurality of fourth actuators or a sum of an amount of change in the energy inputted to the plurality of fourth actuators, based on each fourth relational expression in a case where a change has been made from the current evaporation temperature, and
while updating the control target value of the evaporation temperature so that the sum of the energy inputted to the third actuator and the plurality of fourth actuators is less than the current level or so that the sum of the amount of change of energy inputted to the third actuator and the plurality of fourth actuators is a low value, control the third actuator when the usage-side heat exchangers function as evaporators and control the fifth actuator when the usage-side heat exchangers function as condensers so that the current value of the evaporation temperature acquired by the at least one refrigerant state quantity sensor approximates the updated control target value of the evaporation temperature.

9. The refrigeration cycle system according to claim 7, wherein
the control unit is further programmed to calculate the sum of the amount of change in the energy inputted to the third actuator and the fourth actuator in a case where a change has been made from the current evaporation temperature, by obtaining and totaling for each of the actuators a value attained by substituting the current evaporation temperature into a formula attained from a first-order differential of the relational expression for each of the actuators based on the evaporation temperature.

10. The refrigeration cycle system according to claim 7, wherein
the control unit is further programmed to update the control target value of the evaporation temperature and thereafter to further update the control target value of the evaporation temperature when predetermined standby conditions have been satisfied.

11. The refrigeration cycle system according to claim 1, further comprising
a heat-source-side fluid supply unit configured to supply a fluid to the heat-source-side heat exchanger to exchange heat with a refrigerant flowing through the heat-source-side heat exchanger; and
a usage-side fluid supply unit configured to supply a fluid to the usage-side heat exchanger to exchange heat with a refrigerant flowing through the usage-side heat exchanger,
the plurality of actuators includes a sixth actuator driving the compressor, a seventh actuator driving the heat-source-side fluid supply unit, and an eighth actuator driving the usage-side fluid supply unit;
the storage unit further storing
a sixth condensing relational expression indicating a relationship of an amount of energy inputted to the sixth actuator in relation to a control target value of a condensing temperature at which refrigerant flowing through the refrigerant circuit condenses, or information usable to create the sixth condensing relational expression,
a sixth evaporation relational expression indicating a relationship of an amount of energy inputted to the sixth actuator in relation to a control target value of an evaporation temperature at which refrigerant flowing through the refrigerant circuit evaporates, or information usable to create the sixth evaporation relational expression,
a seventh relational expression indicating a relationship of an amount of energy inputted to the seventh actuator in relation to a control target value of a condensing temperature, or information usable to create the seventh relational expression, and
an eighth relational expression indicating a relationship of an amount of energy inputted to the eighth actuator in relation to a control target value of the evaporation temperature, or information usable to create the eighth relational expression,
the at least one refrigerant state quantity sensor is further configured to acquire a current value of the condensing temperature and a current value of the evaporation temperature of the refrigerant flowing through the refrigerant circuit; and
the control unit being further programmed to
obtain a sum of an amount of change in the energy inputted to the sixth actuator, based on the sixth condensing relational expression in a case where a change has been made from the current condensing temperature,
obtain a sum of an amount of change in the energy inputted to the seventh actuator, based on the seventh condensing relational expression in a case where a change has been made from the current condensing temperature,
calculate three condensing temperature-related values attained by multiplication with the value attained from the relational expression related to the condensing temperature, the negative value of the value, and 0,
obtain a sum of an amount of change in the energy inputted to the sixth actuator; based on the sixth evaporation relational expression in a case where a change has been made from the current evaporation temperature,
obtain a sum of an amount of change in the energy inputted to the eighth actuator based on the eighth evaporation relational expression,
calculate three evaporation temperature-related values attained by multiplication with the value attained from the relational expression related to the evaporation temperature, the negative value of the value, and 0, specify a combination having a minimum value among combinations of the sums of the three condensing temperature-related values and the three evaporation temperature-related values, and while updating the control target value of the condensing temperature and the control target value of the evaporation temperature by having the condensing temperature-related value and the evaporation temperature-related value of the specified combination reflected in the current condensing temperature and the current evaporation temperature, respectively, when the usage-side heat exchanger functions as an evaporator, control the seventh actuator so that the current value of the condensing temperature acquired by the at least one refrigerant state quantity sensor reaches the updated control target value of the condensing temperature, while controlling the sixth actuator so that the current value of the evaporation temperature acquired by the at least one refrigerant state quantity sensor reaches the updated control target value of the evaporation temperature, and when the usage-side heat exchanger functions as a condenser; control the sixth actuator so that the current value of the condensing temperature acquired by the at least one refrigerant state quantity sensor reaches the updated control target value of the condensing temperature, while controlling the seventh actuator so that the current value of the evaporation temperature acquired by the at least one refrigerant state quantity sensor reaches the updated control target value of the evaporation temperature.

12. The refrigeration cycle system according to claim 11, wherein the heat-source-side heat exchanger includes a plurality of heat-source-side heat exchangers;

the compressor includes a plurality of compressors corresponding to the plurality of heat-source-side heat exchangers;

the heat-source-side fluid supply unit includes a plurality of heat-source-side fluid supply units corresponding to the plurality of heat-source-side heat exchangers;

the sixth actuator includes a plurality of sixth actuators corresponding to the plurality of compressors;

the seventh actuator includes a plurality of seventh actuators corresponding to the plurality of heat-source-side fluid supply units;

the storage unit further stores the sixth condensing relational expression or information usable to create the sixth condensing relational expression for each of the plurality of sixth actuators, the sixth evaporation relational expression or information usable to create the sixth evaporation relational expression for each of the plurality of sixth actuators, and the seventh relational expression or information usable to create the seventh relational expression for each of the plurality of seventh actuators, and the control unit is further programmed to obtain a sum of an amount of change in the energy inputted to the plurality of sixth actuators, based on each sixth condensing relational expression in a case where a change has been made from the current condensing temperature, obtain a sum of an amount of change in the energy inputted to the plurality of seventh actuators, based on each seventh condensing relational expression in a case where a change has been made from the current condensing temperature, calculate three condensing temperature-related values attained by multiplication with the value attained from the relational expression related to the condensing temperature, the negative value of the value, and 0, obtain a sum of an amount of change in the energy inputted to the plurality of sixth actuators, based on each sixth evaporation relational expression in a case where a change has been made from the current evaporation temperature, obtain a sum of an amount of change in the energy inputted to the eighth actuators, based on eighth evaporation relational expression in a case where a change has been made from the current evaporation temperature, calculate three evaporation temperature-related values attained by multiplication with the value attained from the relational expression related to the evaporation temperature, the negative value of the value, and 0, specify a combination having a minimum value among combinations of the sums of the three condensing temperature-related values and the three evaporation temperature-related values, and while updating the control target value of the condensing temperature and the control target value of the evaporation temperature by having the condensing temperature-related value and the evaporation temperature-related value of the specified combination reflected in the current condensing temperature and the current evaporation temperature, respectively, when the usage-side heat exchanger functions as an evaporator, control the plurality of seventh actuators so that the current value of the condensing temperature acquired by the at least one refrigerant state quantity sensor reaches the updated control target value of the condensing temperature, while controlling the plurality of sixth actuators so that the current value of the evaporation temperature acquired by the at least one refrigerant state quantity sensor reaches the updated control target value of the evaporation temperature, and when the usage-side heat exchanger functions as a condenser, control the plurality of sixth actuators so that the current value of the condensing temperature acquired by the at least one refrigerant state quantity sensor reaches the updated control target value of the condensing temperature, while controlling the plurality of seventh actuators so that the current value of the evaporation temperature acquired by the at least one refrigerant state quantity sensor reaches the updated control target value of the evaporation temperature.

13. The refrigeration cycle system according to claim 11, wherein the usage-side heat exchanger includes a plurality of usage-side heat exchangers;

the usage-side fluid supply unit includes a plurality of usage-side fluid supply units corresponding to the plurality of usage-side heat exchangers;

the eighth actuator includes a plurality of eighth actuators corresponding to the plurality of usage-side fluid supply units;

the storage unit further stores the eighth relational expression or information usable to create the eighth relational expression for each of the plurality of eighth actuators; and the control unit is further programmed to obtain a sum of an amount of change in the energy inputted to the sixth actuator, based on the sixth condensing relational expression in a case where a change has been made from the current condensing temperature, obtain a sum of an amount of change in the energy inputted to the sixth actuator and the seventh actuator, based on the seventh condensing relational expression in a case where a change has been made from the current evaporation temperature, calculate three condensing temperature-related values attained by multiplication with the value attained from the relational expression related to the condensing temperature, the negative value of the value, and 0, obtain a sum of an amount of change in the energy inputted to the sixth actuator, based on the sixth evaporation relational expression in a case where a change has been made from the current evaporation temperature, obtain a sum of an amount of change in the energy inputted to the sixth actuator and the plurality of eighth actuators, based on each eighth relational expression in a case where a change has been made from the current evaporation temperature, calculate three evaporation temperature-related values attained by multiplication with the value attained from the relational expression related to the evaporation temperature, the negative value of the value, and 0, specify a combination having a minimum value among combinations of the sums of the three condensing temperature-related values and the three evaporation temperature-related values, and while updating the control target value of the condensing temperature and the control target value of the evaporation temperature by having the condensing temperature-related value and the evaporation temperature-related value of the specified combination reflected in the current condensing temperature and the current evaporation temperature, respectively, when the usage-side heat exchanger functions as an evaporator, control the seventh actuator so that the current value of the condensing temperature acquired by the at least one refrigerant state quantity sensor reaches the updated control target value of the condensing temperature, while controlling the sixth actuator so that the current value of the evaporation temperature acquired by the at least one refrigerant state quantity sensor reaches the updated control target value of the evaporation temperature, and when the usage-side heat exchanger functions as a condenser, control the sixth actuator so that the current value of the condensing temperature acquired by the refrigerant state quantity acquisition mean at least one refrigerant state quantity sensor reaches the updated control target value of the condensing temperature, while controlling the seventh actuator so that the current value of the evaporation temperature acquired by the at least one refrigerant state quantity sensor reaches the updated control target value of the evaporation temperature.

14. The refrigeration cycle system according to claim 11, wherein the control unit is further programmed to calculate the sum of the amount of change in the energy inputted to the sixth actuator and the seventh actuator in a case where a change has been made from the current condensing temperature, by obtaining and totaling for each of the actuators a value attained by substituting the current condensing temperature into a formula attained from a first-order differential of the relational expression for each of the actuators based on the condensing temperature, and calculate the sum of the amount of change in the energy inputted to the sixth actuator and the eighth actuator in a case where a change has been made from the current evaporation temperature, by obtaining and totaling for each of the actuators a value attained by substituting the current evaporation temperature into a formula attained from a first-order differential of the relational expression for each of the actuators based on the evaporation temperature.

15. The refrigeration cycle system according to claim 11, wherein after updating the control target value of the condensing temperature and the control target value of the evaporation temperature, the control unit is further programmed to update the control target value of the condensing temperature and the control target value of the evaporation temperature when predetermined standby conditions have been satisfied.

* * * * *